(12) United States Patent
Keplinger et al.

(10) Patent No.: US 11,486,421 B2
(45) Date of Patent: Nov. 1, 2022

(54) HYDRAULICALLY AMPLIFIED SELF-HEALING ELECTROSTATIC TRANSDUCERS HARNESSING ZIPPING MECHANISM

(71) Applicant: The Regents of the University of Colorado, a body corporate, Denver, CO (US)

(72) Inventors: Christoph Matthias Keplinger, Boulder, CO (US); Eric Lucas Acome, Longmont, CO (US); Nicholas Alexander Kellaris, Boulder, CO (US); Shane Karl Mitchell, Boulder, CO (US); Timothy G. Morrissey, Boulder, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 0 days.

(21) Appl. No.: 16/978,292

(22) PCT Filed: Mar. 4, 2019

(86) PCT No.: PCT/US2019/020568
§ 371 (c)(1),
(2) Date: Sep. 4, 2020

(87) PCT Pub. No.: WO2019/173227
PCT Pub. Date: Sep. 12, 2019

(65) Prior Publication Data
US 2021/0003149 A1 Jan. 7, 2021

Related U.S. Application Data

(60) Provisional application No. 62/638,170, filed on Mar. 4, 2018.

(51) Int. Cl.
*F15B 21/06* (2006.01)
*F15B 5/00* (2006.01)

(52) U.S. Cl.
CPC .............. *F15B 21/06* (2013.01); *F15B 5/006* (2013.01); *F15B 2215/00* (2013.01)

(58) Field of Classification Search
CPC ........ F15B 21/065; F15B 21/06; F15B 15/08; F15B 15/10
See application file for complete search history.

(56) References Cited

U.S. PATENT DOCUMENTS 5,581,192 A * 12/1996 Shea ..................... H01H 29/004
324/555
5,846,238 A * 12/1998 Jackson ............. A61B 18/1492
606/41

(Continued)

FOREIGN PATENT DOCUMENTS

CN 103563012 A 2/2014
EP 1481467 B1 6/2010

(Continued)

OTHER PUBLICATIONS

ISR and Written Opinion of the ISA, dated Jun. 21, 2019, PCT/US2019/020568.

(Continued)

*Primary Examiner* — Thomas E Lazo
(74) *Attorney, Agent, or Firm* — Patents Integrated

(57) ABSTRACT

Hydraulically-amplified, self-healing, electrostatic transducers that harness electrostatic and hydraulic forces to achieve various actuation modes. Electrostatic forces between electrode pairs of the transducers generated upon application of a voltage to the electrode pairs draws the electrodes in each pair towards each other to displace a liquid dielectric contained within an enclosed internal cavity of the transducers to drive actuation in various manners. The electrodes and the (Continued)

liquid dielectric form a self-healing capacitor whereby the liquid dielectric automatically fills breaches in the liquid dielectric resulting from dielectric breakdown. Due to the resting shape of the cavity, a zipping-mechanism allows for selectively actuating the electrodes to a desired extent by controlling the voltage supplied.

21 Claims, 51 Drawing Sheets

(56) References Cited

U.S. PATENT DOCUMENTS

| | | | |
|---|---|---|---|
| 5,853,411 A * | 12/1998 | Whayne | A61N 1/056 606/41 |
| 5,871,483 A * | 2/1999 | Jackson | A61B 18/1492 606/41 |
| 5,891,135 A * | 4/1999 | Jackson | A61B 18/1492 606/41 |
| 6,343,129 B1 | 1/2002 | Pelrine et al. | |
| 6,376,971 B1 | 4/2002 | Pelrine et al. | |
| 6,543,110 B1 | 4/2003 | Pelrine et al. | |
| 6,626,416 B2 * | 9/2003 | Sharma | F15C 5/00 251/129.06 |
| 6,806,621 B2 * | 10/2004 | Heim | H02N 2/046 310/328 |
| 6,940,211 B2 | 9/2005 | Pelrine et al. | |
| 7,456,549 B2 | 11/2008 | Heim et al. | |
| 7,468,575 B2 | 12/2008 | Pelrine et al. | |
| 7,667,946 B2 * | 2/2010 | Choi | H01G 5/0132 361/281 |
| 7,923,064 B2 | 4/2011 | Pelrine et al. | |
| 7,971,850 B2 | 7/2011 | Heim et al. | |
| 8,042,264 B2 | 10/2011 | Rosenthal et al. | |
| 8,093,783 B2 | 1/2012 | Rosenthal et al. | |
| 8,410,695 B1 * | 4/2013 | Wedding | H01J 11/18 313/582 |
| 8,508,109 B2 | 8/2013 | Pelrine et al. | |
| 8,981,621 B2 | 3/2015 | Pelrine et al. | |
| RE45,464 E | 4/2015 | Kornbluh et al. | |
| 10,302,586 B2 * | 5/2019 | Sun | G01N 27/3335 |
| 10,631,083 B1 | 4/2020 | Gandhi et al. | |
| 10,640,033 B1 | 5/2020 | Gandhi et al. | |
| 10,859,101 B2 | 12/2020 | Rowe | |
| 2001/0026165 A1 | 10/2001 | Pelrine et al. | |
| 2001/0032663 A1 | 10/2001 | Pelrine et al. | |
| 2001/0035723 A1 | 11/2001 | Pelrine et al. | |
| 2001/0036790 A1 | 11/2001 | Kornbluh et al. | |
| 2002/0008445 A1 | 1/2002 | Pelrine et al. | |
| 2002/0050769 A1 | 5/2002 | Pelrine et al. | |
| 2002/0185937 A1 | 12/2002 | Heim et al. | |
| 2009/0115285 A1 * | 5/2009 | Najafi | F15B 7/00 310/300 |
| 2010/0013356 A1 | 1/2010 | Heydt et al. | |
| 2010/0026143 A1 | 2/2010 | Pelrine et al. | |
| 2010/0087778 A1 * | 4/2010 | Genosar | A61M 5/14248 604/65 |
| 2010/0164324 A1 | 7/2010 | Kim et al. | |
| 2010/0176322 A1 | 7/2010 | Heim et al. | |
| 2010/0263181 A1 | 10/2010 | Rosenthal et al. | |
| 2011/0025170 A1 | 2/2011 | Rosenthal et al. | |
| 2011/0154641 A1 | 6/2011 | Pelrine et al. | |
| 2011/0155307 A1 | 6/2011 | Pelrine et al. | |
| 2012/0169184 A1 | 7/2012 | Pelrine et al. | |
| 2014/0004364 A1 * | 1/2014 | Takahashi | C08J 5/18 428/465 |
| 2014/0338458 A1 * | 11/2014 | Wang | G01H 11/06 73/658 |
| 2020/0079245 A1 | 3/2020 | Rowe et al. | |
| 2020/0130202 A1 | 4/2020 | Gandhi et al. | |
| 2020/0132223 A1 | 4/2020 | Prokhorov et al. | |
| 2020/0136525 A1 | 4/2020 | Gandhi et al. | |
| 2020/0136526 A1 | 4/2020 | Gandhi et al. | |

FOREIGN PATENT DOCUMENTS

| | | |
|---|---|---|
| EP | 2264801 A2 | 12/2010 |
| EP | 2264801 A3 | 5/2011 |
| EP | 1512215 B1 | 8/2011 |
| EP | 2362458 A2 | 8/2011 |
| EP | 1259992 B1 | 10/2011 |
| EP | 2362458 A3 | 5/2012 |
| EP | 1848046 B1 | 10/2012 |
| EP | 2770510 A1 | 8/2014 |
| EP | 3643929 A1 | 4/2020 |
| ES | 2356146 T3 | 4/2011 |
| ES | 2369532 | 12/2011 |
| ES | 2394160 | 1/2013 |
| ES | 2394501 | 2/2013 |
| JP | 2001524278 A | 11/2001 |
| JP | 4408415 B2 | 2/2010 |
| JP | 4939577 B2 | 5/2012 |
| KR | 100924231 B1 | 11/2009 |
| KR | 100969710 B1 | 7/2010 |
| KR | 1020140007955 A | 1/2014 |
| WO | 9835529 A2 | 8/1998 |
| WO | 9835529 A3 | 12/1998 |
| WO | 0106579 A3 | 1/2002 |
| WO | 02071592 A2 | 9/2002 |
| WO | 02071592 A3 | 10/2003 |
| WO | 2009015151 A1 | 1/2009 |
| WO | 2013058237 A1 | 4/2013 |
| WO | WO 2018/175741 A1 | 9/2018 |
| WO | 2019002860 A1 | 1/2019 |
| WO | 2019166635 A1 | 9/2019 |
| WO | 2019173227 A1 | 9/2019 |
| WO | 2020086325 A1 | 4/2020 |

OTHER PUBLICATIONS

EPO Search Report, dated Oct. 28, 2021, Regents of the U. of CO, Entire Document.
Acome, E., et al., "Hydraulically amplified self-healing electrostatic actuators with muscle-like performance," Science, Jan. 5, 2018, vol. 359, pp. 61-65.
Kellaris, N. et al., "Peano-HASEL actuators: Muscle-mimetic, electrohydraulic transducers that linearly contract on activation," Science Robotics, Jan. 5, 2018, vol. 3, Issue 14.

* cited by examiner

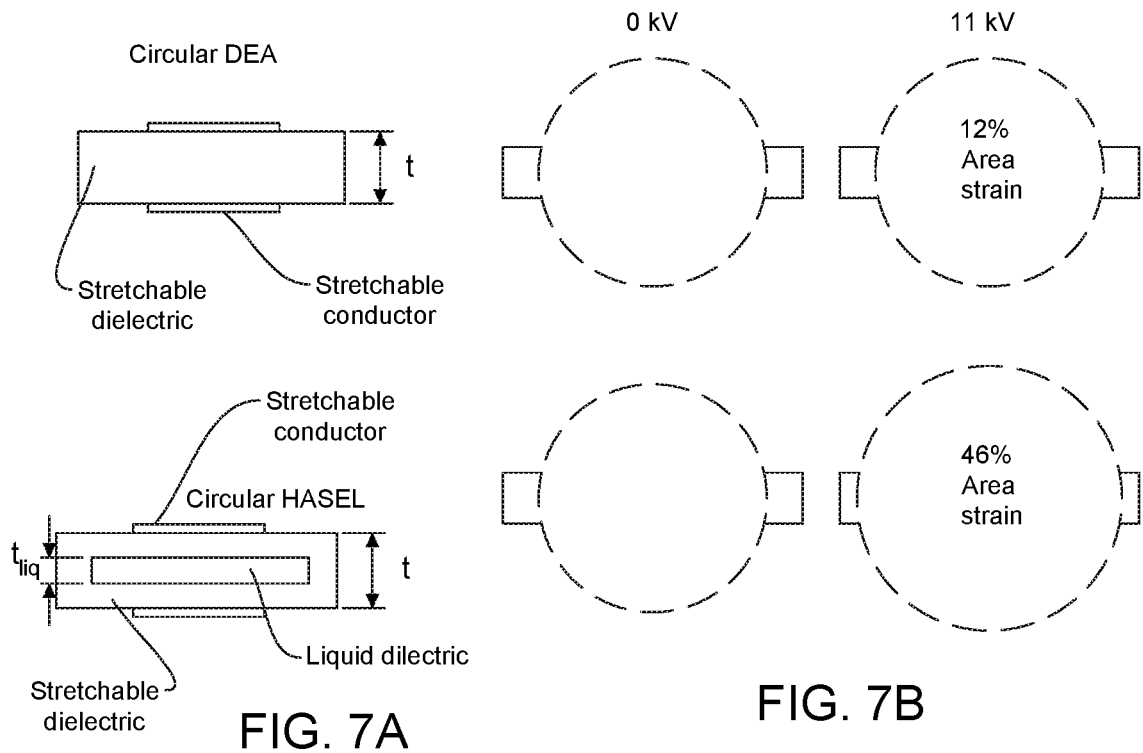
FIG. 7A
FIG. 7B
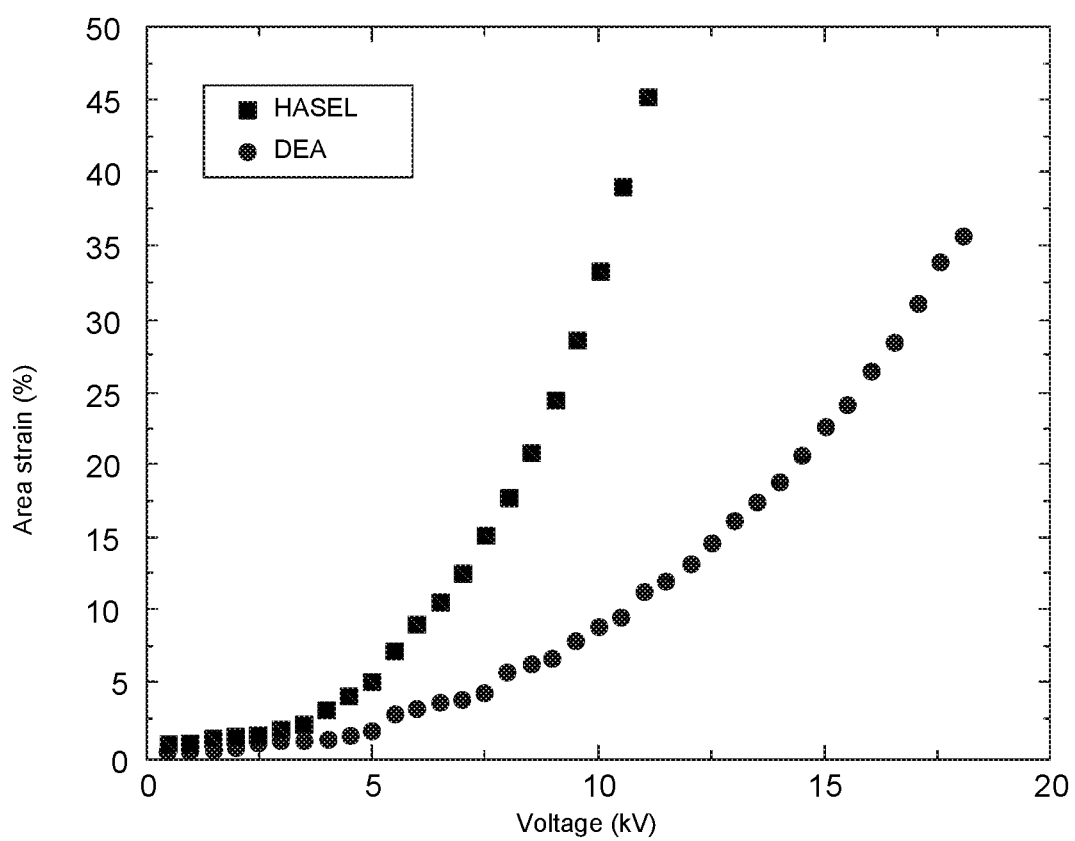
FIG. 7C

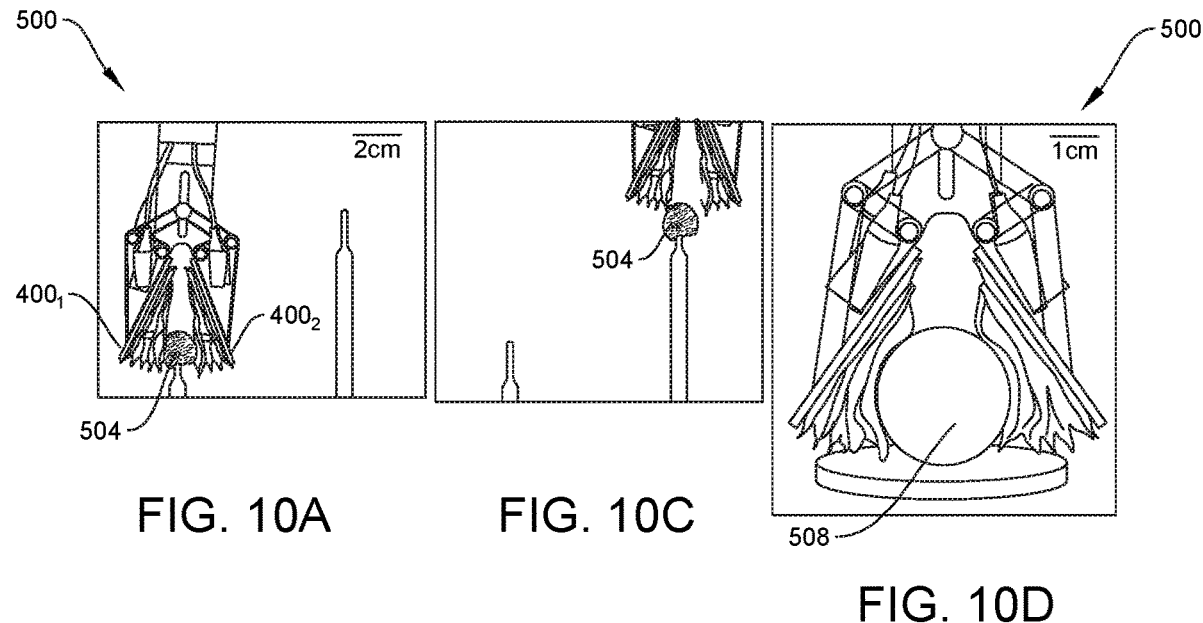
FIG. 10A  FIG. 10C
FIG. 10D
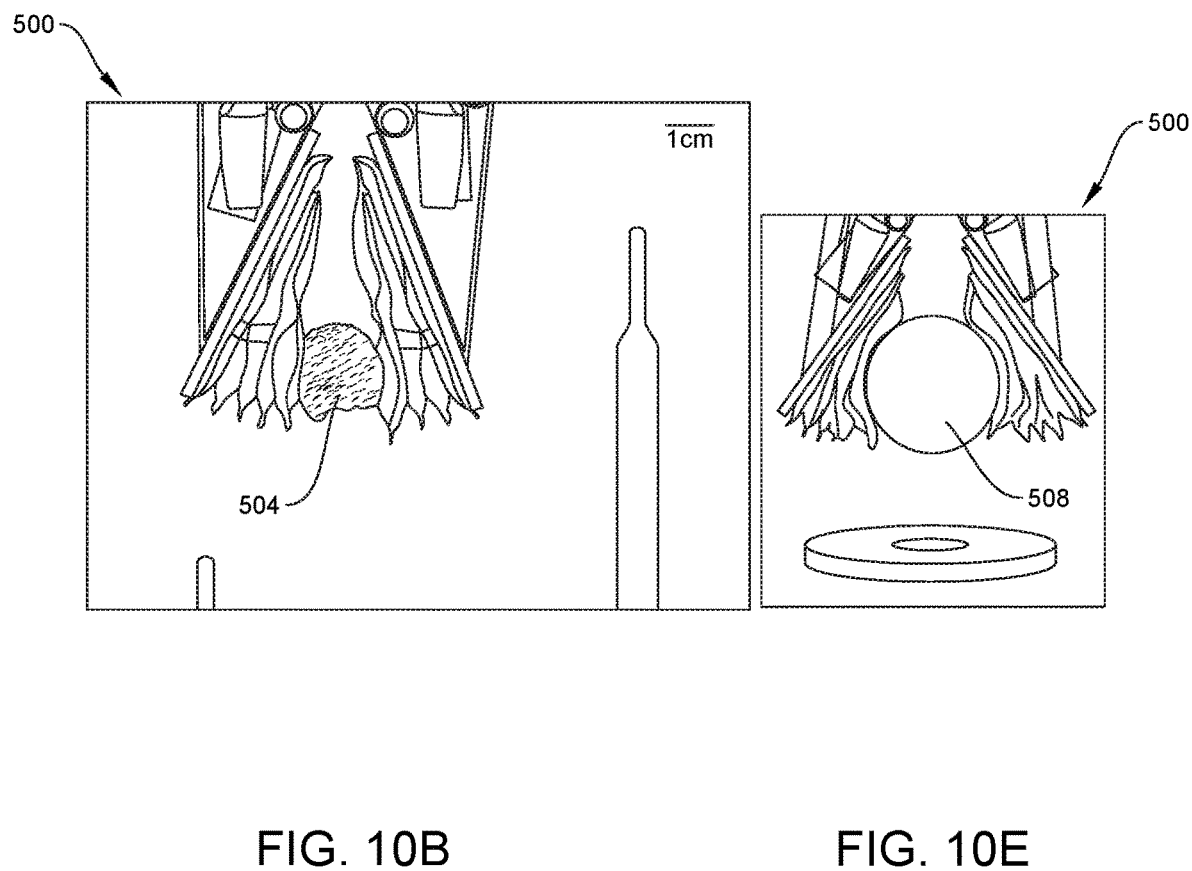
FIG. 10B  FIG. 10E

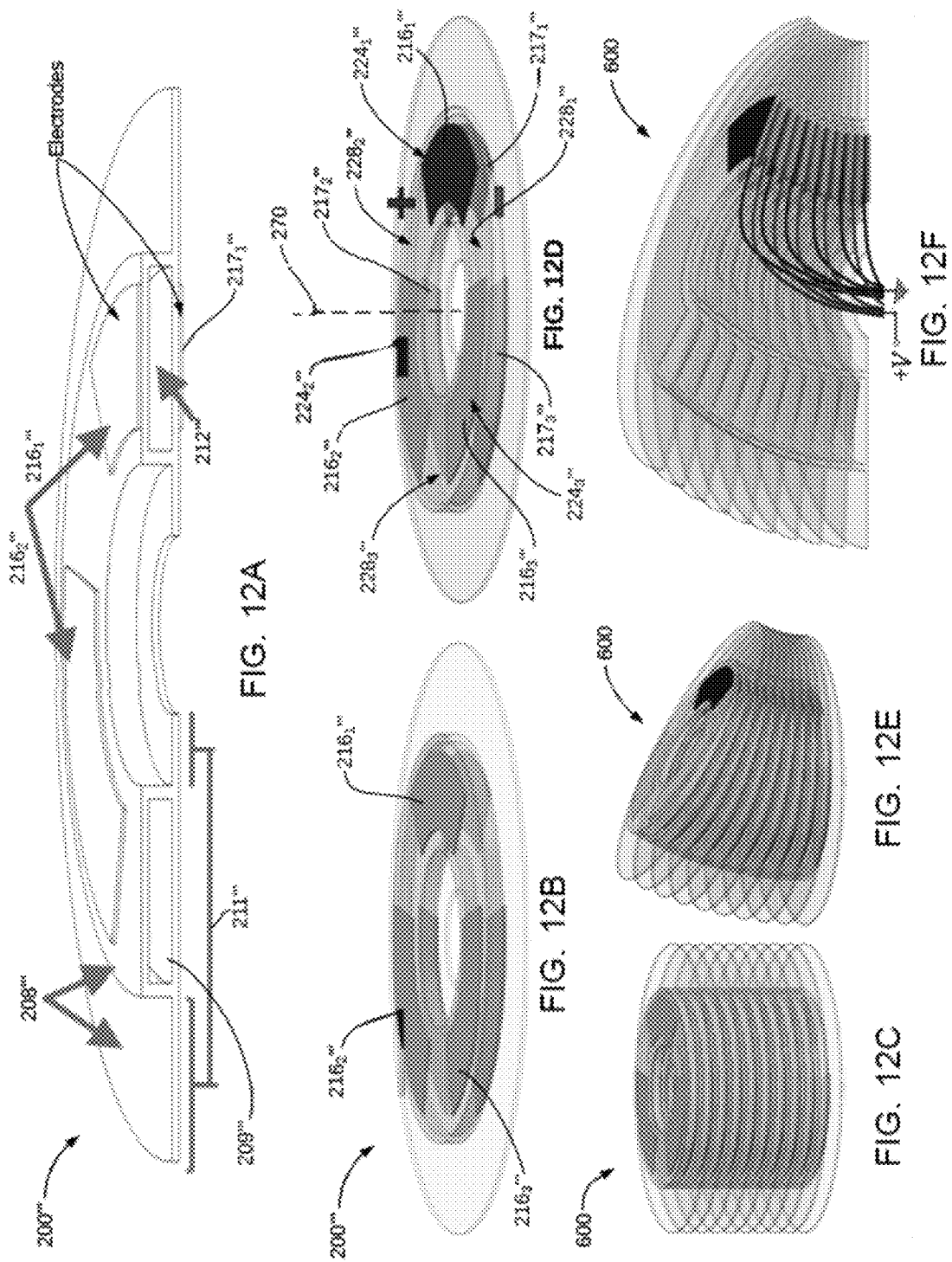

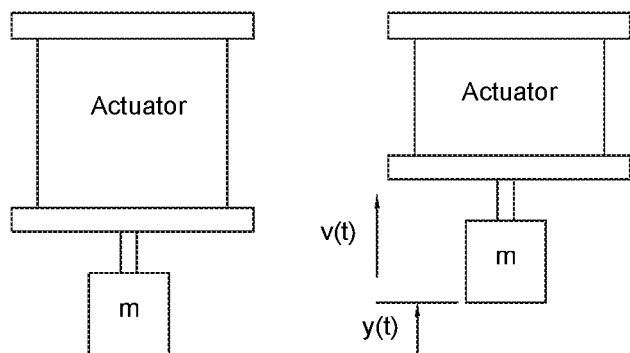
FIG. 18A
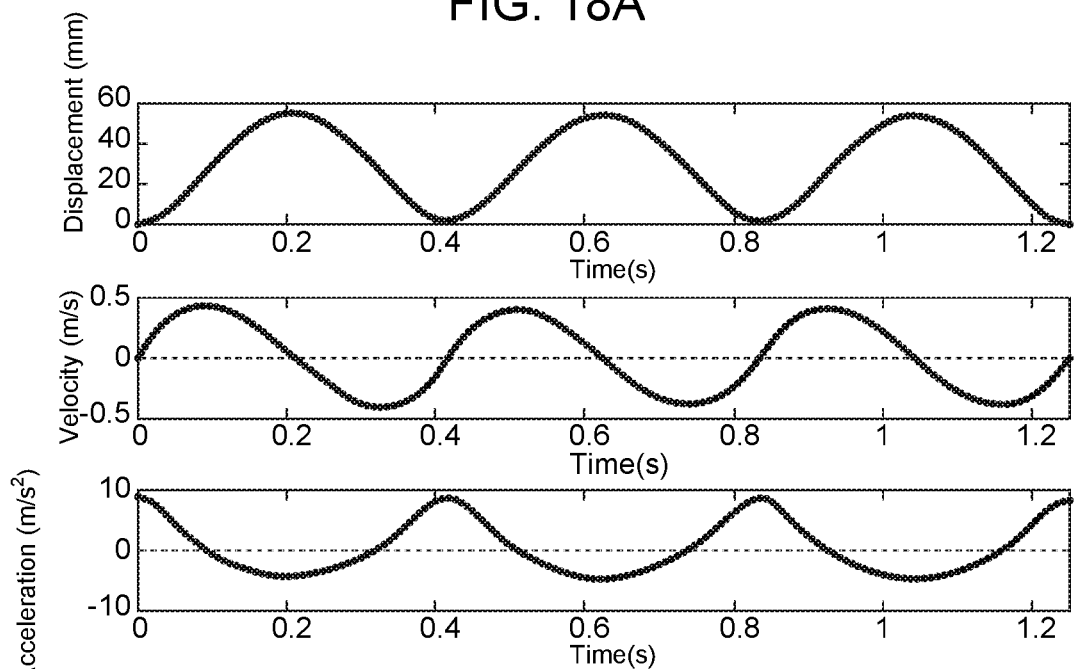
FIG. 18B
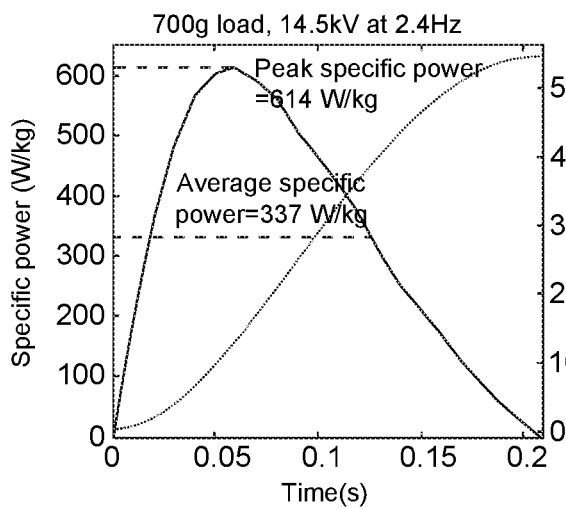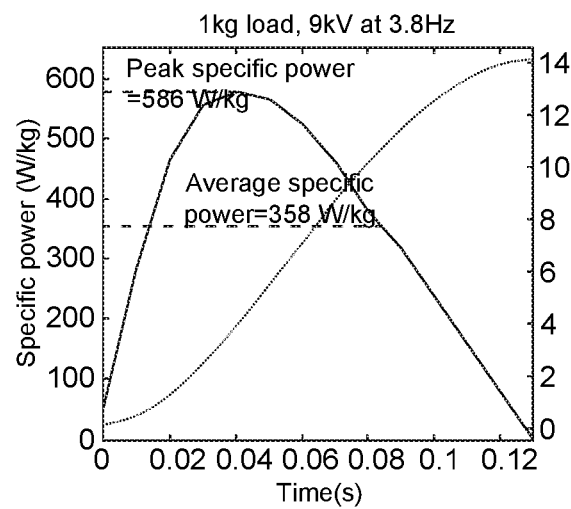
FIG. 18C          FIG. 18D

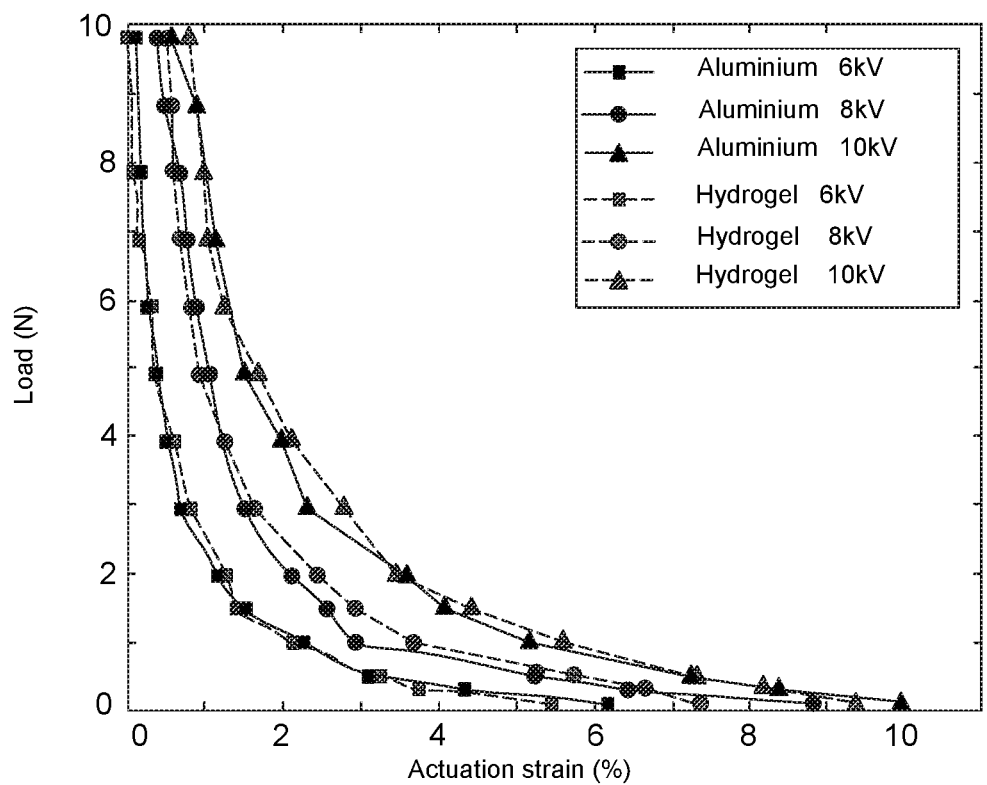
FIG. 22A
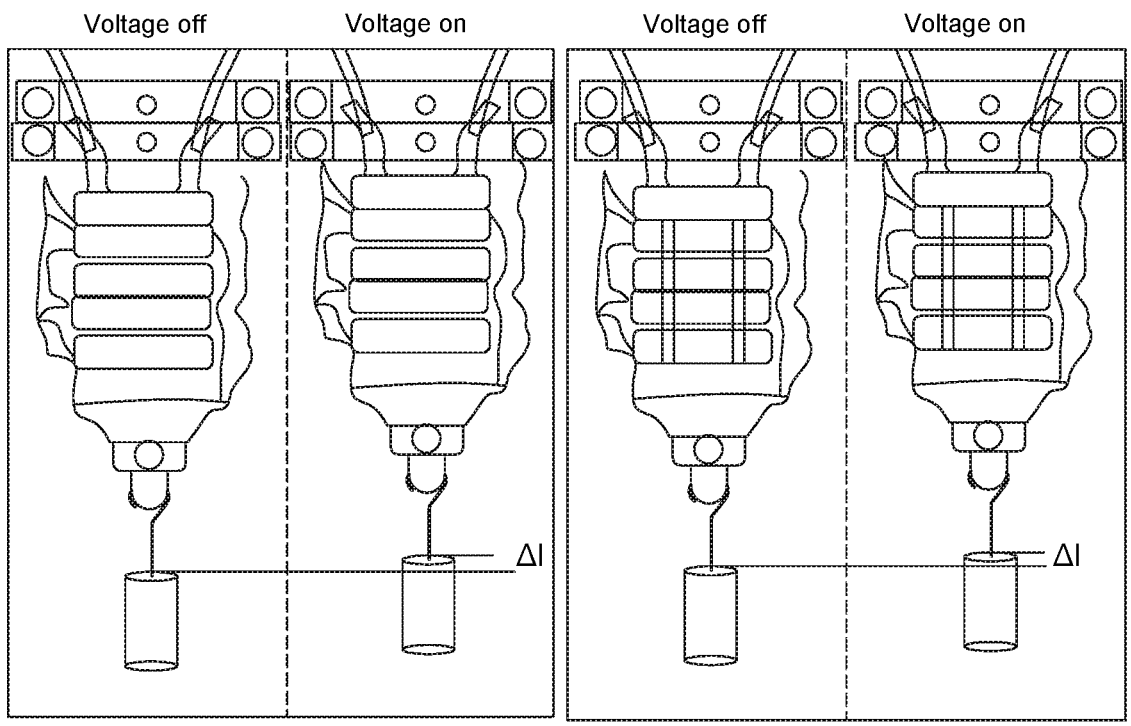
FIG. 22B
FIG. 22C

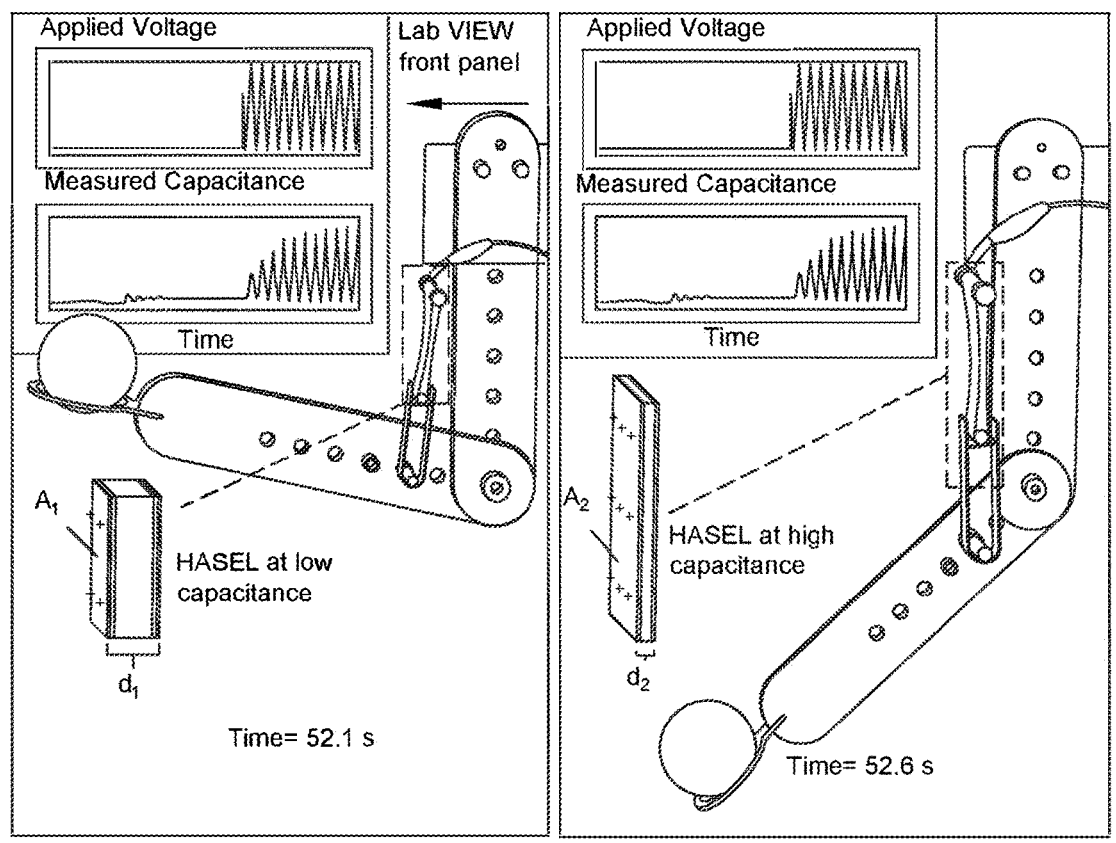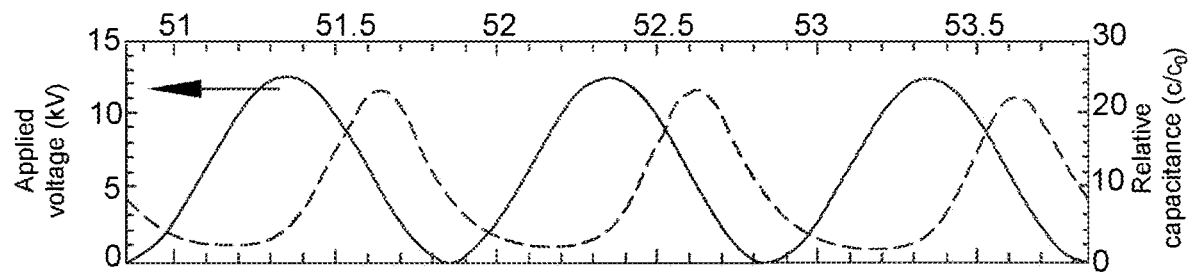
FIG. 29

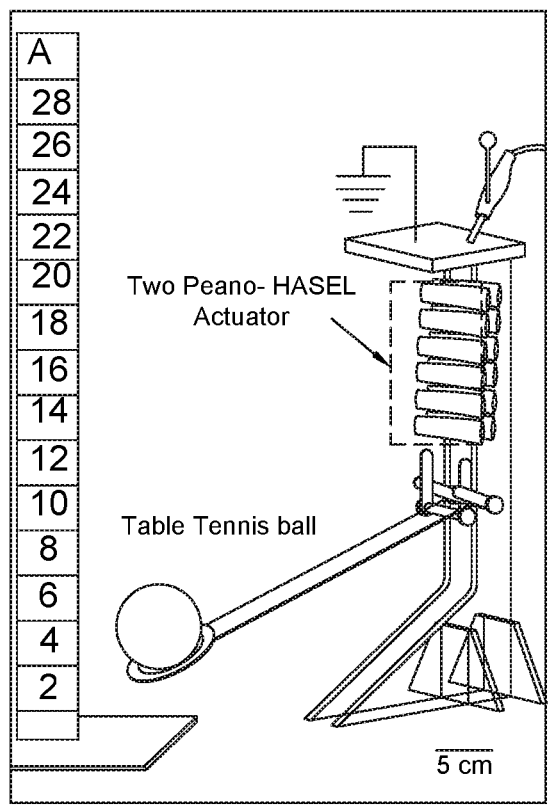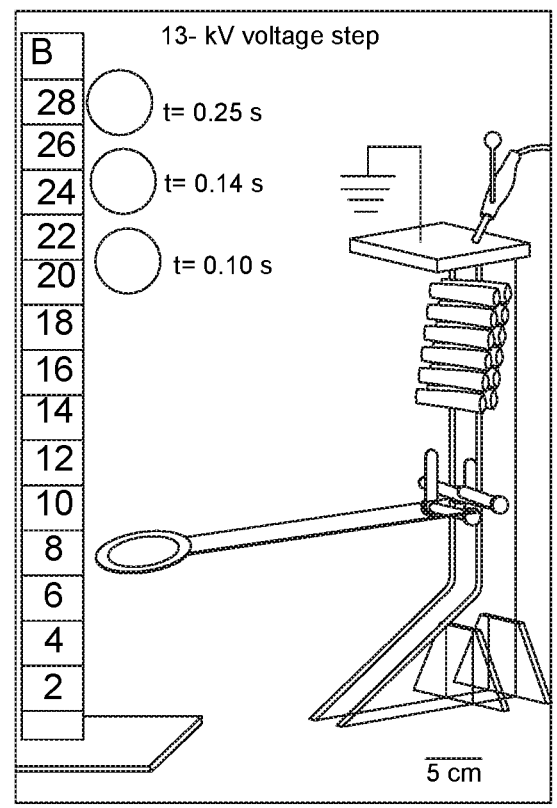
FIG. 30 A
FIG. 30 B
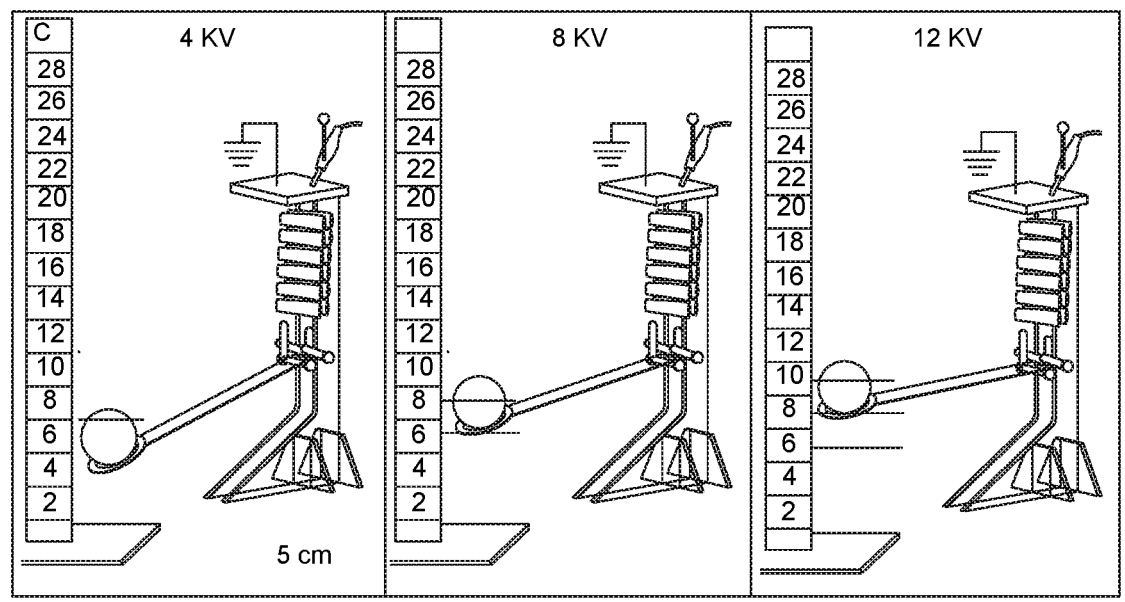
FIG. 30 C (A) Actuator in air
(B) Submerging in liquid dielecric
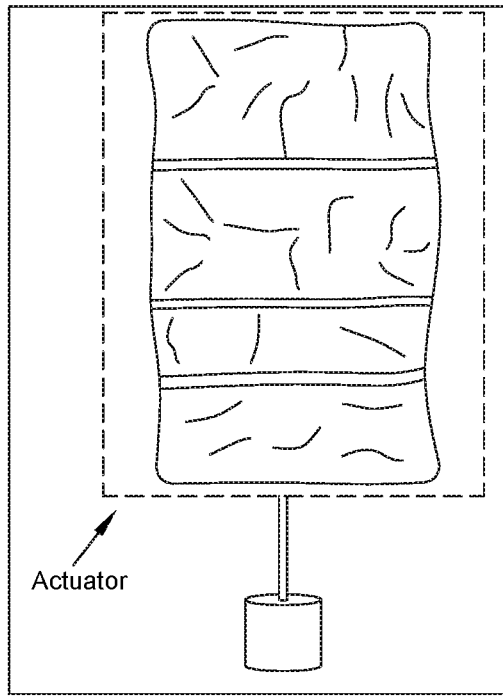
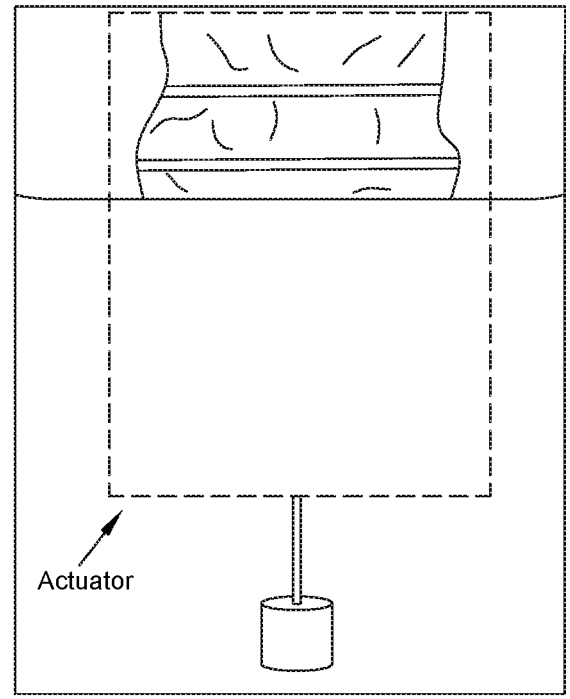
FIG. 33A
FIG. 33B
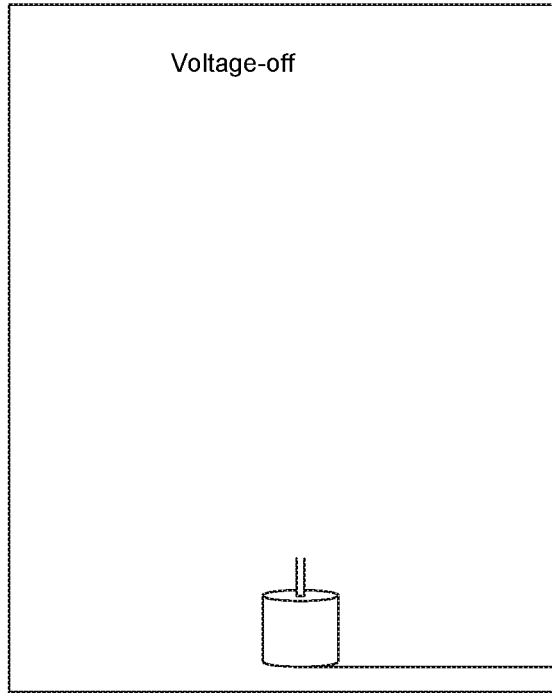
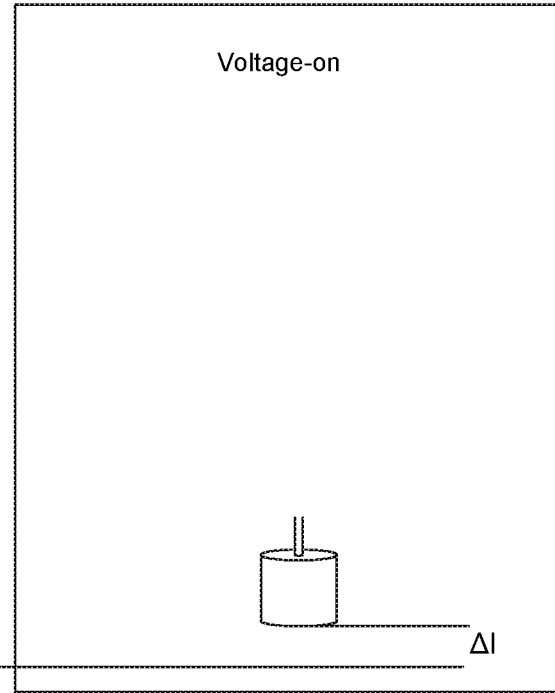
FIG. 33C
FIG. 33D

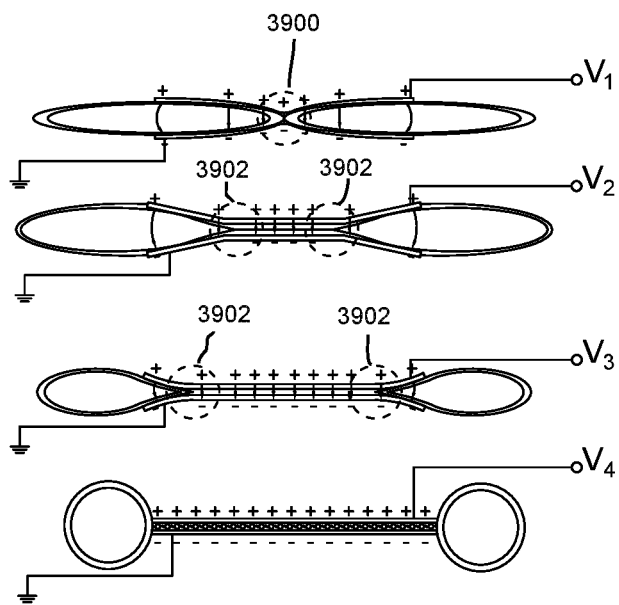
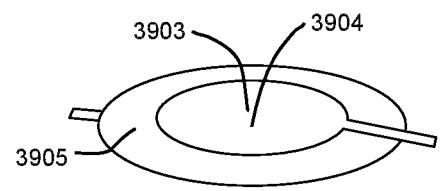
FIG. 39B
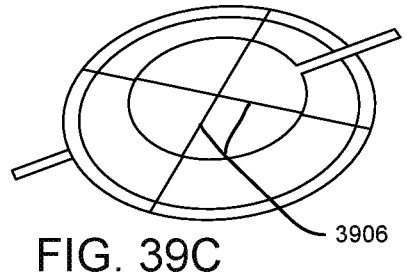
FIG. 39C
FIG. 39A
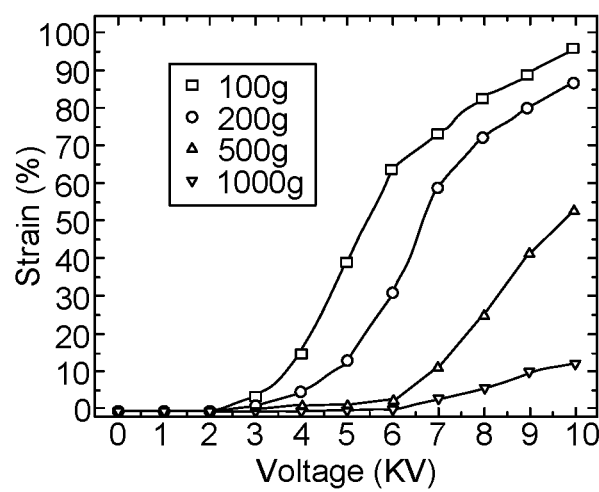
FIG. 39D

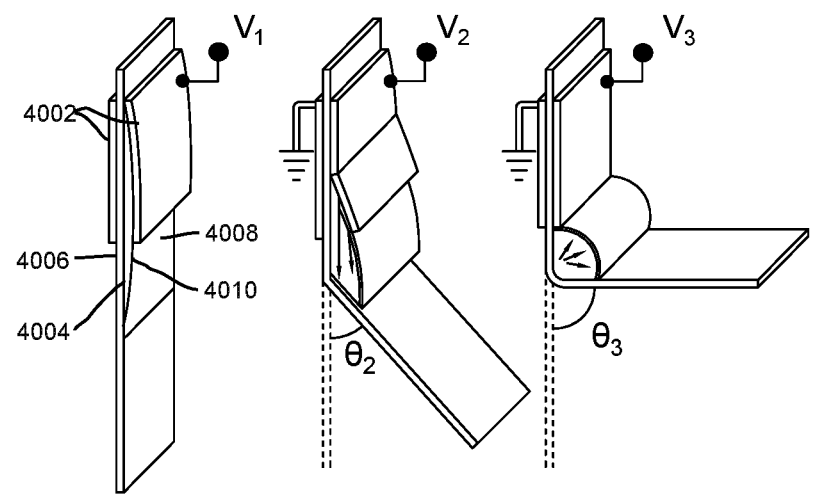
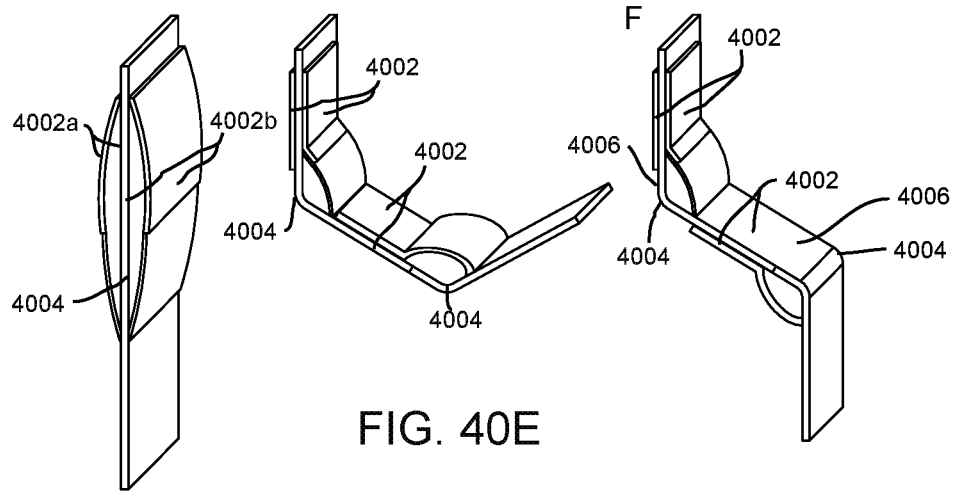
FIG. 40A  FIG. 40B  FIG. 40C
FIG. 40D  FIG. 40E  FIG. 40F

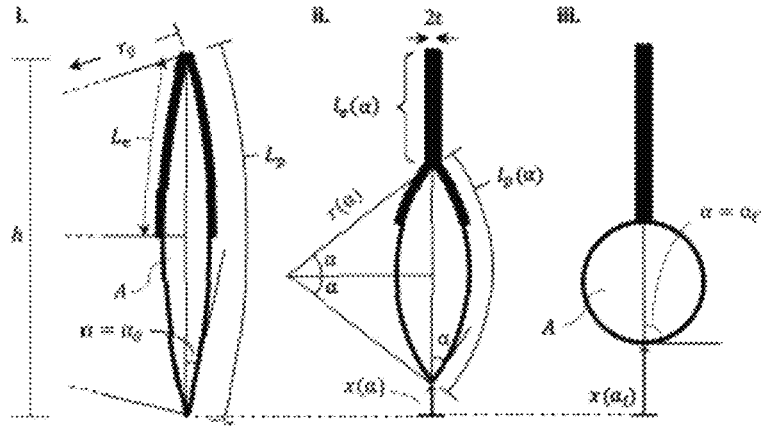
FIG. 43A
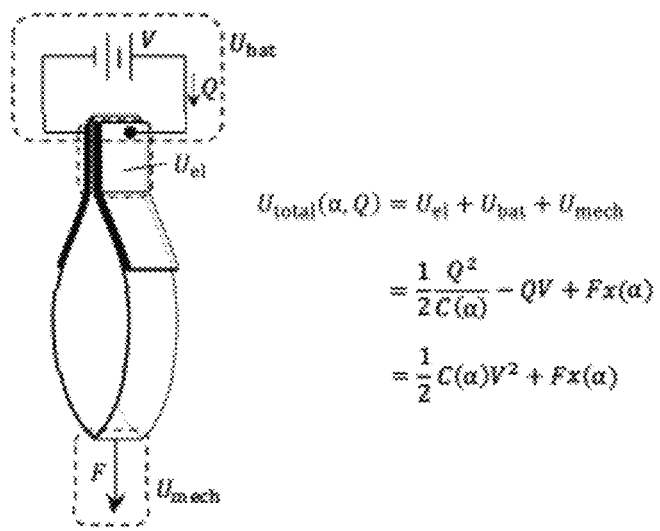
$$U_{total}(\alpha, Q) = U_{el} + U_{bat} + U_{mech}$$
$$= \frac{1}{2}\frac{Q^2}{C(\alpha)} - QV + Fx(\alpha)$$
$$= \frac{1}{2}C(\alpha)V^2 + Fx(\alpha)$$
FIG. 43B
i.
$$F = \frac{w}{4t} \cdot \frac{\cos(\alpha)}{1 - \cos(\alpha)} \varepsilon_0 \varepsilon_r V^2$$
ii.
$$\epsilon = 1 - \frac{\alpha_0}{\sin(\alpha_0)}\left(1 + \frac{\sqrt{2A}}{L_p}\frac{\sin(\alpha) - \alpha}{\sqrt{\alpha - \sin(\alpha)\cos(\alpha)}}\right)$$
FIG. 43C

HYDRAULICALLY AMPLIFIED SELF-HEALING ELECTROSTATIC TRANSDUCERS HARNESSING ZIPPING MECHANISM

PRIORITY CLAIM

The present application is a national stage entry of PCT Application Ser. No. PCT/US19/20568, filed Mar. 4, 2019 and entitled "Hydraulically Amplified Self-Healing Electrostatic Transducers Harnessing Zipping Mechanism," which in turn claims the benefit of U.S. Provisional Patent Application Ser. No. 62/638,170, filed Mar. 4, 2018 and entitled "Hydraulically Amplified Self-Healing Electrostatic Transducers Harnessing Zipping Mechanism," which applications are incorporated herein by reference in their entirety.

BACKGROUND

1. Field of the Invention

The present invention is directed to soft transducers or actuators and, more particularly, to muscle-mimetic actuators for use in robotics and the like.

2. Relevant Background

Historically, human-made machines have tended to rely on rigid components (e.g., such as metals) and typically have finite degrees of freedom. In contrast, nature makes extensive use of soft materials (e.g., mammalian muscle, cephalopods, muscular hydrostats, etc.) that are capable of large deformation and can easily conform to their environment. Soft robotics is a rapidly growing field with many potential applications including collaborative robots that safely interact with humans, transducers for biomedical applications, and soft grippers capable of handling delicate and irregular objects. Actuators and sensors that closely mimic properties of natural muscles are key components that will enable the next generation of soft robotic devices.

Existing artificial muscle transducers include pneumatic actuators, electroactive polymers (EAPs), shape memory polymers, and other thermally-activated systems, and each has various limitations. Currently, soft robots predominantly rely on pneumatic or fluidic actuators, which limit speed and efficiency. Such actuators are versatile and prevalent, but they have specific challenges. For example, because they are connected to storage systems of pressurized fluids or pumps via channels and valves, they tend to experience fluid drag, which can limit bandwidth and efficiency. Further pneumatic actuators can experience significant trade-offs between actuation speed and portability, with the response speed of untethered devices being low, and such actuators can often rely on additional sensors to control parameters of actuation.

Dielectric elastomer actuators (DEAs), a specific type of EAP, exhibit performance metrics that resemble biological muscle. DEAs are hyperelastic capacitors that consist of elastomeric layers sandwiched between compliant electrodes. When voltage is applied across the two electrodes, Maxwell stress causes the dielectric to reduce in thickness and expand in area. Continuous measurement of electrical impedance of the hyperelastic capacitors provides information on the state of actuation, giving DEAs self-sensing capabilities.

However, such electrically powered muscle-like actuators tend to have their own challenges. Being driven by high electric fields, DEAs can be prone to failure by dielectric breakdown and electrical ageing. DEAs can also be difficult to scale up to deliver high forces, as such applications typically rely on large areas of dielectric (e.g., in stack actuators), which tend to be much more likely to experience premature electrical failure, following the Weibull distribution for dielectric breakdown. Previous work has attempted to mitigate damage from dielectric breakdown, but these approaches have tended to present their own challenges. In one such approach, self-clearing electrodes have been used to isolate dielectric breakdown sites, but the dielectric itself remains damaged, which degrades the performance of the device. Another such approach utilizes a dielectric layer consisting of a silicone sponge that is swelled with silicone oil, and the oil locally redistributes after failure from electrical or mechanical damage; but this approach tends only to be useful at low actuation strain.

SUMMARY

In view of at least the foregoing, embodiments described herein include a novel class of soft actuators (e.g., for soft robotics applications and the like), and methods for use and manufacturing of such soft actuators. The novel soft actuators are referred to herein as Hydraulically Amplified Self-Healing Electrostatic (HASEL) transducers (or actuators), and such HASEL transducers can provide high-performance, reliable, self-sensing, muscle-mimetic actuators that can overcome important limitations of current soft actuators. Although the embodiments of HASEL transducers are described herein as "actuators" it will be appreciated that such transducers, by definition, may convert electrical energy into mechanical movement or vice versa. Accordingly, it is contemplated that HASEL transducers have application as actuators (e.g., mechanical movement in response to application of electrical energy), sensors (e.g., detection of mechanical movement by change in an electrical property), and electrical generators (e.g., varying capacitance by mechanical movement of electrodes). HASEL actuators use an electro-hydraulic mechanism to combine the advantages of fluidic and electrostatic actuators. Use of liquid dielectrics can allow for harnessing hydraulic principles to scale actuation force and strain. A wide range of different modes of actuation can be achieved by pressurizing and displacing a hydraulic fluid inside of deformable structures. HASEL actuators can be designed to linearly elongate or contract upon application of voltage and can feature three-dimensional mobility. Mechanical and electrical properties can be tuned independently. Additionally, HASEL actuators can be fabricated from a variety of materials and can be compatible with a large number of fabrication techniques.

An electro-hydraulic actuator disclosed herein may include a deformable shell (also referred to as a "pouch") that defines an enclosed internal cavity; a liquid dielectric contained within the enclosed internal cavity; a first electrode disposed over a first side of the enclosed internal cavity; and a second electrode disposed over a second side of the enclosed internal cavity, where electrostatic forces between the first and second electrodes upon application of a voltage to the first and second electrodes draws the first and second electrodes towards each other to displace the liquid dielectric within the enclosed internal cavity.

A method of using an electro-hydraulic actuator may include applying a voltage to first and second electrodes of the actuator to generate electrostatic forces between the first and second electrodes; drawing the first and second electrodes towards each other using the electrostatic forces;

displacing, during the drawing, a liquid dielectric contained within a flexible shell and disposed between the first and second electrodes; and flexing a portion of the flexible shell with the displaced liquid dielectric.

A method of fabricating an electro-hydraulic actua-tor may include disposing a first electrode onto a first surface of a first elastomeric shell; applying a first encapsulating layer over the first electrode and the first surface of the first elastomeric shell to create a first elastomeric unit; disposing a second electrode onto a first surface of a second elastomeric shell; applying a second encapsulating layer over the second electrode and the first surface of the second elastomeric shell to create a second elastomeric unit; securing the first and second elastomeric units together; and filling an internal cavity between the first and second electrodes with a liquid dielectric.

A method of fabricating an electro-hydraulic actuator may include creating a first plurality of spaced electrodes on a first surface of a first film; creating a second plurality of spaced electrodes on a first surface of a second film; placing the first film over the second film such that the first plurality of spaced electrodes are aligned over the second plurality of spaced electrodes; sealing the first film to the second film at each of a plurality of spaced sealing locations to create a plurality of pouches, wherein each pouch is defined by: one of the first plurality of spaced electrodes, one of the second plurality of spaced electrodes, a portion of the first surface of the first film disposed between the one of the first plurality of spaced electrodes and an adjacent of the first plurality of spaced electrodes, and a portion of the first surface of the second film disposed between the one of the second plurality of spaced electrodes and an adjacent of the second plurality of spaced electrodes; filling each of the pouches with a liquid dielectric via respective filling ports; and sealing each of the filling ports.

A method of fabricating an electro-hydraulic actuator may include creating a plurality of connected, flexible pouches; filling each of the pouches with a liquid dielectric; positioning a respective first electrode on a first side of each of the pouches, wherein adjacent ones of the first electrodes are electrically connected; and positioning a respective second electrode on an opposite second side of each of the pouches, where adjacent ones of the second electrodes are electrically connected, and wherein the liquid dielectric in each pouch is disposed between its respective first and second electrode.

A method of fabricating an electro-hydraulic actuator may include bonding a first surface of a first elastomeric sheet to a first surface of a second elastomeric sheet; injecting a gas into an internal cavity between the first surfaces of the first and second elastomeric sheets; curing the first and second elastomeric sheets together with the injected gas disposed between the first surfaces of the first and second elastomeric sheets; removing the gas from the internal cavity; filling the internal cavity with a liquid dielectric; securing a first electrode over a second surface of the first elastomeric sheet; and securing a second electrode over a second surface of the second elastomeric sheet.

The embodiments described above were described in WO 2018/175741 entitled "HYDRAULICALLY AMPLIFIED SELF-HEALING ELECTROSTATIC TRANSDUCERS" which is hereby incorporated herein by reference in its entirety.

This disclosure further describes embodiments of HASEL actuators which utilize an electrostatic "zipping" mechanism.

In an aspect of an electro-hydraulic actuator having a zipping mechanism, the actuator includes a deformable shell that defines an enclosed internal cavity and a liquid dielectric contained within the enclosed internal cavity. A first electrode is disposed over a first side of the enclosed internal cavity and a second electrode is disposed over a second side of the enclosed internal cavity. A distance between the first and second electrodes decreases from a first reference point on an axis through the enclosed internal cavity to a second reference point on the axis in the absence of a voltage being applied to the first and second electrodes. In other words, moving along the reference axis at some point in time while no voltage is applied to the electrodes, there is a gradient or taper between the electrodes meaning the two electrodes are closer together at some locations than at others. The distance between the first and second electrodes remains constant between the first and second reference points along the axis through the enclosed internal cavity in the presence of a voltage being applied to the first and second electrodes. In this regard, the voltage being applied is sufficient to pull the electrodes all the way together so that there is a constant distance between them along the reference axis.

In an embodiment, a surface area of the deformable shell over which the first and second electrodes are disposed defines an active area of the deformable shell. A surface area of the deformable shell over which the first and second electrodes are not disposed defines an inactive area of the deformable shell. Electrostatic forces between the first and second electrodes upon application of the voltage to the first and second electrodes draws the first and second electrodes towards each other to displace the liquid dielectric within the enclosed internal cavity from the active area of the shell to the inactive area of the shell. In some embodiments, the active area is surrounded by the inactive area. In others, the inactive area may be surrounded by the active area.

Furthermore, electrostatic forces between the first and second electrodes upon application of the voltage to the first and second electrodes may draw the first and second electrodes towards each other to displace the liquid dielectric within the enclosed internal cavity from the active area of the shell to the inactive area of the shell in first and second opposite directions.

In an embodiment, a plurality of the actuators are electrically interconnected to each other. For each adjacent pair of actuators, the active area of a first actuator in the adjacent pair is disposed over the inactive area of a second actuator in the adjacent pair.

In another embodiment, the first and second electrodes are a first pair of electrodes. The actuator includes one or more additional pairs of electrodes that are each disposed over an active area of the flexible shell. Each adjacent pair of the active areas may be spaced by an inactive area.

In yet another embodiment, a first portion of the deformable shell on the first side of the internal cavity has a first stiffness and a second portion of the deformable shell on the second side of the internal cavity has a second stiffness. The first stiffness may be greater than the second stiffness. The second portion of the deformable shell may be inextensible.

In some embodiments, the electrodes may be elastic while in other embodiments the electrodes may be inextensible. In some embodiments, both elastic and inextensible electrodes may be used.

In an embodiment, the first reference point may be disposed adjacent a peripheral edge of the shell and the second reference point may be spaced from the peripheral edge of the shell, such as positioned adjacent a center of the shell.

In another embodiment, the first reference point may be disposed adjacent a center of the shell and the second reference point may be spaced from the center of the shell.

In another aspect, a method of using an electro-hydraulic actuator may include providing an electro-hydraulic actuator having a deformable shell that defines an enclosed internal cavity, a liquid dielectric contained within the enclosed internal cavity, a first electrode disposed over a first side of the enclosed internal cavity, and a second electrode disposed over a second side of the enclosed internal cavity. A distance between the first and second electrodes decreases from a first reference point on an axis through the enclosed internal cavity to a second reference point on the axis in the absence of a voltage being applied to the first and second electrodes. The method may further include applying a first voltage to the first and second electrodes to generate electrostatic forces between the first and second electrodes and drawing the first and second electrodes towards each other using the electrostatic forces generated during the applying the first voltage. This may result in displacing, during the drawing, a liquid dielectric contained within a flexible shell and disposed between the first and second electrodes and flexing a portion of the flexible shell with the displaced liquid dielectric.

In an embodiment, the drawing includes drawing the first and second electrodes towards each other from the second reference point to a third reference point on the axis. The third reference point is between the first and second reference points. The method may further include applying a second voltage to the first and second electrodes to generate electrostatic forces between the first and second electrodes in which the second voltage is greater than the first voltage. This may result in drawing the first and second electrodes towards each other using the electrostatic forces generated during the applying the second voltage. The drawing includes drawing the first and second electrodes towards each other from the third reference point on the axis to a fourth reference point on the axis between the first and third reference points.

In another aspect, a method of using an electro-hydraulic actuator may include providing an electro-hydraulic actuator having a deformable shell that defines an enclosed internal cavity, a liquid dielectric contained within the enclosed internal cavity, a first electrode disposed over a first side of the enclosed internal cavity, and a second electrode disposed over a second side of the enclosed internal cavity. A distance between the first and second electrodes decreases from a first reference point on a first reference axis through the enclosed internal cavity to a second reference point on the first reference axis in the absence of a voltage being applied to the first and second electrodes. The method may include applying an increasing voltage to the first and second electrodes to generate electrostatic forces between the first and second electrodes, progressively drawing the first and second electrodes towards each other using the electrostatic forces generated during the applying the first voltage from the second reference point towards the first reference point. This may lead to displacing, during the progressively drawing, a liquid dielectric contained within a flexible shell and disposed between the first and second electrodes and flexing a portion of the flexible shell with the displaced liquid dielectric.

In an embodiment, the method may further include applying a constant voltage to the first and second electrodes. The distance between the first and second electrodes remains constant between the first and second reference points along the first reference axis through the enclosed internal cavity in the presence of the constant voltage being applied to the first and second electrodes.

In an embodiment, the electrostatic forces extend along a second reference axis that is perpendicular to the first reference axis.

In yet another embodiment, the flexing includes urging the portion of the flexible shell in a direction that is parallel to the second reference axis. The urging may include urging the portion of the flexible shell in first and second opposite directions that are parallel to the second reference axis. Mover, the urging may include urging the portion of the flexible shell in a first direction that is parallel to the second reference axis and the method may further include inhibiting flexure of the flexible shell in a second direction along the second reference axis. The first direction along the second reference axis may be opposite to the second direction along the second reference axis.

In addition to the exemplary aspects and embodiments described above, further aspects and embodiments will become apparent by reference to the drawings and by study of the following descriptions.

BRIEF DESCRIPTION OF THE DRAWINGS

FIG. 7A presents a simplified schematic illustration comparing a known circular DEA and a circular HASEL actuator according to an embodiment.

FIG. 7B presents plan views of the DEA and HASEL actuators of FIG. 7A to illustrate different area strains at different applied voltages.

FIG. 7C graphically illustrates the differences in area strain between the DEA and HASEL actuators of FIG. 7A at different applied voltages.

FIGS. 10A-10E illustrate two stacks of the donut-type actuators illustrated in FIGS. 9A-9B modified to serve as a gripping mechanism.

FIGS. 12A-12F illustrate an implementation of donut-type HASEL actuators that provides three-dimensional mobility by selectively redistributing a liquid dielectric throughout a ring-shaped deformable shell.

FIG. 18A schematically illustrates a planar-type actuator with and without an applied voltage and a load hung therefrom.

FIG. 18B graphically illustrate time histories for displacement, velocity, and acceleration for a two-unit planar-type actuator lifting a 700 g load.

FIG. 18C presents a plot of specific power during contraction for a two-unit planar actuator lifting a 700 g load.

FIG. 18D presents a plot of specific power during contraction for a single-unit planar actuator lifting a 1 kg load.

FIG. 22A graphically illustrates actuation strain of a peano-type actuator with different electrode types and supporting different loads.

FIG. 22B illustrates a peano-type actuator without and with an applied voltage and a load hung therefrom.

FIG. 22C illustrates a peano-type actuator without and with an applied voltage and a load hung therefrom.

FIG. 29 illustrates use of a planar-type actuator to power a robotic arm via an applied voltage and simultaneously sense a position of the arm via measuring a capacitance of the actuator.

FIG. 30A illustrates two peano-type actuators being used to actuate an arm to lift a ball.

FIG. 30B is similar to FIG. 30A but after the actuators have been operated to lift the arm and throw the ball into the air.

FIG. 30C is similar to FIG. 30A but at increasing applied voltage levels.

FIG. 33A is a peano-type actuator suspended in a colorful box.

FIG. 33B is similar to FIG. 33A but with the box partially filled with a liquid dielectric.

FIG. 33C is similar to FIG. 33B but with the box fully filled with the liquid dielectric and without a voltage being applied.

FIG. 33D is similar to FIG. 33C but with a voltage being applied.

FIGS. 39A-39C illustrate toroidal zipper-HASEL actuators.

FIG. 39D illustrates strain recorded per voltage under various loads.

FIGS. 40A-40F illustrate peano-HASEL actuators having zipping mechanisms.

FIGS. 43A-43C illustrate various geometric and mathematical considerations in actuator calculations.

DETAILED DESCRIPTION

Embodiments described herein include a novel class of soft actuators (e.g., for soft robotics applications), and methods for use and manufacturing of such soft actuators. The novel soft actuators are referred to herein as Hydraulically Amplified Self-Healing Electrostatic (HASEL) transducers (or actuators), and such HASEL transducers can provide high-performance, reliable, self-sensing, muscle-mimetic actuators that can overcome important limitations of current soft actuators. HASEL actuators use an electrohydraulic mechanism to combine the advantages of fluidic and electrostatic actuators. Use of liquid dielectrics can allow for harnessing hydraulic principles to scale actuation force and strain. A wide range of different modes of actuation can be achieved by pressurizing and displacing a hydraulic fluid inside of deformable structures. HASEL actuators can be designed to linearly elongate or contract upon application of voltage, and can feature three-dimensional mobility. Mechanical and electrical properties can be tuned independently. Additionally, HASEL actuators can be fabricated from a variety of materials and can be compatible with a large number of fabrication techniques.

In some embodiments, HASEL actuators are implemented as laminated structures consisting of electrode layers and a combination of solid and liquid dielectric materials. The layers form self-healing capacitors, which deform when a voltage is applied. Embodiments can sense deformation via a change in capacitance when the electrodes are deformed or displaced. In some embodiments, use of liquid dielectrics inside the soft electroactive structures can confer self-healing capabilities to HASEL actuators, as liquid dielectrics return to an insulating state after electrical breakdown events. The ability of HASEL actuators to fully recover from dielectric breakdown can be important for certain applications, such as for scaling up for use in large devices and for delivering large forces.

Some embodiments extend the HASEL actuator concepts to provide a new type of linearly-contracting electrostatic actuator that operates similar to pneumatic peano-artificial muscles, referred to herein as a peano-HASEL actuator. The peano-HASEL actuator can use electrodes to pump dielectric fluid into a pouch, creating a geometry change that produces linear contraction on the application of voltage. Peano-HASEL actuators can demonstrate the advantages of other HASEL actuators, while also being able to contract on activation. Some embodiments are compatible with common industrial production methods, which can permit quick adoption for various applications.

Figure 1A:
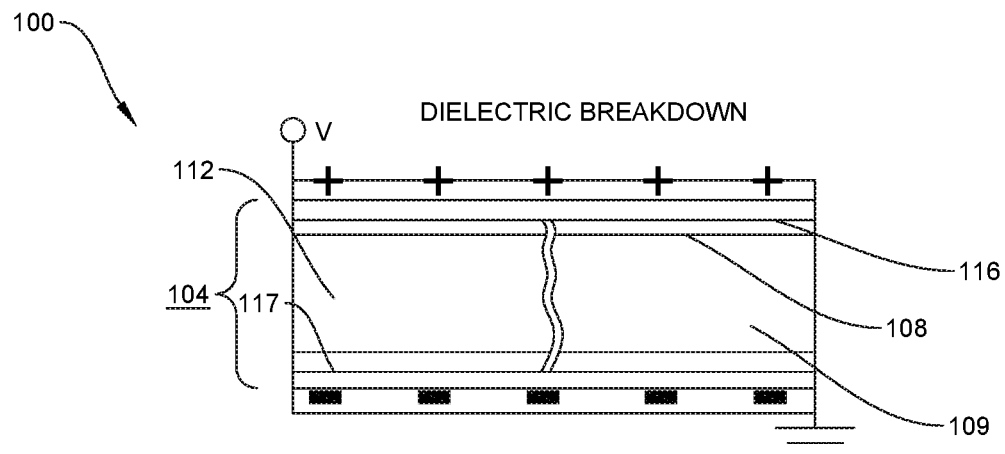
FIGS. 1A-1C present a simplified schematic illustration of a portion of a HASEL actuator to illustrate the self-healing nature of the transducer.
Figure 1B:
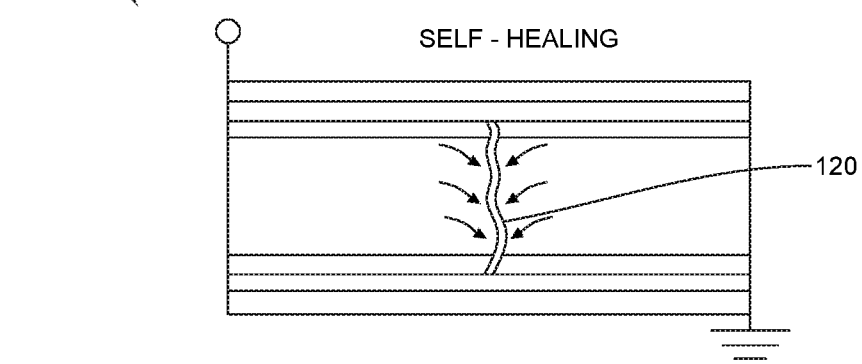
Figure 1C:
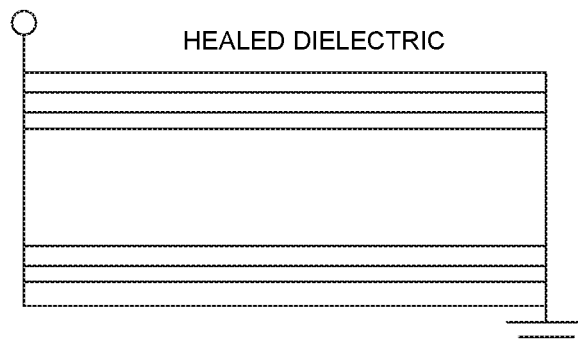

FIGS. 1A-1C show an illustrative layered structure 104 of a HASEL transducer 100 and the self-healing abilities conferred to the HASEL transducer 100 from the structure 104. As illustrated, the structure 104 includes a flexible shell 108 (e.g., stretchable or elastic, non-stretchable and inelastic but bendable) filled with a liquid dielectric 112 (e.g., oil). First and second stretchable, flexible, or rigid opposing electrodes 116, 117 can be placed on opposite sides of the shell 108. The first and second opposing electrodes 116, 117 may be any appropriate ionic or electronic conductors. The first and second opposing electrodes 116, 117 can be separated by the shell 108 and the liquid dielectric 112. The layered structure 104 forms a capacitor that is operable to store charge upon application of a voltage to the structure 104. In some arrangements, the shell 108 can serve as a solid dielectric of the capacitor. In any case, upon occurrence of a dielectric breakdown, the liquid dielectric 112 can refill a breach 120 caused by the discharge path, thus restoring insulating properties of the liquid dielectric 112. This property can allow the HASEL actuator 100 to self-heal from electrical damage, thereby increasing reliability and operational lifetime of the actuator 100.

Turning to FIGS. 2A-2E, a specific type of HASEL actuator 100 in the form of a donut-type HASEL actuator 200 is shown to illustrate conversion of electrical actuation to mechanical deformation. The donut-type actuator 200 includes a flexible shell or pouch 208 (e.g., elastically deformable) that defines an enclosed internal cavity 209, a liquid dielectric 212 contained within the enclosed internal cavity 209, a first electrode 216 disposed over a first side (not labeled) of the enclosed internal cavity 209, and a second electrode 217 disposed over an opposite second side (not labeled) of the enclosed internal cavity 209. For instance, the first and second electrodes 216, 217 may include respective first and second electrical leads 221, 223 to which a voltage (e.g., DC voltage) is configured to be applied. While the first and second electrodes 216, 217 are illustrated as being disposed on or over an outer surface (not labeled) of the shell 208 (e.g., the first electrode 216 being disposed over an upper or a first outer surface and the second electrode 217 being disposed over a lower or a second outer surface), other embodiments envision that the first and second electrodes 216, 217 could be disposed on or over an inner surface (not labeled) of the shell 208 (e.g., such that the first and second electrodes 216, 217 are in direct contact with the liquid dielectric 212). In a further embodiment, one of the first and second electrodes 216, 217 may be disposed over an inner surface of the shell 208 (e.g., on the inside of the internal cavity 209) and the other of the first and second electrodes 216, 217 may be disposed over an outer surface of the shell 208 (e.g., outside of the internal cavity 209). Regardless of whether the first and second electrodes 216, 217 are disposed inside or outside of the internal cavity 209, the first electrode 216 may be considered disposed over a first side of the internal cavity 209 and the second electrode 217 may be considered disposed over a second side of the internal cavity 209.

A surface area of the shell 208 over which the first and second electrodes 216, 217 are disposed comprises an active area 224 of the shell 208 and a surface area of the shell 208 over which the first and second electrodes 216, 217 are not disposed comprises an inactive area 228 of the deformable shell. While the active area 224 may be surrounded by the inactive area 228 as illustrated in the figures, other embodiments envision that the inactive area 228 may be surrounded by the active area 224. In any case, application of a voltage to or across the first and second electrodes 216, 217 (e.g., via the respective first and second electrical leads 221, 223) induces an electric field through the liquid dielectric 212 (e.g., and shell 208) to generate electrostatic forces that attract the first and second electrodes 216, 217 (where such electrostatic forces generally extend along a first reference axis 250). The generated electrostatic forces generate an electrostatic Maxwell stress on the active area 224 of the shell 204. Compare FIGS. 2A-2B. The electrostatic stress displaces the liquid dielectric 212 in the active area 224, thus generating hydrostatic pressure that acts on the shell 208 (e.g., in the inactive area 228) to urge the shell in one or more different directions so as to move the shell 208, stretch the shell 208, etc.

Stated differently, applying a voltage (e.g., high-voltage signal) across the electrodes 216, 217 generates an electrostatic force that causes the electrodes 216, 217 to attract or otherwise draw together, where the attraction displaces the liquid dielectric 212 in between the electrodes 216, 217 along a second reference axis 254 from the active area 224 into the inactive area 228, thus coupling electrostatic stress to fluidic pressure. The pressurized liquid dielectric 212 can deform (e.g., flex) the shell 208 (e.g., in the inactive area 228 in this embodiment) to perform mechanical work, such as lifting a load. For instance, the pressurized liquid dielectric 212 can, upon being forced into the inactive area 228, urge against the shell 208 to elastically deform the shell 208 in the inactive area 228, such as along a third reference axis 258 that is parallel to the first reference axis 250. Compare shape of inactive area 228 in FIGS. 2A, 2B, and 2D and also in FIGS. 2C and 2E. For instance, note how a thickness of the inactive area 228 increases while a thickness of the active area 224 decreases thus creating "out-of-plane" deformation of the structure. In one arrangement, the shell 208 may be inhibited from elastic deformation along at least a portion of the second reference axis 254 in any appropriate manner. For instance, note how the overall width of the actuator 200 remains constant in FIGS. 2A, 2B, and 2D.

Figure 2A:
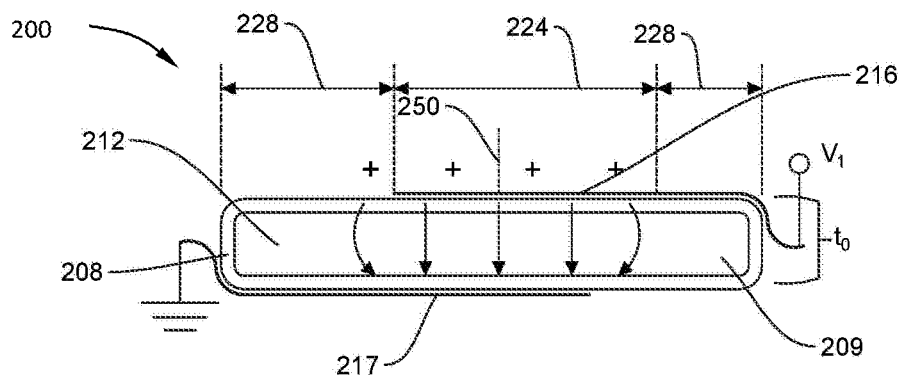
FIGS. 2A-2E illustrate a "donut" HASEL actuator, according to one embodiment.
Figure 2B:
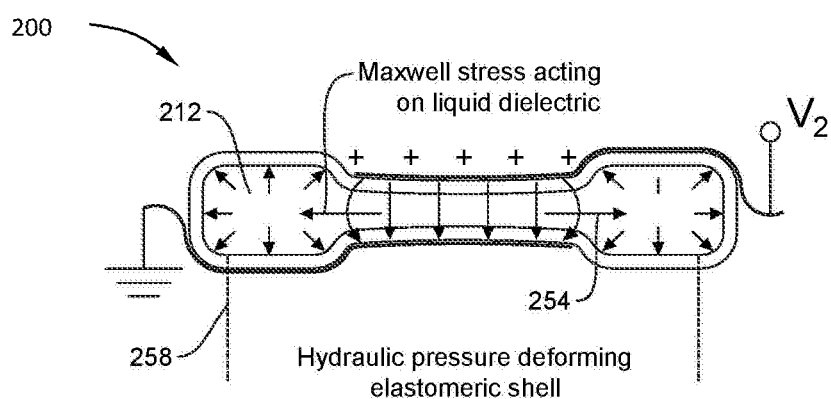
Figure 2C:
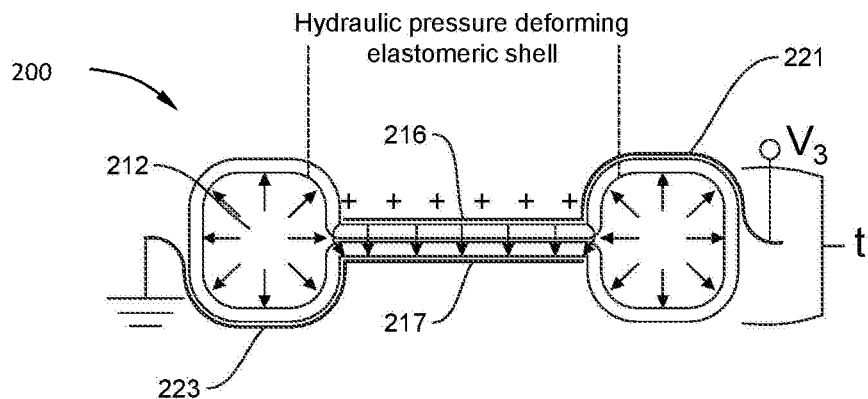
Figure 2D:
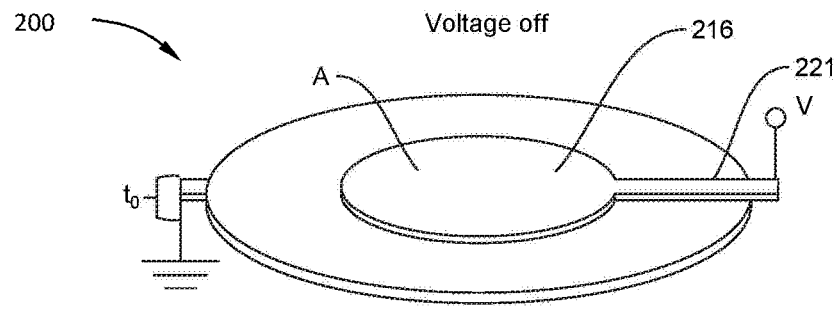
Figure 2E:
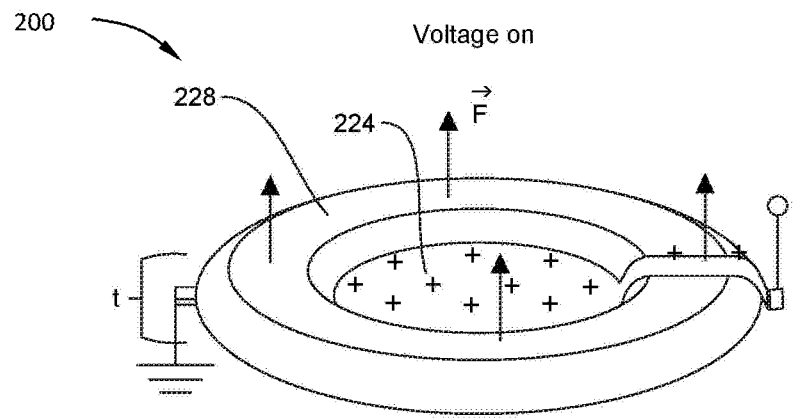
Figure 3:
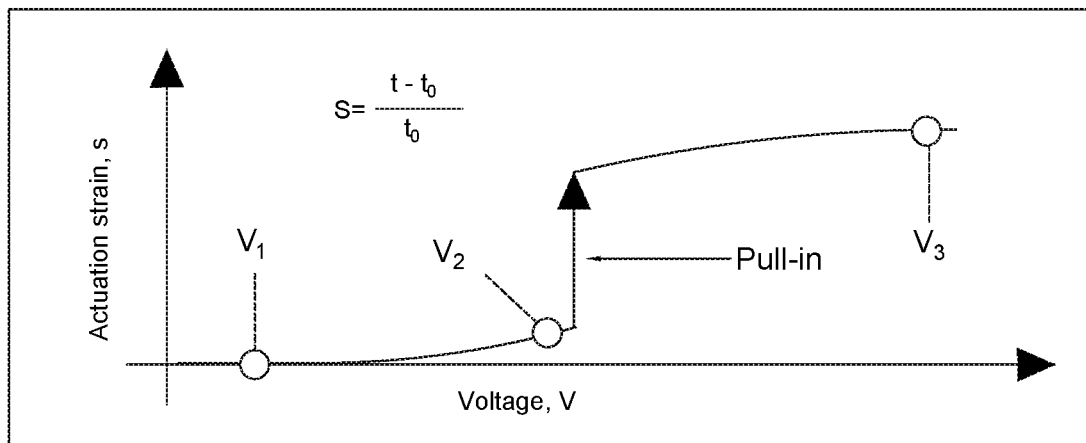
FIG. 3 graphically illustrates a pull-in transition of the electrodes of a HASEL actuator upon an increase in electrostatic force starting to exceed an increase in mechanical restoring force, causing the electrodes to abruptly pull together.

As illustrated, the actuator 200 can take a toroidal, or any other suitable shape. The ratio of the active area 224 to inactive area 228 can be adjusted for scaling force and strain according to hydraulic principles. It can be seen that as the applied voltage increases from V1 to V2, there is a small increase in actuation strain s. Compare FIGS. 2A and 2B and also FIG. 3. However, when the voltage surpasses a threshold V2 and increases to V3 for instance, the increase in electrostatic force starts to exceed the increase in mechanical restoring force (e.g., owing to the elasticity of the shell 208 and/or a load being applied to the shell 208), causing the first and second electrodes 216, 217 to abruptly pull together (see FIGS. 2D and 3); this is a characteristic feature of a so-called pull-in or snap-through transition. Pull-in transitions and other nonlinear behaviors are features of soft active systems that offer opportunities to improve actuation response or functionality and have been used to amplify the response of fluidic and dielectric elastomer (DE) actuators. After the pull-in transition, actuation strain further increases with voltage; this describes the pull-in instability that is shown in FIG. 3. Experimental data in FIGS. 6A and 6B reflects this behavior (e.g., that actuation strain is small until a sudden increase in strain occurs after a certain threshold).

Figure 4A:
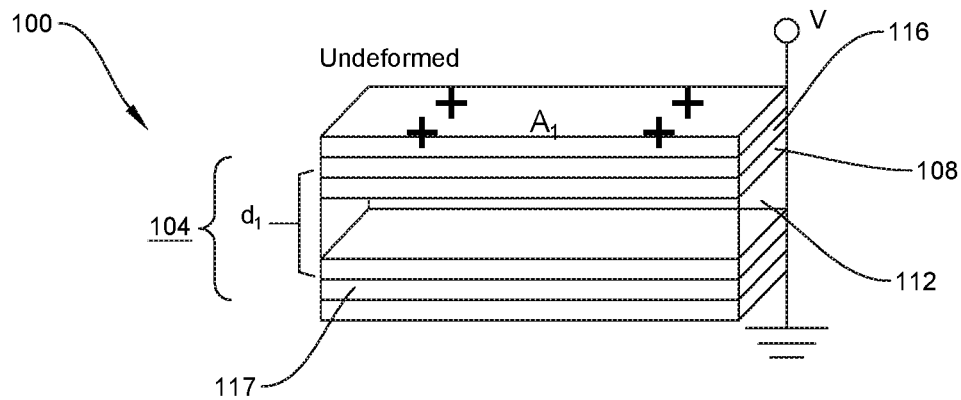
FIGS. 4A-4B illustrate non-deformed and deformed views of the HASEL actuator of FIGS. 1A-1C.
Figure 4B:
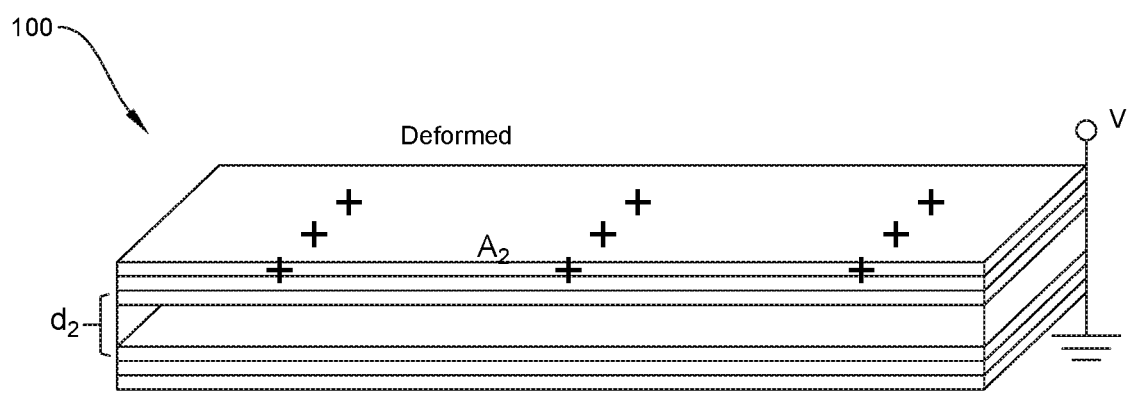

FIGS. 4A-4B illustrate how implementations of the layered structure 104 of HASEL actuators 100 can form a capacitor. Changes in capacitance can be proportional to the amount of displacement or deformation, which can be used for sensing and control. This property can allow HASEL actuators 100 to self-sense their state of deformation, providing a feedback mechanism to control the state of actuation. For example, driving and control electronics can make use of circuits that add a low amplitude alternating current (AC) signal to the high-voltage, direct-current driving voltage, and from there, can obtain the impedance of the circuits containing the deformable capacitors. Impedance data can then be readily converted to provide real-time information about strain of actuation for further use in control of actuator kinematics.

Figure 5A:
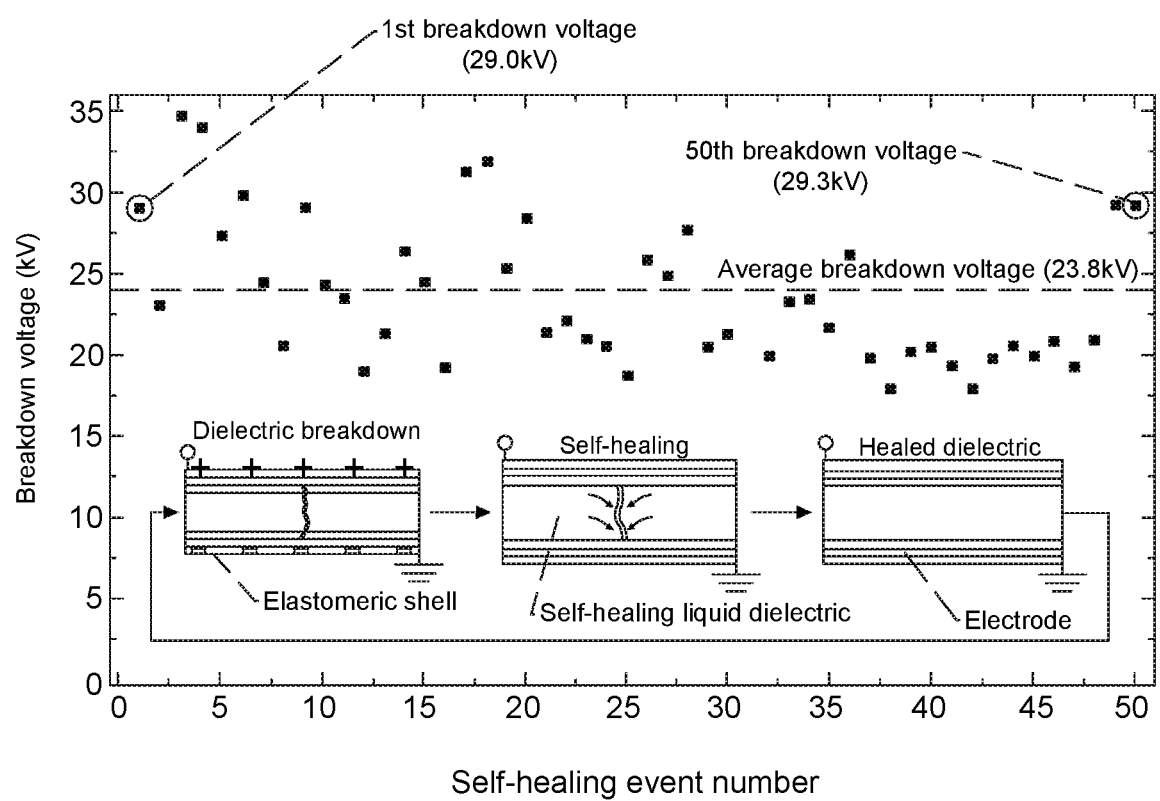
FIG. 5A graphically illustrates the self-healing nature of the donut-type HASEL actuator of FIGS. 2A-2E.
Figure 5B:
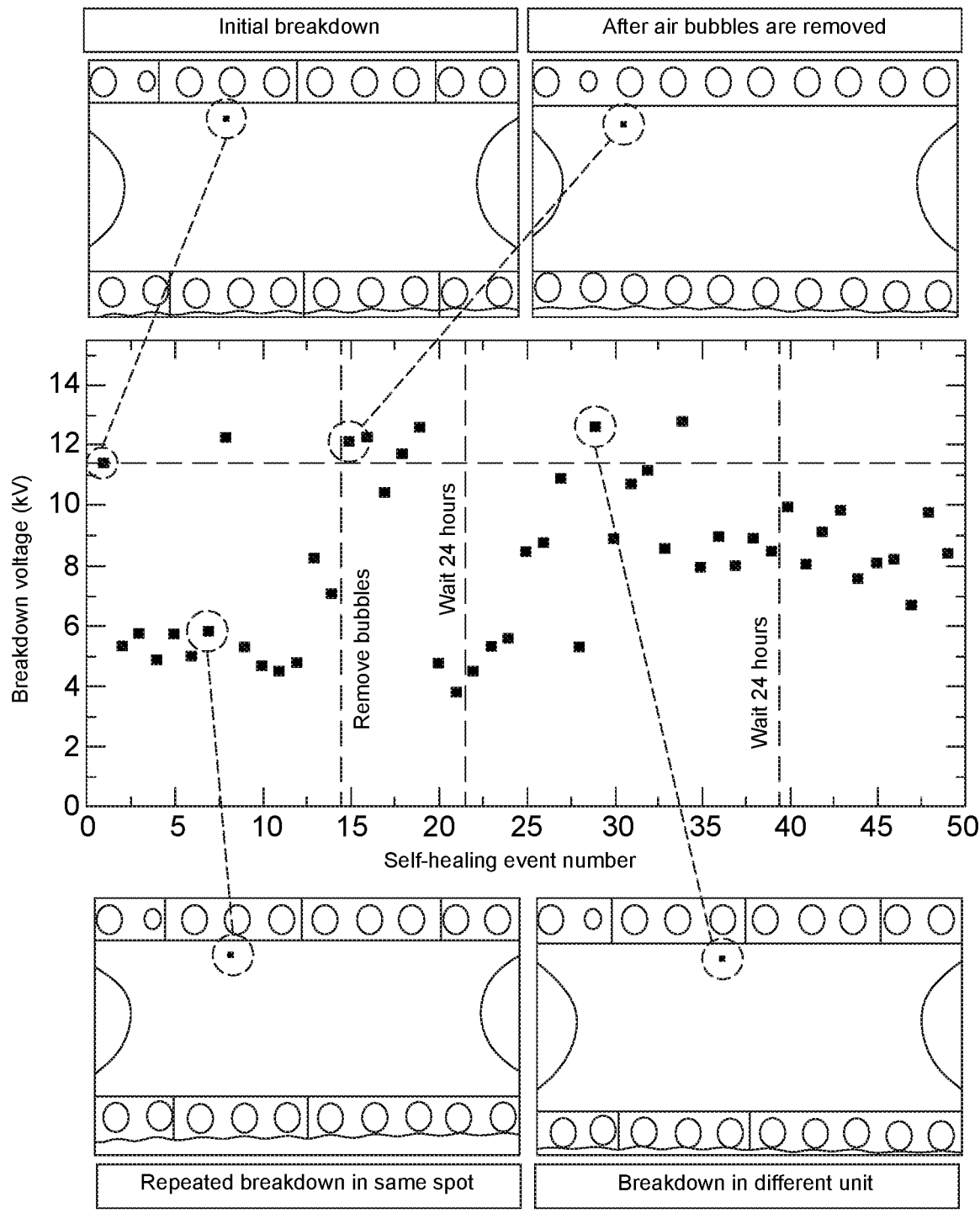
FIG. 5B graphically illustrates the self-healing nature of a "planar"-type HASEL actuator.

FIGS. 5A-5B further illustrate self-healing behaviors of HASEL transducers 100 (e.g., as described in FIGS. 1A-1C). Specifically, FIG. 5A shows self-healing of a portion of a donut-type actuator 200 with PAAm-LiCl hydrogel electrodes. As illustrated, a voltage ramp of 1 kV/s is applied until dielectric breakdown occurs, with a 10 second wait period after each breakdown event. The inset figure shows the sequence of events during self-healing tests. FIG. 5B shows self-healing of a planar-type HASEL actuator (similar to the actuator described below with reference to FIGS. 16A-16C). A linear voltage ramp at a rate of 0.5 kV/s was applied until dielectric breakdown occurred. After 1 minute, another linear voltage ramp was applied until dielectric breakdown. This was repeated for 50 cycles to evaluate the self-healing performance of a six-unit planar HASEL actuator. Gas bubbles formed after dielectric breakdown occurred (upper-left image). These bubbles have a lower breakdown strength, and electrical breakdown occurred in the same location but at lower voltages (lower-left image). After the gas bubbles were removed, electrical breakdown occurred at a higher voltage and in a different location (top-right image). Electrical breakdown can also occur at a different location and at voltage higher than initial breakdown voltage and without removing any gas bubbles (lower-right image). For the illustrated case, gas bubbles formed during electrical breakdown may be trapped in the area between the stretchable conductors, which may result in a low breakdown voltage (~5 kV). Removing the gas bubbles can restore the dielectric strength of the actuator. Some embodiments of the HASEL actuators may be fabricated with outer layers made from gas permeable elastomers, so that gas may be automatically purged from the liquid dielectric.

Figure 6A:
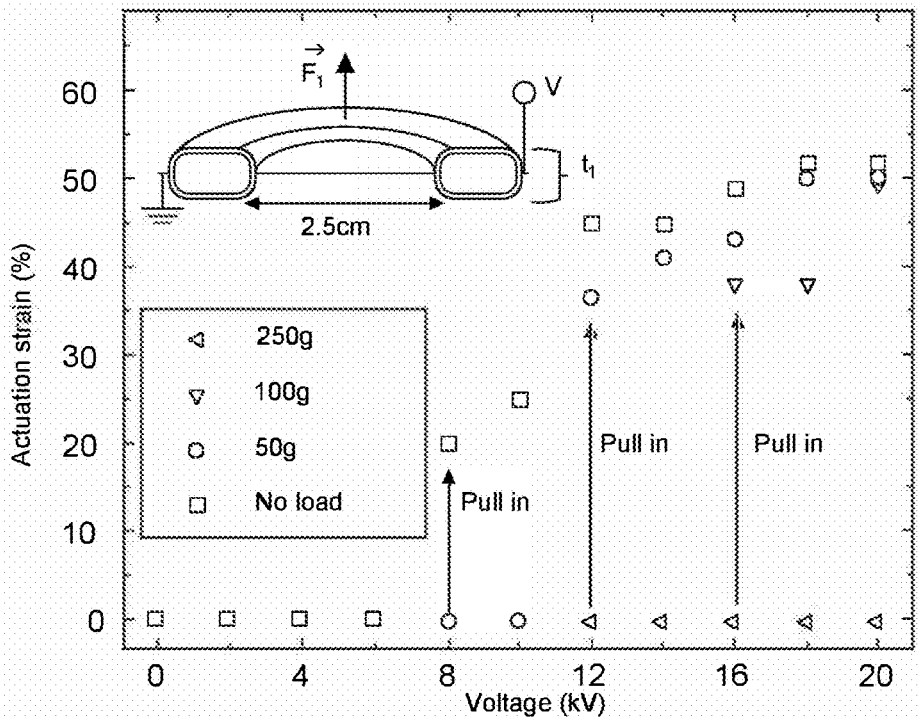
FIGS. 6A-6B present additional graphical illustrations of the pull-in instabilities of the donut actuator of FIGS. 2A-2E.
Figure 6B:
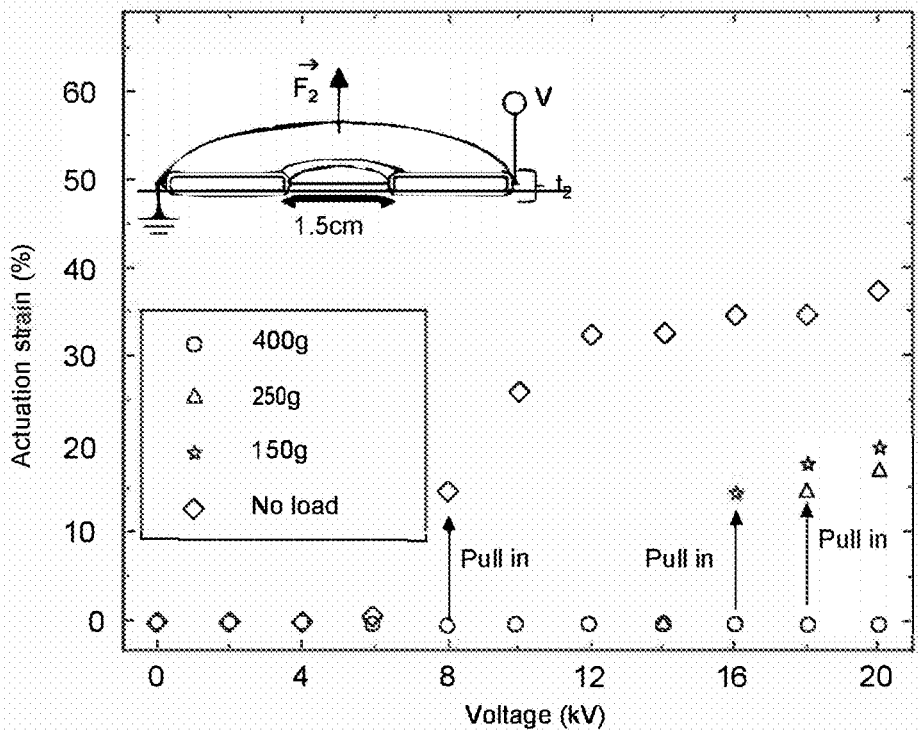

FIGS. 6A-6B further illustrate hydraulic behaviors of HASEL actuators 100 such as the donut-type actuators 200 described in relation to FIGS. 2A-2E. For the sake of illustration, two donut-type HASEL actuators 200 are shown in FIGS. 6A-6B, respectively, as fabricated with identical elastomeric shells and volume of liquid dielectric, but with different electrode areas relative to the diameter of the pouch (the shells, liquid dielectric, and electrodes not labeled in the interest of clarity). As shown, varying the electrode area in this way can tune the strain and force of actuation. FIG. 6A shows linear strain as a function of applied voltage under various loads for a first donut-type HASEL actuator with an electrode diameter of 2.5 cm. This actuator achieves relatively large strains, but generates relatively low force. FIG. 6B shows linear strain as a function of applied voltage under various loads for a donut-type HASEL actuator with 1.5 cm diameter electrodes. This actuator generates relatively large forces, but achieves relatively low strains. In both cases, an electromechanical pull-in instability can be observed, as indicated by a sudden jump in linear strain. This pull-in instability can be harnessed to create unique modes of nonlinear actuation in certain implementations.

Some embodiments use a laminated structure of liquid and solid dielectrics to independently tune mechanical and electrical properties of HASEL actuators 100 to suit particular applications. FIGS. 7 A-7C illustrate tuning of HASEL actuator 100 properties in context of a HASEL actuator 100 designed to resemble a circular DEA, so that the two actuator implementations can be compared. The illustrated HASEL actuator 100 expands biaxially under an applied voltage. Both the illustrative DEA actuator and the illustrative HASEL actuator 100 may have the same total dielectric thickness (t) and comparable overall dielectric strength. However, as illustrated in FIGS. 7A-7B, about one third of the HASEL dielectric consists of a liquid dielectric (e.g., the HASEL actuator has a liquid dielectric thickness (t_liq) equal to one third of the overall thickness t). Because the liquid dielectric layer generally does not resist deformation (e.g., shear), the circular HASEL actuator is overall much softer at a comparable dielectric strength, and thus deforms at significantly lower voltages as compared to the circular DEA actuator. FIG. 7C shows a plot of area strain as a function of voltage for the circular HASEL and circular DEA implementations. For example, at 11 kV, the HASEL actuator 100 shows 46% area strain, while the DEA actuator shows 12% area strain. Varying the ratio of t to t_liq can achieve different amounts of stress and strain for a given voltage.

Figure 8A:
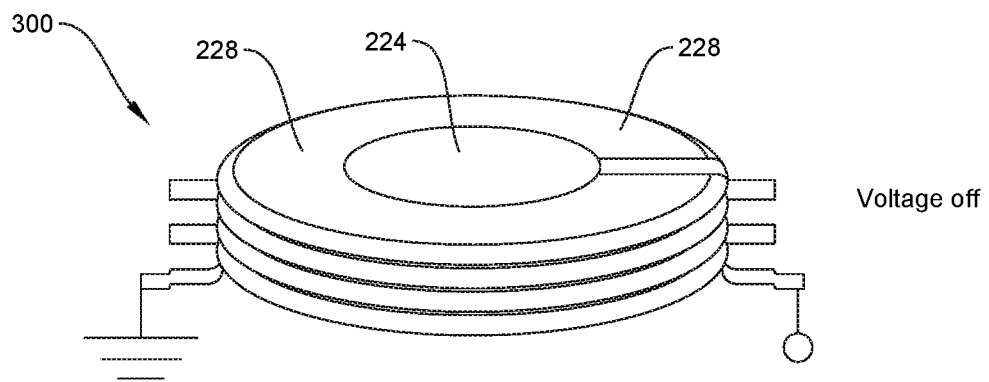
FIGS. 8A-8C schematically illustrate a stack of the donut-type actuators of FIGS. 2A-2E without and with an applied voltage.
Figure 8B:
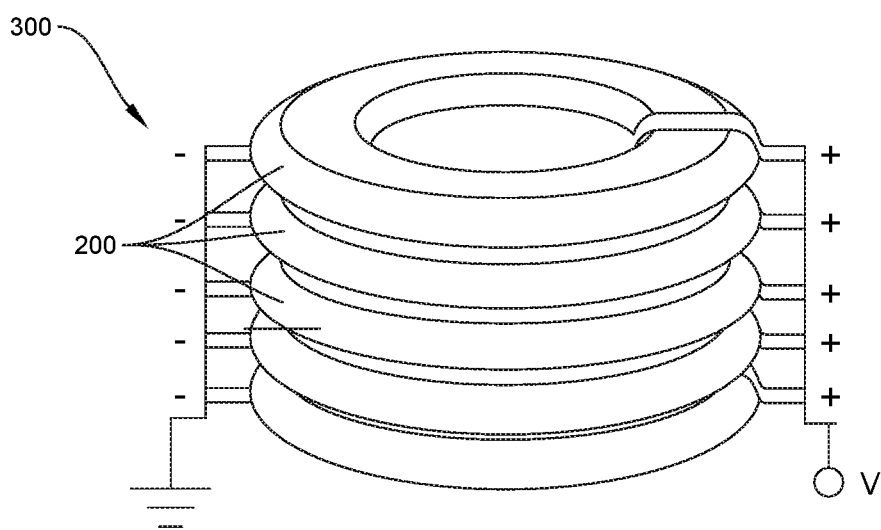
Figure 8C:
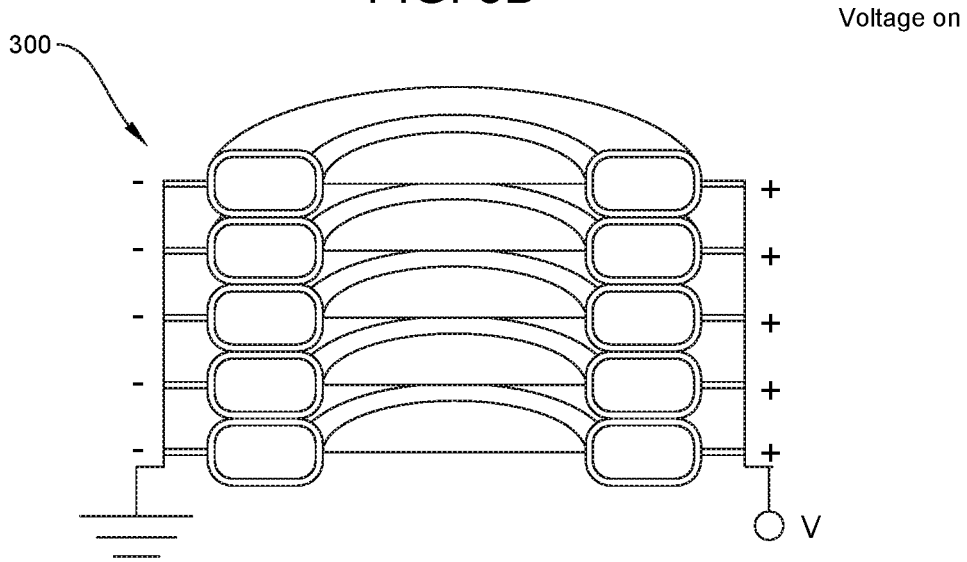

Different performance characteristics of the donut-type HASEL actuators 200 can be altered by varying the arrangement of the actuators 200; arrangement of the electrodes 216; geometry, material, and/or thickness of the shell 208; the volume of liquid dielectric 212 inside the shell 208; and/or other parameters. For example, the shell 208 can be made out of elastomers or flexible plastics to achieve specific actuation responses, and the frequency response of the actuator 200 can vary depending on the viscosity of the liquid dielectric 212, the overall size of the actuator 200, etc. As one example, FIGS. 8A-9B show that the overall stroke of actuation can be increased by stacking donut-type HASEL actuators 200 to create a stack 300. Specifically, FIGS. 8A-8C show the relaxed state (without an applied voltage in FIG. 8A) and an activated state (with an applied voltage in FIGS. 8B-8C) of a stack 300 of five donut-type HASEL actuators 200. As shown, the active areas 224 of adjacent actuators 200 in the stack 300 may overlap and the inactive areas 228 of adjacent actuators 200 in the stack 300 may overlap. In other embodiments, however, active and inactive areas 224, 228 of adjacent actuators 200 in the stack 300 may overlap or partially overlap.

Figure 9B:
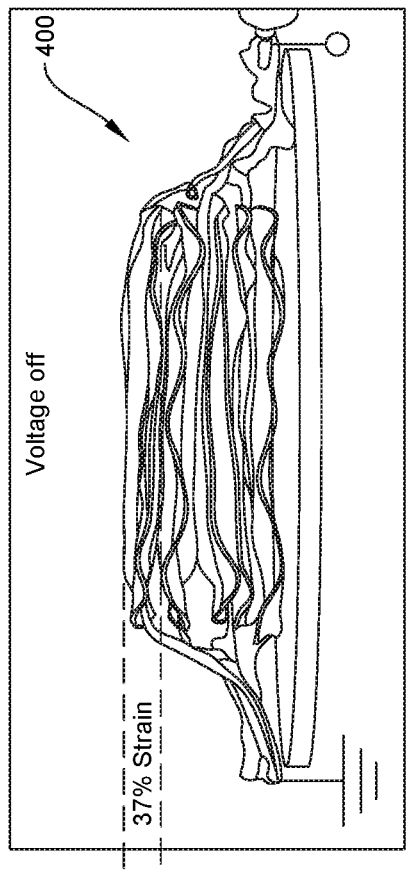
FIGS. 9A-9B illustrate a stack of the donut-type actuators of FIGS. 2A-2E without and with an applied voltage.
Figure 9A:
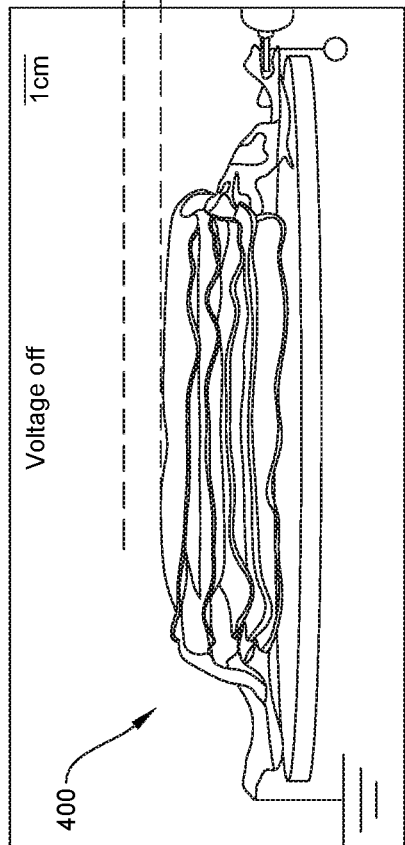

In one arrangement, all of the first electrodes 216 may be electrically interconnected in parallel and all of the second actuators 217 may be electrically interconnected in parallel. In another arrangement, all of the first electrodes 216 may be electrically interconnected in series and all of the second actuators 217 may be electrically interconnected in series. FIGS. 9A-9B show an experimental result of the arrangement of FIGS. 8A-8C (e.g., a stack 400 of five donut-type HASEL actuators, each having an electrode diameter of 2.5 cm). In one arrangement, the stack 400 achieved 37% linear strain, which is comparable to linear strain achieved by biological muscle and corresponds to an actuation stroke of 7 mm (FIG. 2B). Hydraulic pressure is generated locally in each donut-type actuators 200, and liquid dielectrics 212 (not labeled) are displaced over short distances, allowing for high-speed actuation. The stacked actuators readily showed large actuation response up to a frequency of at least 20 Hz. While not illustrated, one or more objects could be disposed on top of the stack 300 and moved upwardly and downwardly upon application of a voltage to the stack 300 and removal of the voltage from the stack 300.

FIGS. 10A-10B illustrate how two of the stacks 400 can be modified to create a gripping mechanism 500 (e.g., a "soft gripper"). As shown, the actuators within each of first and second stacks 400$_1$, 400$_2$ may be constrained in any appropriate manner on one side to produce a tilting motion. For instance, each actuator may be constrained so that liquid dielectric may only flow into one half of the inactive area upon application of the voltage. When a DC voltage was applied to the first and second stacks 400$_1$, 400$_2$, the device 500 grasped delicate objects such as a raspberry 504 (see FIGS. 10A-10C) and a raw egg 508 (see FIGS. 10D-10E).

Figure 11A:
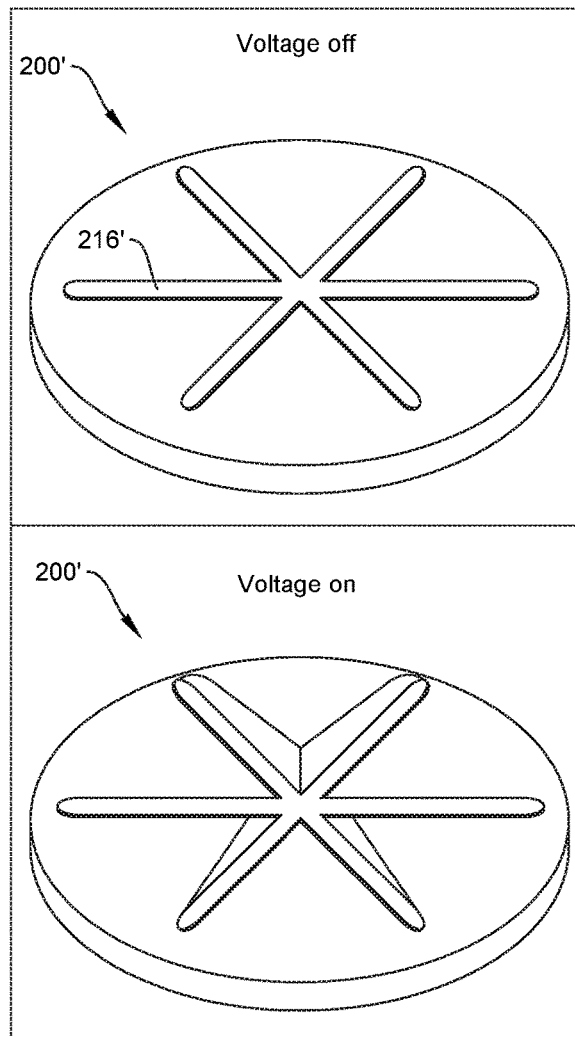
FIGS. 11A-11B illustrate two different shapes for donut-type actuators that can exhibit different behaviors because of different electrode layouts.
Figure 11B:
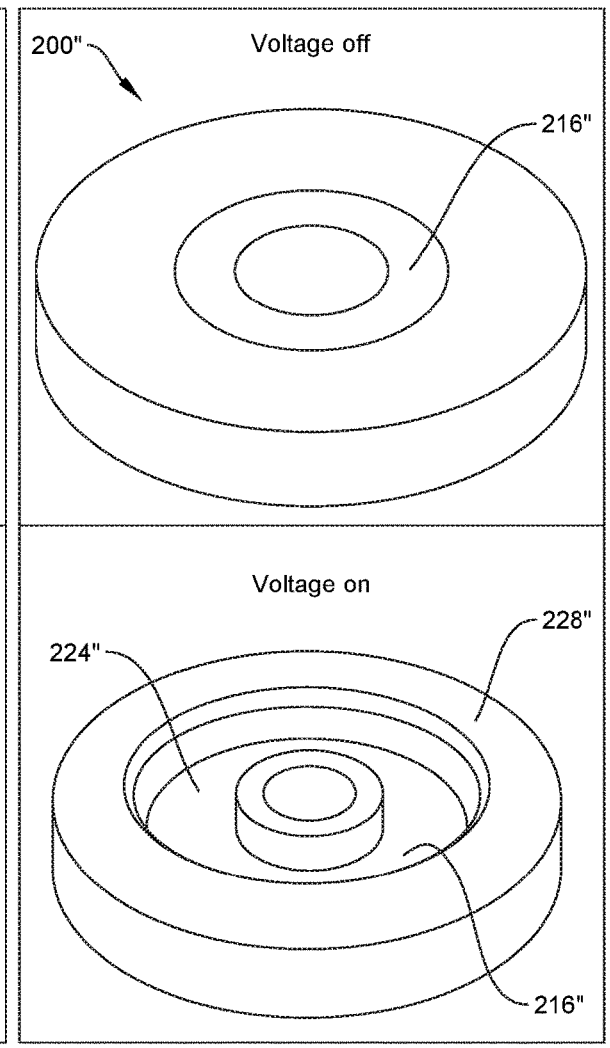

As another example of impacting performance of the actuators by altering parameters, FIGS. 11A-11B illustrate two different shapes for donut-type HASEL actuators 200 that can exhibit different behaviors because of different electrode layouts. In particular, FIG. 11A shows an illustrative donut-type HASEL actuator 200' with an asterisk-shaped electrode layout both without and with an applied voltage while FIG. 11B shows an illustrative donut-type HASEL actuator 200" with an annulus-shaped electrode layout both without and with an applied voltage. In FIG. 11B, it can be seen how the active area 224" may be surrounded by one portion of the inactive area 228" while another portion of the inactive area 228" may be surrounded by the active area 224".

As another example of impacting performance of the actuators by altering parameters, FIGS. 12A-12F illustrate an implementation of a donut-type HASEL actuator 200''' that can provide three-dimensional mobility. The illustrated donut-type HASEL actuator 200''' a is configured to selectively redistribute a liquid dielectric 212''' throughout a ring-shaped deformable shell 208''', thereby conferring three-dimensional mobility to the actuator 200'''. The ring-shaped volume of liquid dielectric 212''' may be surrounded by an insulating skirt 211''', with opposing electrode pairs (e.g., 216$_1$'''/217$_1$''', etc.) spaced along the surface of the shell to create a plurality of active areas 224$_1$''', 224$_2$''', 224$_3$''' spaced by inactive areas 228$_1$''', 228$_2$''', 228$_3$'''. While three active areas 224''' and three inactive areas 228''' are illustrated, it is to be understood that more or fewer such areas may be included.

By selectively activating electrode pairs, the actuator 200''' may redistribute liquid dielectric 212''' to different regions of the internal cavity 209''' of the shell 208'''. For instance, displacing the liquid dielectric 212''' from one side of the internal cavity 209''' to the other may cause the actuator 200''' to tilt (e.g., by displacing liquid dielectric from the active areas 224$_1$''' into the inactive areas 228 and the active areas 224$_2$''', 224$_3$'''). This tilting mechanism can be tuned by precise activation of the electrode pairs, for example. For example, FIG. 12B shows a rest state for the specific implementation having three electrode pairs. As illustrated in FIG. 12D, charging a given pair of electrodes (e.g., electrodes 216$_1$''', 217$_1$''') causes local compression which results in an overall tilt of the actuator 200''' from the normal axis 270. A high-voltage connection may be made with electrode 216$_1$''' and a ground connection may be made with electrode 217$_1$'''. In some implementations, all electrode pairs can be activated at once, causing a change in the overall thickness of the actuator 200'''. As illustrated in FIGS. 12C, 12E, and 12F, such donut-type HASEL actuators 200''' can be stacked into a stack 600 to achieve further degrees of three-dimensional mobility. For example, as illustrated by the cross-section of the actuated stack 600 shown in FIG. 12F, electrical connections can be routed through the center of the stack 600. Again, different modes of actuation can be achieved by varying material selection and geometry, and/or other properties.

Figure 13:
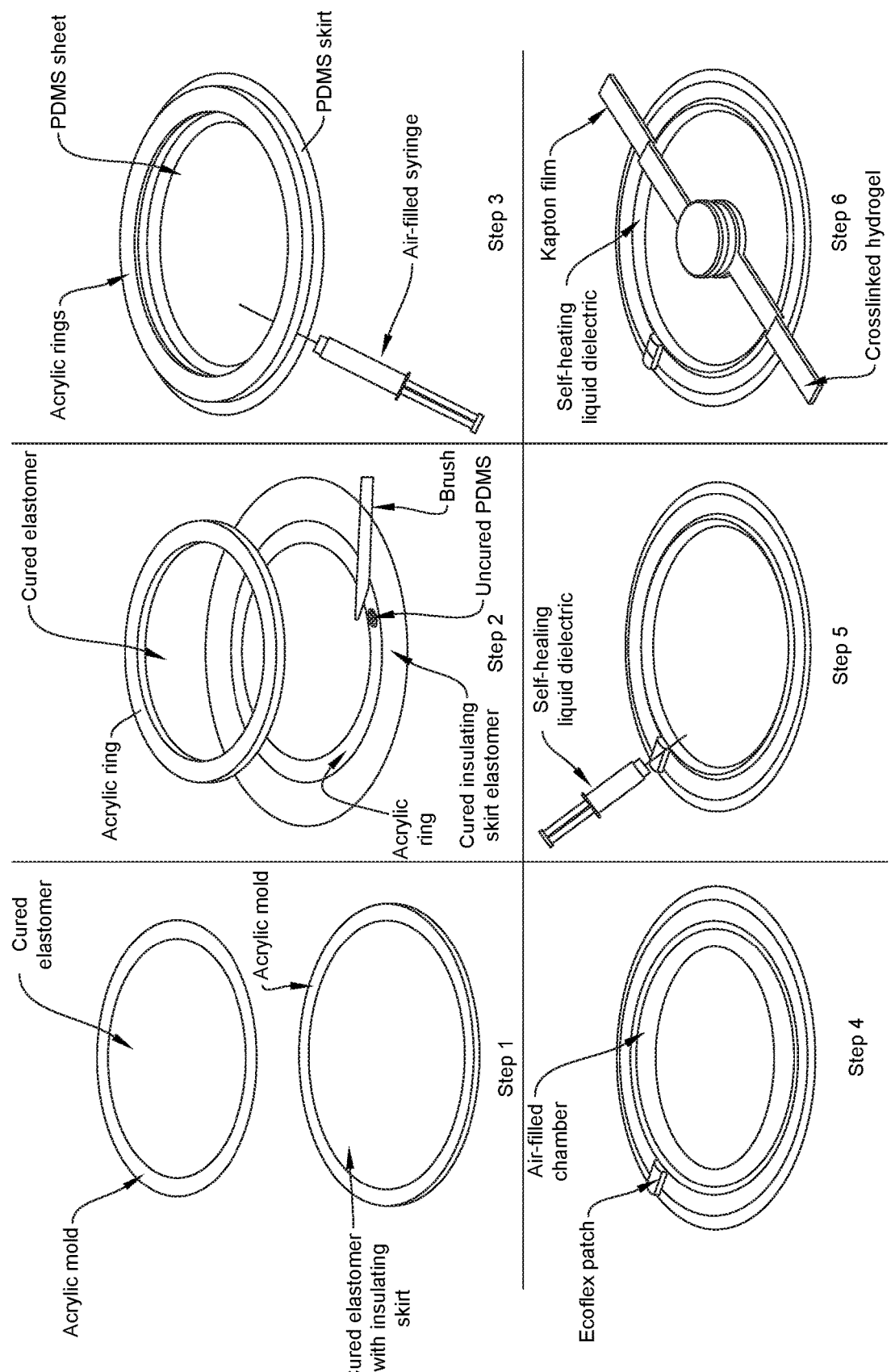
FIG. 13 illustrates a process of manufacturing the donut-type actuators of FIGS. 2A-2E.

FIG. 13 shows an illustrative process for fabricating donut-type HASEL actuators 200, according to one embodiment. In Step 1, first and second sheets of elastomeric material (e.g., for use in forming the shell 208) may be provided. For instance, this step may include casting 0.3 mm thick Polydimethylsiloxane (PDMS) sheets using acrylic molds. One sheet may have a first diameter (e.g., 6 cm) and the other sheet may have a larger diameter (e.g., 8 cm). The larger sheet may act as an insulating skirt (e.g., skirt 211''' in FIG. 12A) to reduce dielectric breakdown through air. In Step 2, each sheet may be aligned concentrically with a respective ring member (e.g., acrylic ring). A bonding agent (e.g., uncured PDMS) may be applied to the areas or portions of the sheets that overlap the ring members. For instance, the bonding agent may be applied over respective first surfaces of the sheets and then the first surfaces of the sheets may be placed together into contact. The two halves may then be clamped together, such as by clamping the ring members together. In Step 3, a gas (e.g., air) may be injected between the first and second sheets such as by inserting a needle of a syringe between the two halves to inflate the shell. The clamped sheets may then be cured together to cure the bonding agent (e.g., such as in an oven at 75° C. for 30 minutes). In Step 4, the ring members may be removed. In one arrangement, a patch (e.g., Ecoflex patch) may be applied to the sheets to serve as a fill port. In Step 5, the gas may be removed from the shell and the shell may then be filled with a liquid dielectric (e.g., via inserting a needle through the patch and injecting with the liquid dielectric, such as 4 ml of the liquid dielectric, e.g., Envirotemp FR3 transformer oil). In Step 6, flexible electrodes (e.g., circular flexible electrodes, such as Polyacrylamide-lithium chloride (PAM-LiCl) hydrogel on Kapton film) may be placed on either side of the shell (e.g., with the Kapton film facing outward).

Figure 14:
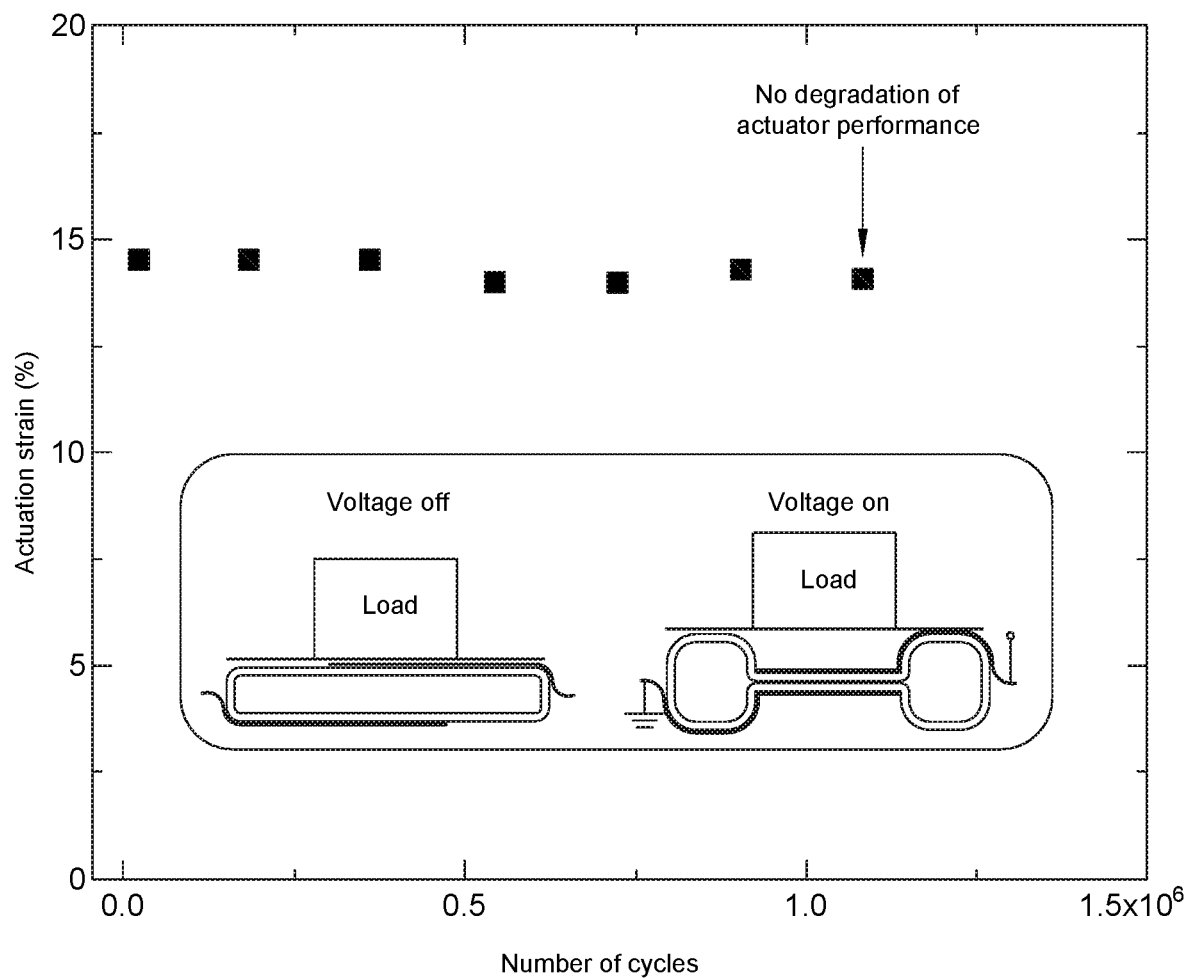
FIG. 14 graphically illustrates a cycle life of the donut-type actuators of FIGS. 2A-2E.

In relation to FIG. 14, donut HASEL actuator 200 was actuated with 18 kV at 5 Hz using a reversing polarity waveform. Under an applied load of 150 g, the actuation strain of the device does not noticeably diminish over the course of 1.08 million cycles.

Figure 15A:
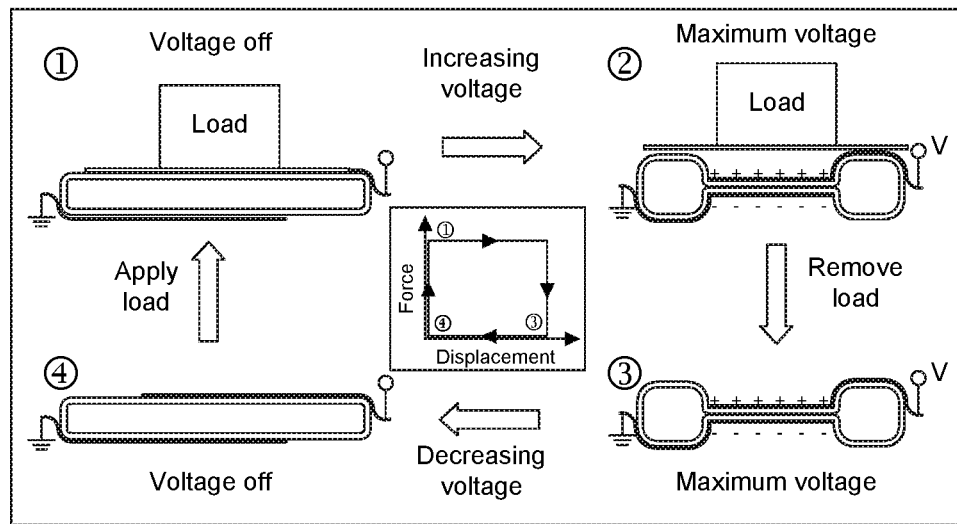
FIG. 15A illustrates an actuation cycle of a donut-type actuator for use in measuring electromechanical efficiency of the actuator.
Figure 15B:
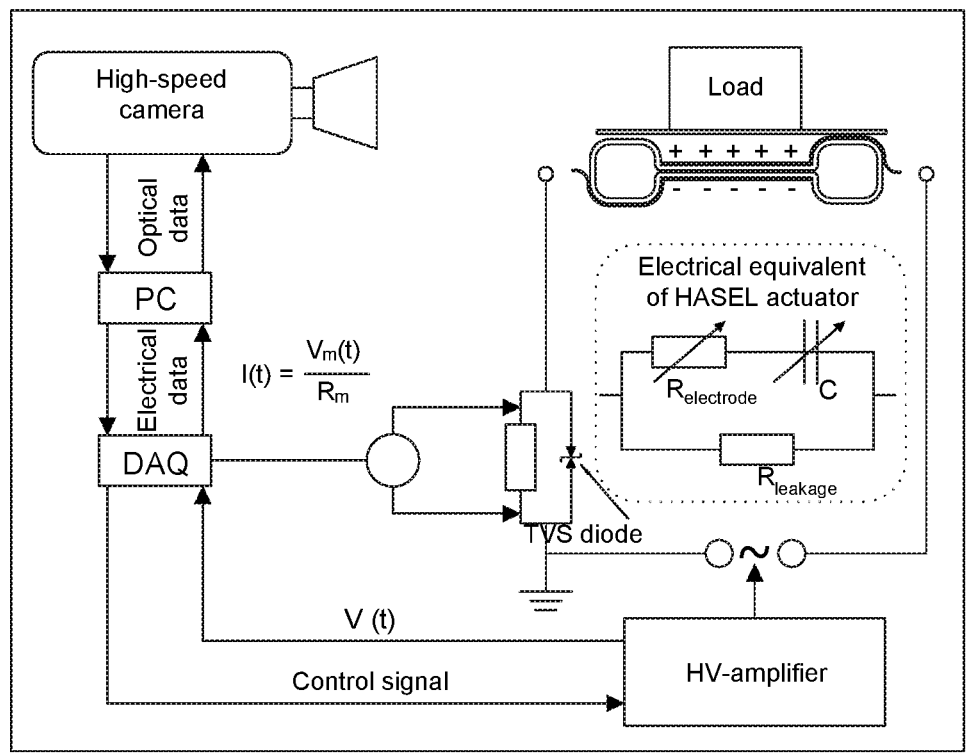
FIG. 15B illustrates an experimental setup for measuring the electromechanical efficiency of the actuator in FIG. 15A.
Figure 15C:
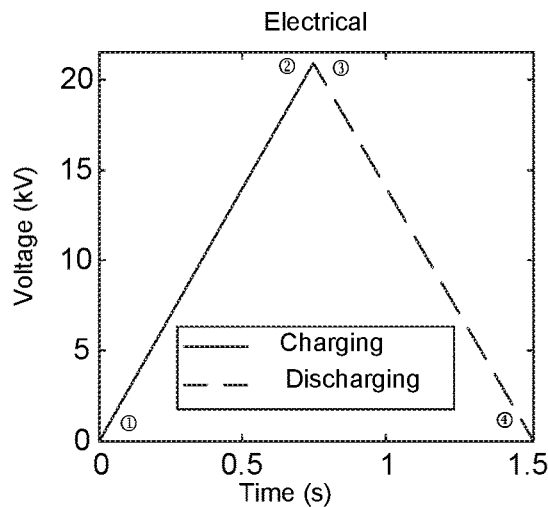
FIGS. 15C-15I graphically illustrate various electrical measurements for the actuation cycle of FIG. 15A.
Figure 15G:
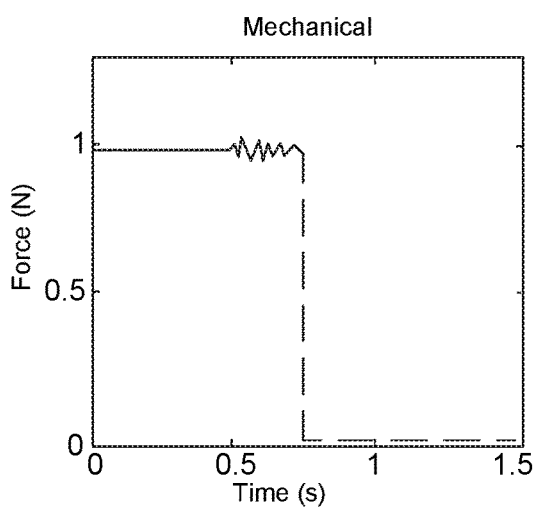
Figure 15D:
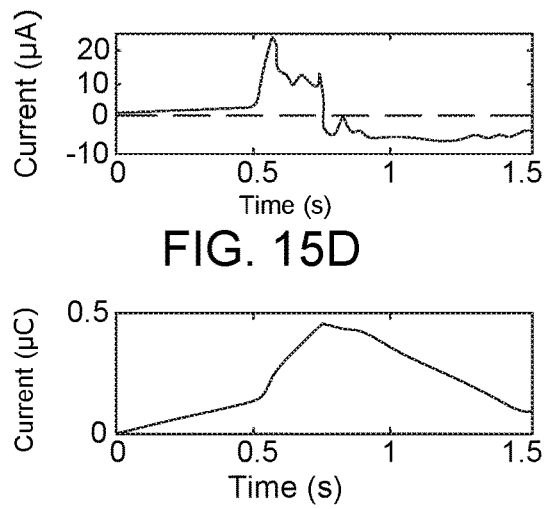
Figure 15E:
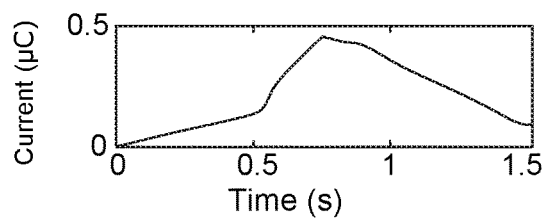
Figure 15H:
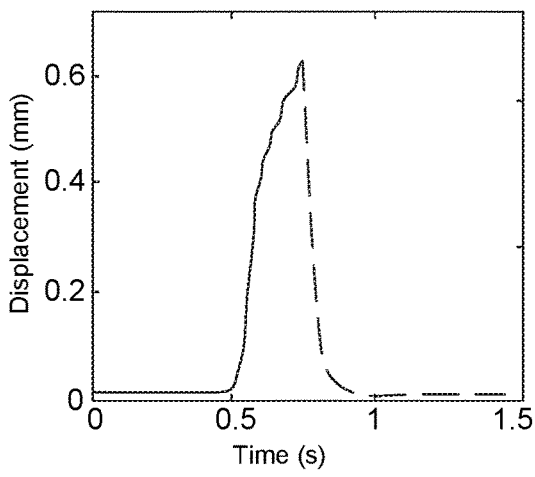
Figure 15F:
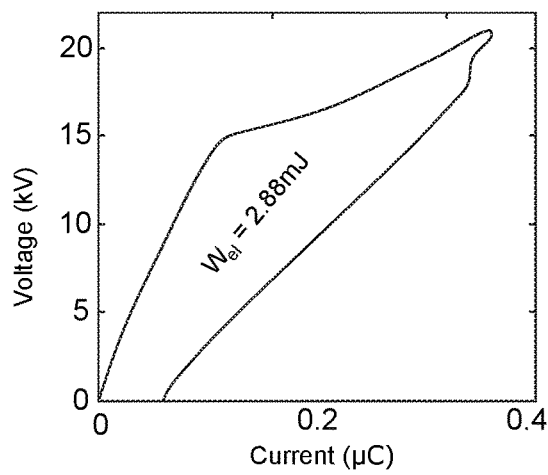
Figure 15I:
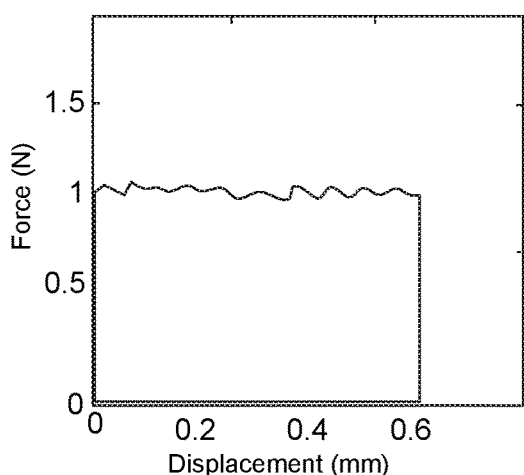

FIG. 15A illustrates a representative process for measuring closed loop electromechanical efficiency of HASEL actuators (e.g., donut-type actuators 200). FIG. 15B illustrates a representative experimental setup for measuring efficiency. As shown, a high-speed camera was used to record displacement, y(t) (e.g., change in thickness of the inactive area 228). A digital acquisition (DAQ) unit sent a control signal to the HV-amplifier and recorded voltage, V(t), and current I(t). Electrical energy was calculated using voltage and current measurements. FIGS. 15C-15I graphically represent various electrical measurements for the actuation cycle of FIG. 15A. In FIG. 15C, voltage was applied as a symmetric triangular pattern with maximum voltage of 21 kV and period of 1.5 s. In FIGS. 15D-15E, a sudden increase in current and a change in the slope of charge indicates pull-in transition of the donut HASEL actuator. In FIG. 15F, total electrical energy consumed was 2.88 mJ. In FIGS. 15G-15I, time histories of mechanical variables during actuation were recorded for the same cycle. Total mechanical work or energy output was 0.59 mJ. Electromechanical efficiency for the cycle was 21%.

Figures 16A, 16B, 16C:
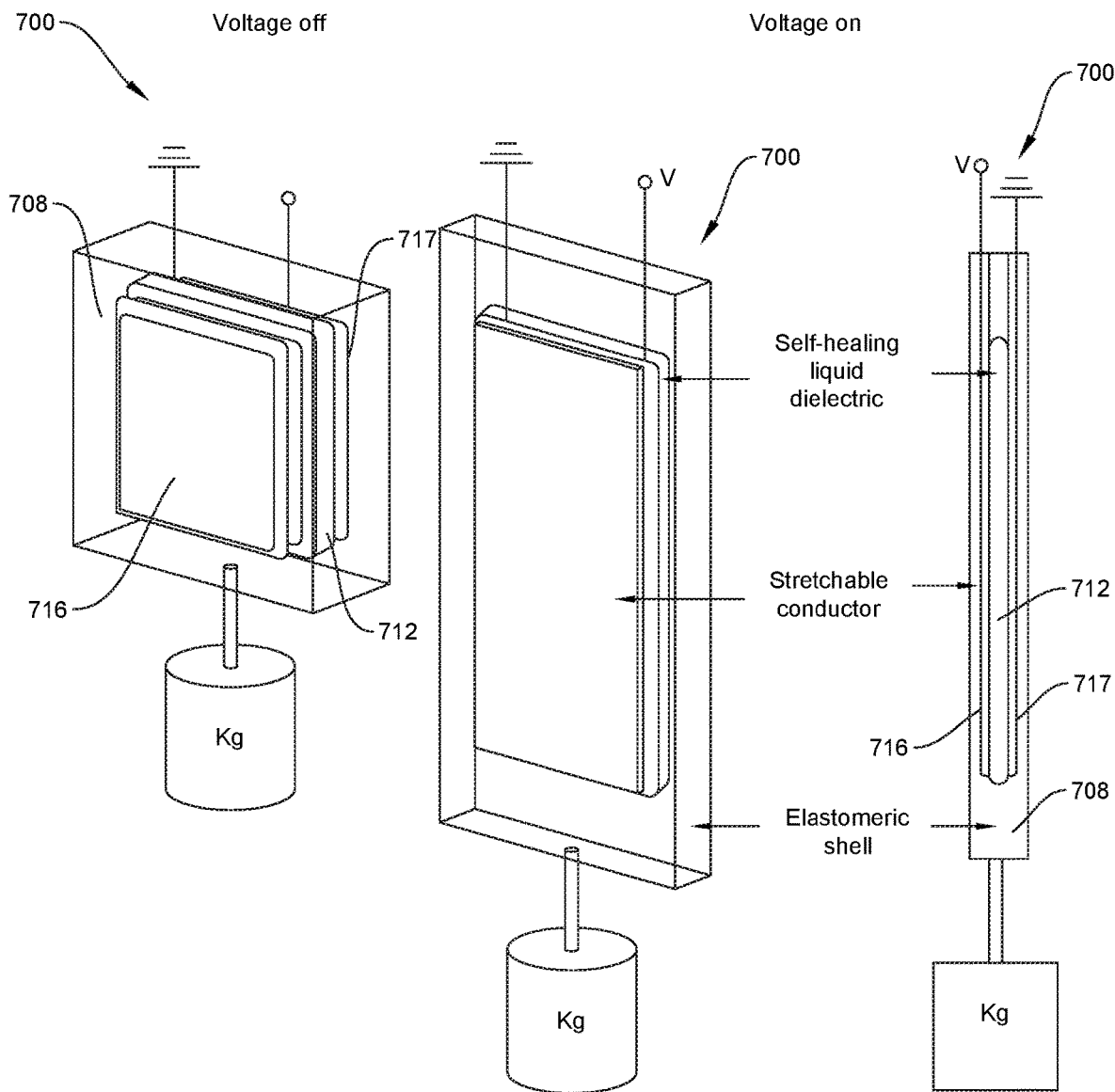
FIGS. 16A-16C schematically illustrate the planar-type actuators of FIG. 5B without and with an applied voltage.

Another category of HASEL actuators 100 is planar-type HASEL actuators 700 as illustrated in FIGS. 16A-16C. As shown, a planar-type HASEL actuator 700 may include an elastomeric shell 708 containing a liquid dielectric layer 712. First and second stretchable conductors 716, 717 may cover most or all of the region containing the liquid dielectric 712. When voltage is applied, electrostatic stress deforms the dielectric structure to achieve actuation modes including, for instance, uniaxial and biaxial deformation. As the first and second electrodes 716, 717 may cover the entire area of the liquid dielectric 712, the entire actuator 700 may contract in thickness and expand in length in response to an applied voltage. To achieve uniaxial deformation, the actuator 700 may be pre-stretched and constrained in the width direction and a load may be applied in the length direction as shown in FIGS. 16A-16B. When voltage is applied across the electrodes, the dielectric thickness (the dielectric thickness extending across the page in FIG. 16C) is reduced and the actuator 700 expands linearly, moving the load downwards. When the voltage is turned off, the stored elastic energy of the deformed shell 708 causes the actuator 700 to return to its original shape and length.

Figure 17A:
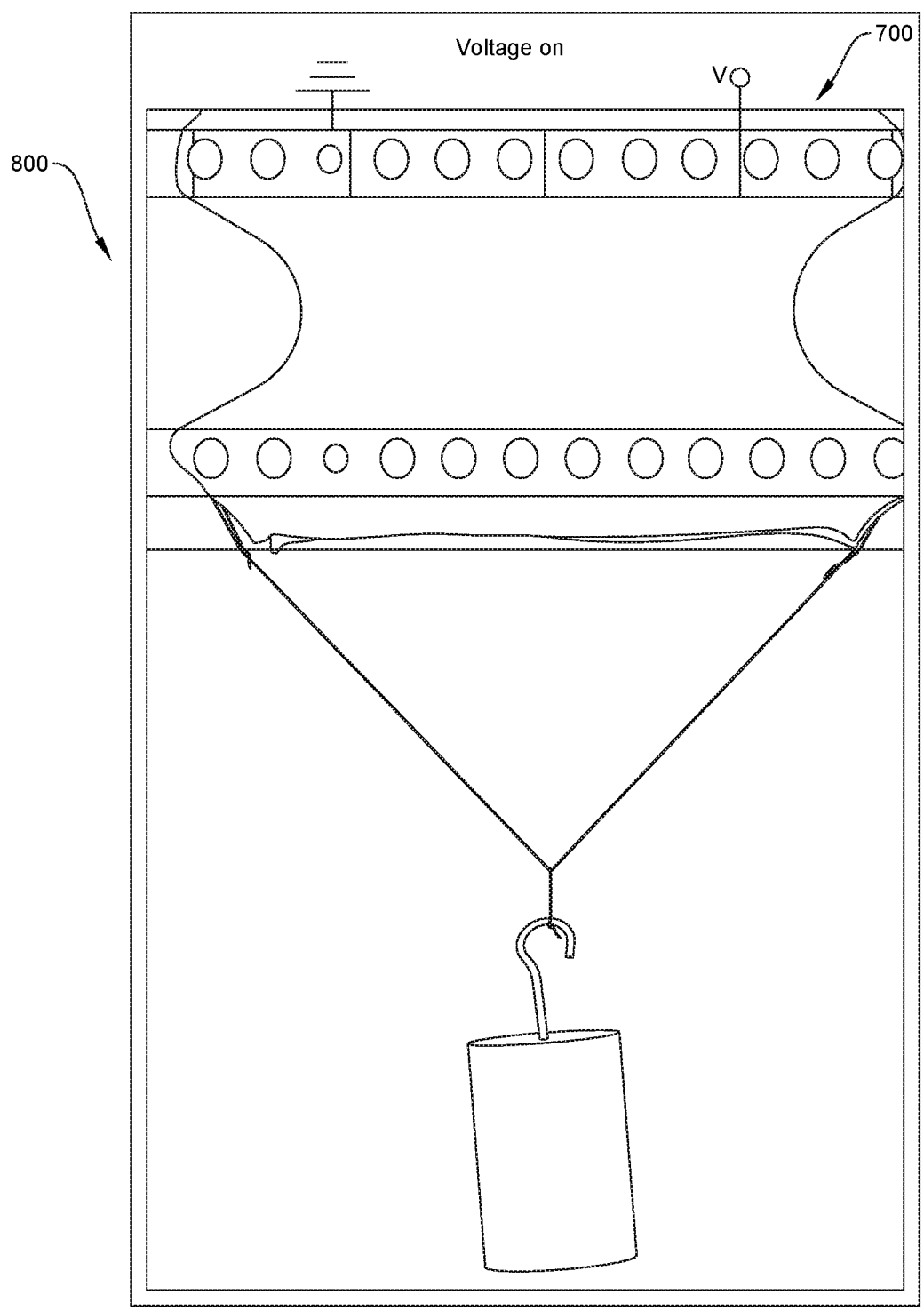
FIG. 17A illustrates a planar-type actuator with an applied voltage and a 500 g weight hung therefrom.
Figure 17B:
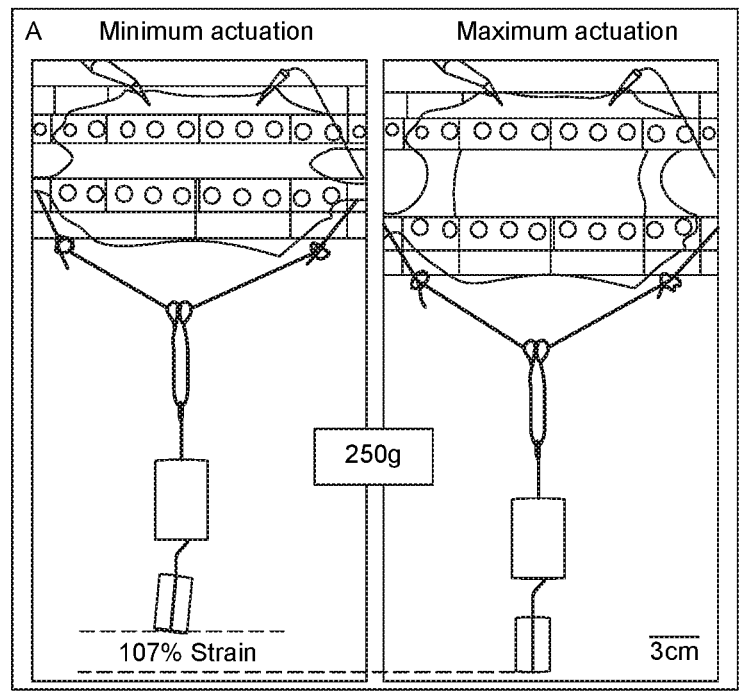
FIG. 17B illustrates a planar-type actuator without and with an applied voltage and 250 g of weight hung therefrom.
Figure 17C:
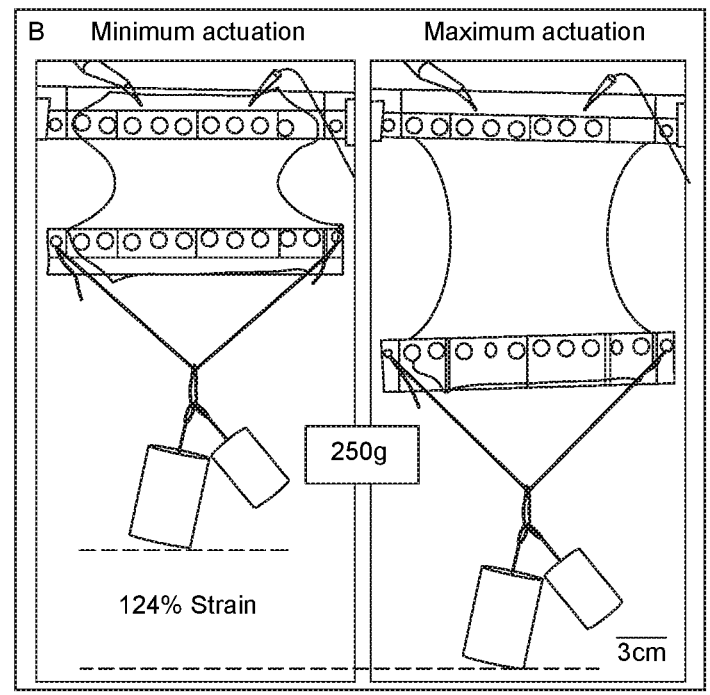
FIG. 17C illustrates a planar-type actuator without and with an applied voltage and 700 g of weight hung therefrom.
Figure 17D:
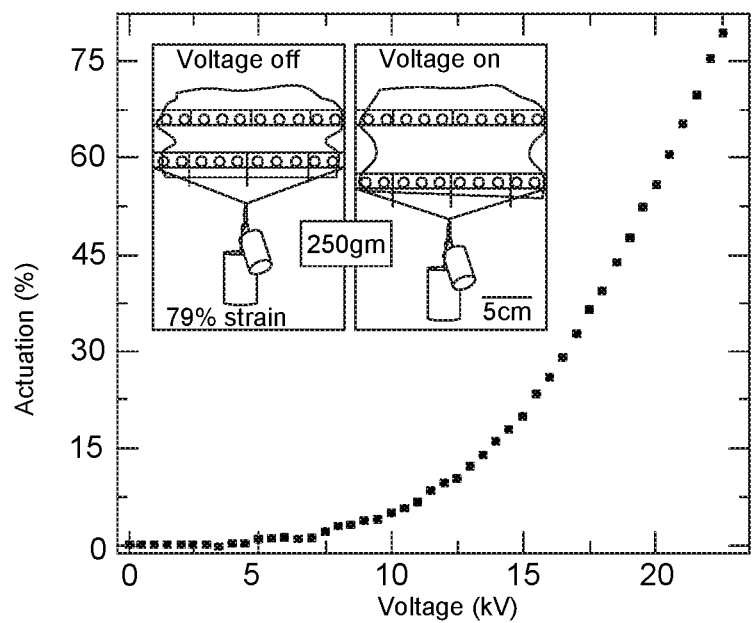
FIG. 17D graphically illustrates actuation strain of the planar-type actuator of FIG. 17B at various applied voltage levels.
Figure 17E:
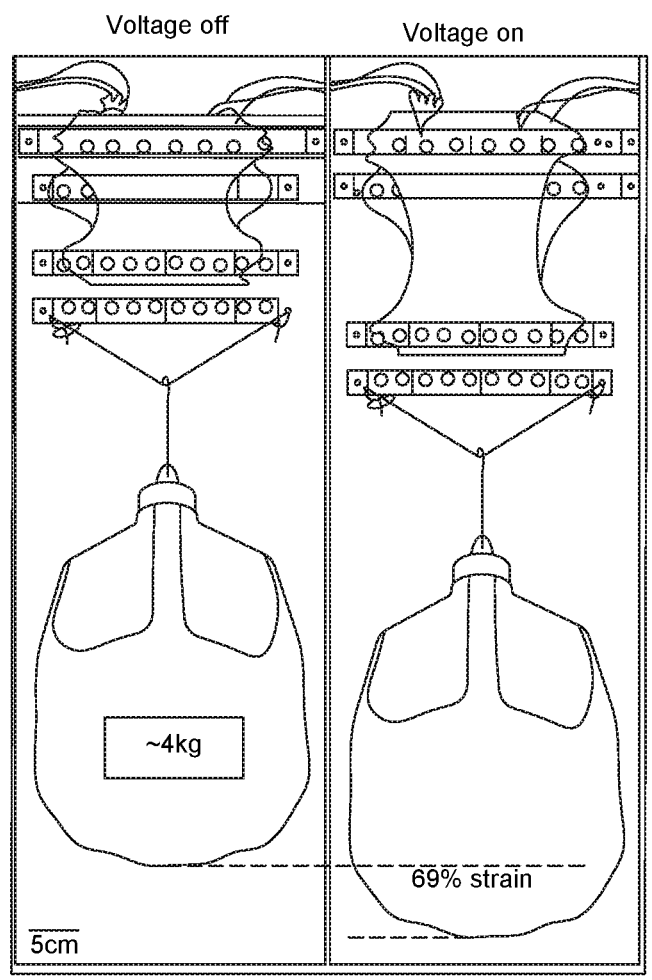
FIG. 17E illustrates a plurality of planar-type actuators without and with an applied voltage and 4 kg of weight hung therefrom.

FIG. 17A illustrates quasi-static linear actuation of a six-unit planar HASEL actuator 800 (made up of six planar-type actuators 700) at 11.5 kV with a 500 g load. Lateral prestretch was fixed at 2.5 and there was an initial prestretch of 1.5 in the direction of the weight. The use of six individual planar-type actuators 700 made it easier to operate actuators in different orientations as change in hydrostatic pressure of the liquid dielectric may be small. In FIG. 17B, a single planar-type actuator 700 is driven by a sinusoidal signal with frequency set near resonance and achieved 107% linear strain under a 250 g load (actuation stress −32 kPa). The amplitude of the voltage was 13 kV, which corresponds to an applied field of 10.1 kV/mm (based on un-deformed thickness of the actuator). The actuation frequency was 4.6 Hz. In FIG. 17C, a two-unit planar HASEL actuator was driven by a sinusoidal signal with frequency set near resonance and achieved 124% linear strain with a 700 g load (actuation stress −114 kPa). Amplitude of the voltage was 14.5 kV, which corresponds to an applied field of 15.5 kV/mm (based on un-deformed thickness of the actuator). By tuning the relative thicknesses of the elastomer shell and liquid dielectric layer, different amounts of actuation stress and strain can thus be achieved. FIG. 17D graphically illustrates actuation strain of the planar-type actuator of FIG. 17B at various applied voltage levels. FIG. 17E illustrates a plurality of planar-type actuators without and with an applied voltage and 4 kg of weight hung therefrom.

FIG. 18A schematically illustrates an experimental setup of a planar-type actuator 700 with and without an applied voltage and a load hung therefrom. Gravimetric power and work were measured and the actuator 700 was driven by a sinusoidal voltage signal. Displacement was measured using a high-speed camera (Model Phantom v710, Vision Research). Velocity and acceleration were calculated from the displacement data. In FIG. 18B, time histories for displacement, velocity, and acceleration for a two-unit planar-type actuator lifting a 700 g load are graphically illustrated. FIG. 18C presents a plot of specific power during contraction for a two-unit planar actuator lifting a 700 g load while FIG. 18D presents a plot of specific power during contraction for a single-unit planar actuator lifting a 1 kg load.

Figures 19A, 19B:
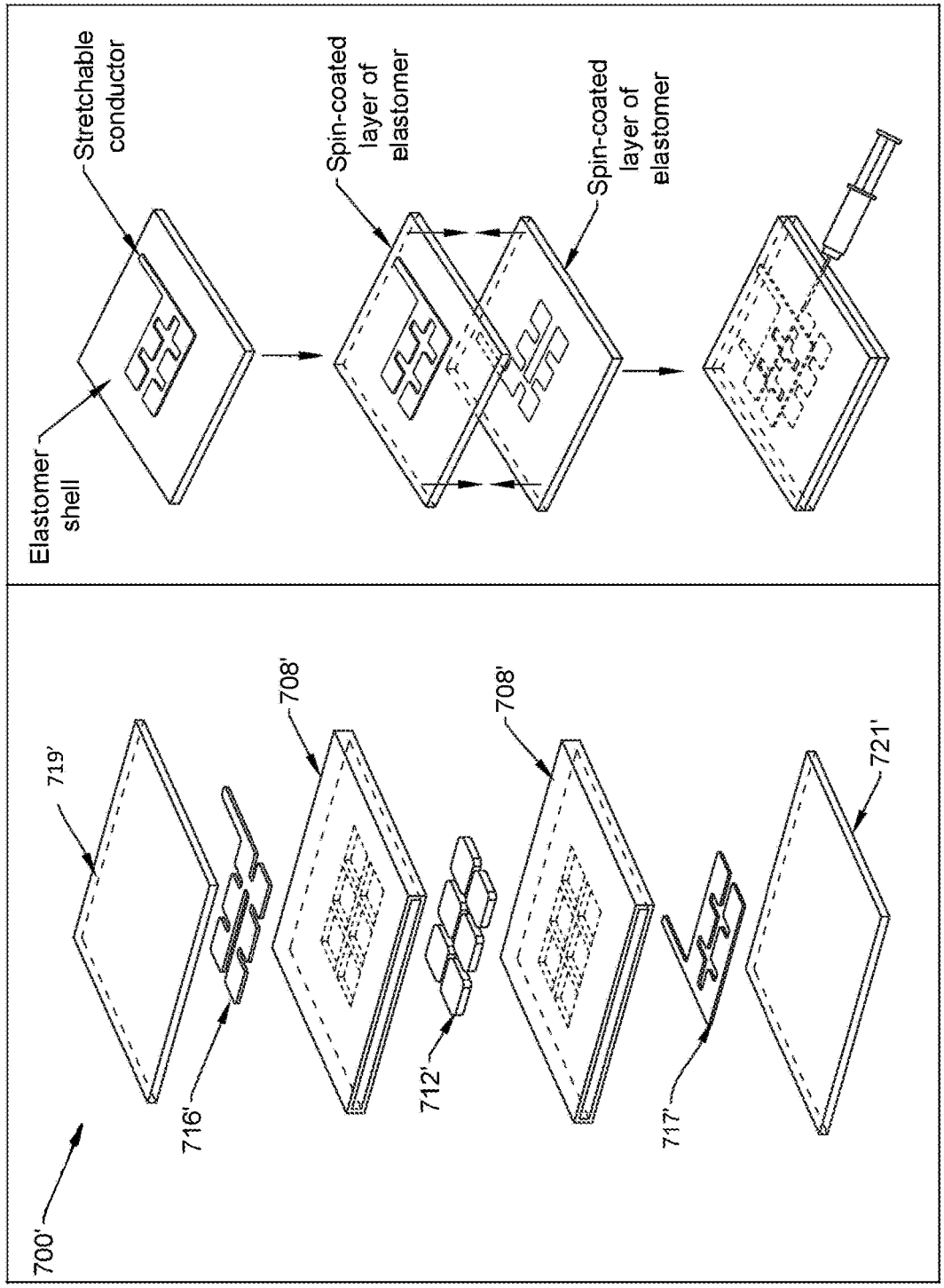
FIG. 19A is an exploded perspective view of a planar-type actuator, according to one embodiment.
FIG. 19B illustrates a process of fabricating the planar-type actuator of FIG. 19A.

FIG. 19A illustrates an exploded view of a planar-type HASEL actuator 700' according to another embodiment, including a molded elastomer shell 708', first and second stretchable electrodes 716', 717', respective encapsulation layers 719', 721' (e.g., spin-coated elastomer layers) to encapsulate the electrodes 716', 717', and a liquid dielectric layer 712' inside of the elastomer shell. FIG. 19B shows an illustrative step-by-step process for fabricating the planar-type actuator 700' of FIG. 19A. As illustrated, embodiments can mold two flat pieces of elastomer for an elastomer shell (e.g., shell 708'), and then bond hydrogel conductors (e.g., first and second electrodes 716', 717') to the surface. First and second encapsulating layers (e.g., layers 719', 721') can be applied (e.g., spin-coated) on top of the electrodes to protect and insulate them, and the two halves can be joined (e.g., glued) together. The chambers of the elastomer shell can be filled with liquid dielectric (e.g., using a syringe or other suitable device).

Figures 19C, 19D:
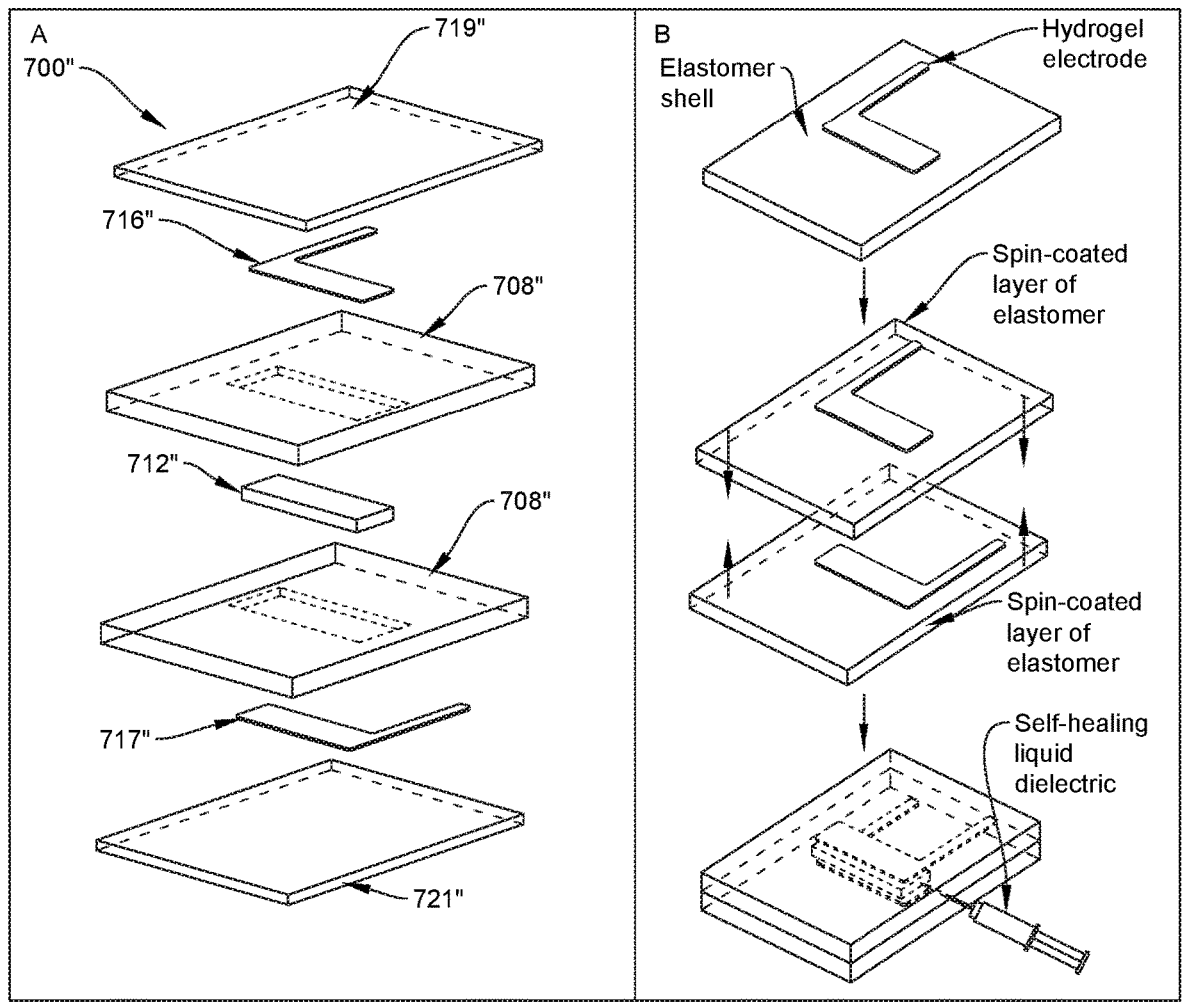
FIG. 19C is an exploded perspective view of a planar-type actuator, according to another embodiment.
FIG. 19D illustrates a process of fabricating the planar-type actuator of FIG. 19C.

FIG. 19C illustrates an exploded view of a planar-type HASEL actuator 700" according to another embodiment, including a molded elastomer shell 708", first and second stretchable electrodes 716", 717" (e.g., hydrogel layers), respective encapsulation layers 719", 721" (e.g., spin-coated elastomer layers) to encapsulate the electrodes 716", 717", and a liquid dielectric layer 712" inside of the elastomer shell. FIG. 19D shows an illustrative step-by-step process for fabricating the planar-type actuator 700" of FIG. 19C.

Figure 19E:
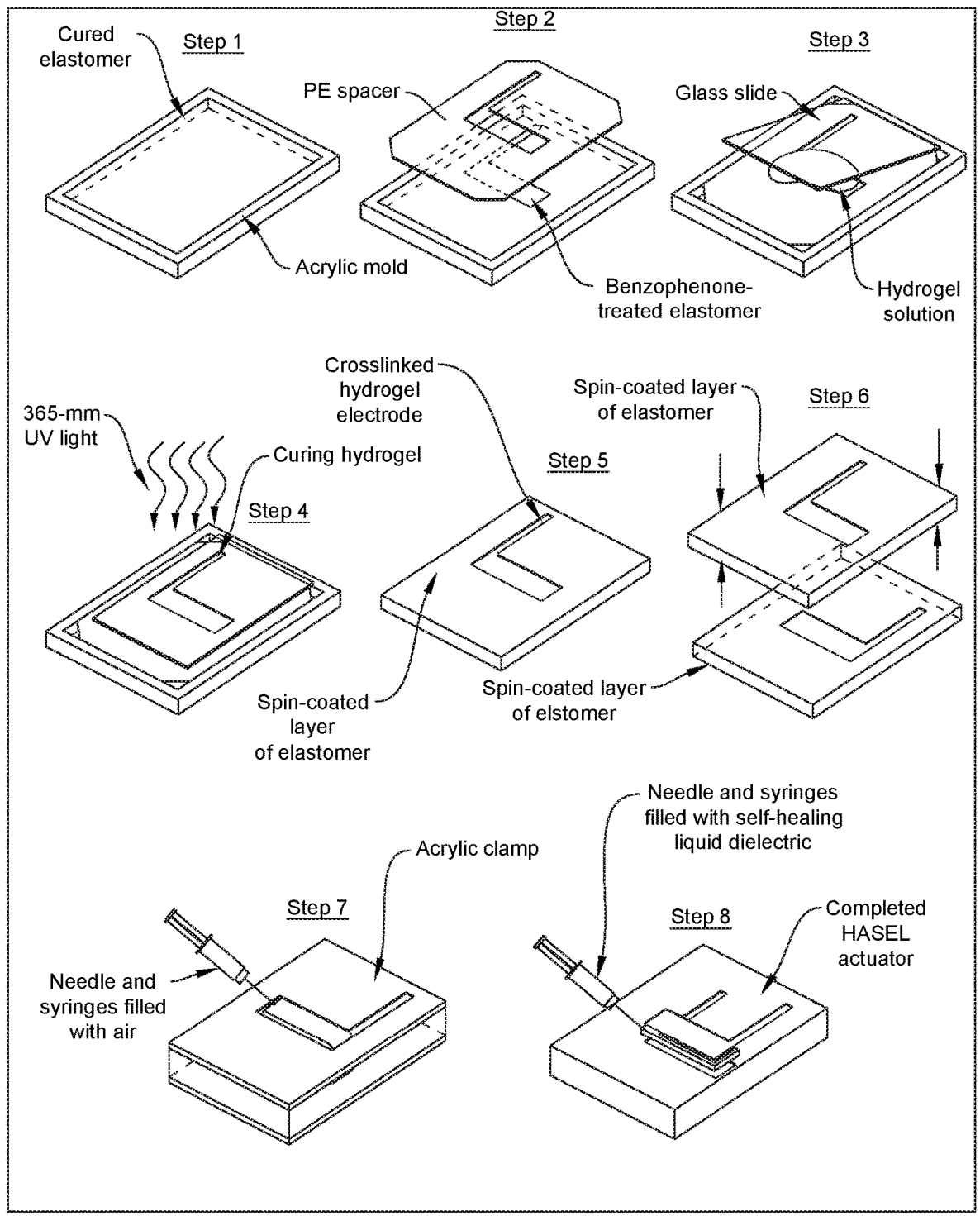
FIG. 19E illustrates a process of fabricating a planar-type actuator, according to another embodiment.

FIG. 19E illustrates another process of fabricating the planar-type conductor 700" of FIG. 19C. The process used the following specific materials: Ecoflex 00-30 for the elastomer shell and encapsulating layer, PAAm-LiCl hydrogels for the stretchable conductors, and Envirotemp FR3 transformer oil for the liquid dielectric. In Step 1, two flat rectangular pieces may be molded out of Ecoflex 00-30 for the elastomer shell. The elastomer surface was treated with a 10 wt % solution of benzophenone in ethanol. A mask was used to treat only the area that will be patterned with electrodes. A solution for PAAm-LiCl hydrogel was prepared. In Step 2, a thin plastic spacer was used that was cut out in the shape of the conductors as the mold for the hydrogels. The process continued by placing the spacer on the elastomer surface, pouring in the hydrogel solution, and placing a glass slide on top of the plastic spacer to squeeze out excess hydrogel solution in Step 3. In Step 4, curing was performed under 365 nm UV light for one hour. In Step 5, a layer of Ecoflex 00-30 was spin-coated on top of the conductors to encapsulate them. In Step 6, two elastomer sheets with conductors were bonded together with a thin layer of uncured Ecoflex 00-30. Uncured elastomer was not applied to sections of the shell intended to be filled with oil (those portions of the shell that are to form the internal cavity or pouch). In Step 7, the two sheets were clamped between pieces of acrylic that have cut-outs for the liquid dielectric pouches not to be bonded together. A syringe was used to fill these areas with air, preventing them from bonding together. The two halves were cured together with the air inside the internal cavity. Air was removed from the liquid dielectric pouches, and the pouches were filled with Envirotemp FR3 transformer oil. The actuator was then connected to external electronics.

Figures 20A, 20B:
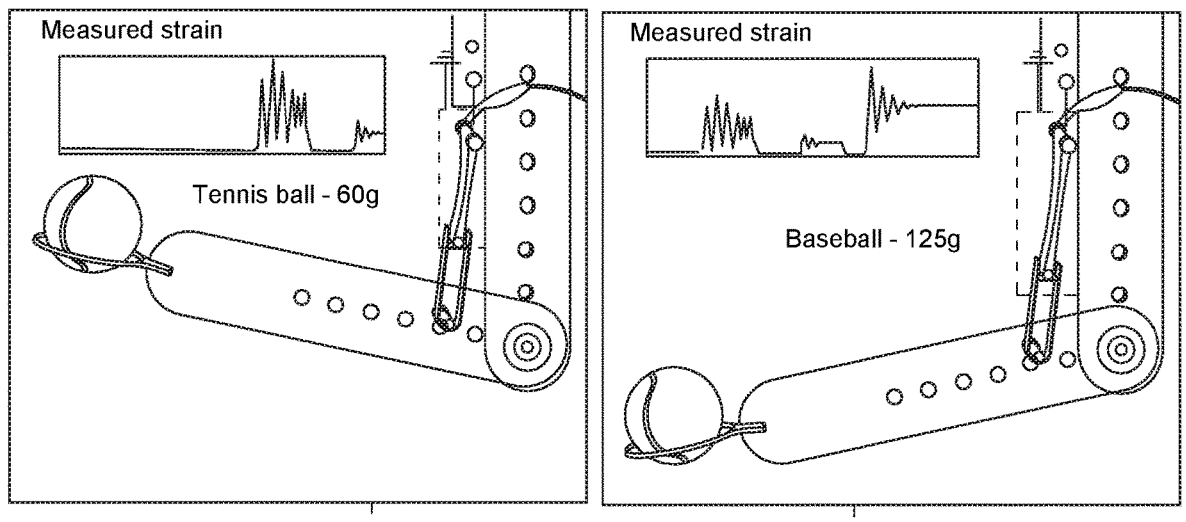
FIG. 20A illustrates use of a planar-type actuator to sense a position of an arm holding a tennis ball.
FIG. 20B illustrates use of a planar-type actuator to sense a position of an arm holding a baseball.
Figure 20C:
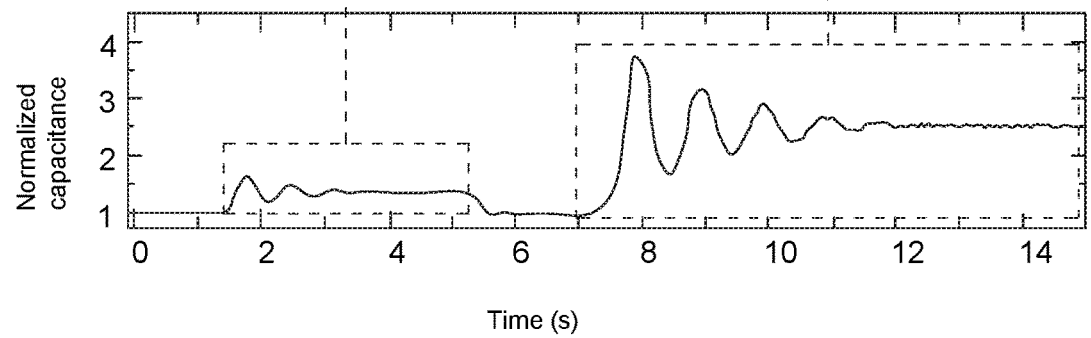
FIG. 20C graphically illustrates a measured capacitance of the planar-type actuators of FIGS. 20A-20B over time for use in measuring a strain of the actuators to ascertain arm position.

FIG. 20A illustrates use of a planar-type actuator 700 to sense a position of an arm holding a tennis ball. Specifically, a robotic arm powered by a planar HASEL actuator 700 measured capacitance for different payloads. The actuation voltage signal was set to 0 kV while the sensing voltage signal was set to an amplitude of 0.08 kV and frequency of 2.5 kHz. Normalized capacitance measurements are plotted as a function of time in FIG. 20C, where normalized capacitance is the instantaneous capacitance value divided by the capacitance of the arm without any loading. A tennis ball (60 g) was dropped onto a holder at the end of the arm. The plot in FIG. 20C shows the under-damped free response of the arm which settles to an equilibrium capacitance value. In FIG. 20B, The tennis ball was removed and a baseball (125 g) was placed onto the end of the arm. At equilibrium, the normalized capacitance measured from the baseball was more than double the value for the tennis ball.

Figure 21:
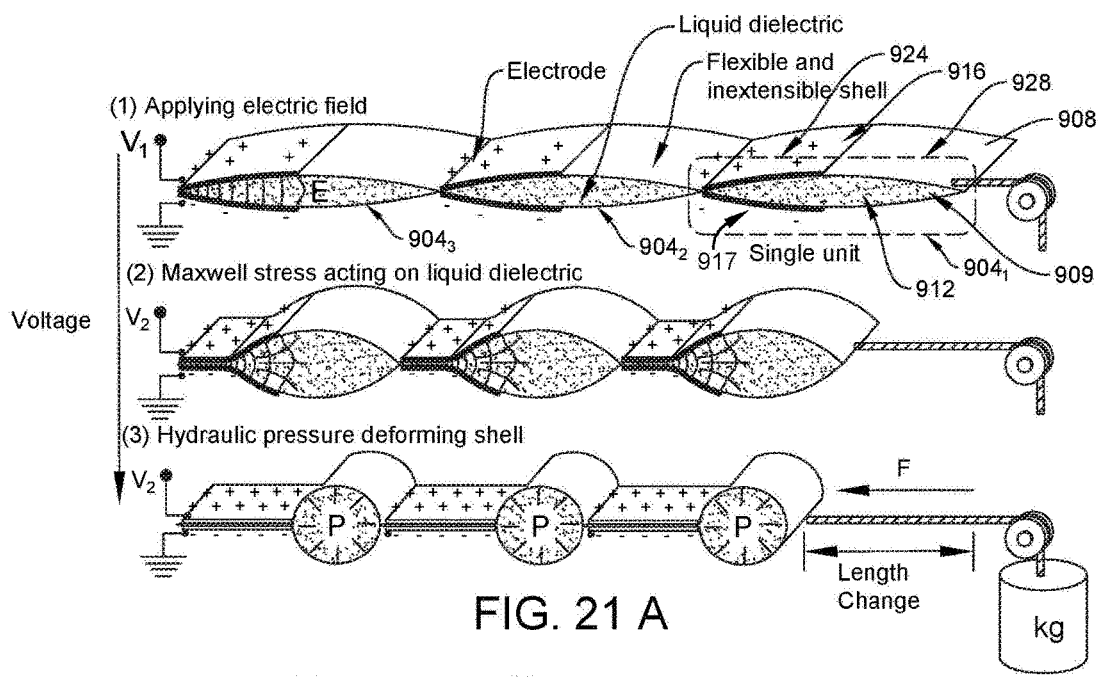
FIG. 21A illustrate a "peano" HASEL actuator at increasing voltage levels, according to one embodiment.
FIG. 21B illustrates a peano-type actuator with and without an applied voltage and a load hung therefrom.
FIG. 21C illustrates a peano-type actuator with and without an applied voltage and a load hung therefrom.
Figure 21:
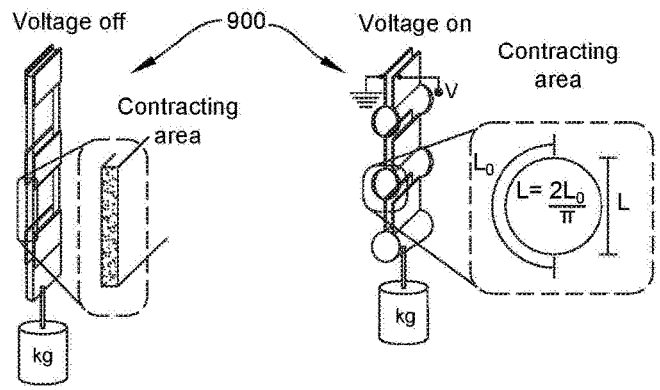
Figure 21:
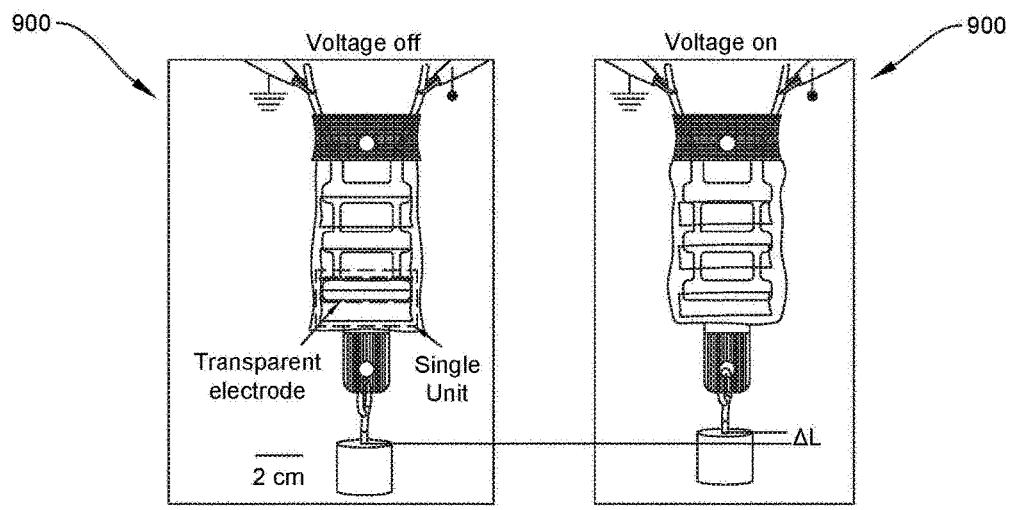

Yet another category of HASEL actuators is peano-type actuators. Peano-type actuators are capable of fast, muscle-mimetic, linear contraction upon activation. This mode of actuation can exploit certain geometric principles free of relying on stacks of actuators, initial pre-stretching, rigid components, or other techniques. As illustrated in FIG. 21A, the structure of a peano-type actuator 900 can include a flexible, but inextensible shell 908 segmented into discrete pouches 909 that are each filled with a liquid dielectric 912. In other words, the internal cavity may be segmented into a plurality of sub-cavities. Each pouch 909 may not be in fluid communication with any of the other pouches 909. First and second electrodes 916, 917 may be disposed over the shell 908 of each pouch 909. The electrodes 916, 917 can be compliant or rigid, depending on the application. The portion of each pouch 909 covered by the electrodes 916, 917 may be referred to as the active area 924 while the uncovered portion (where contractile geometry change occurs as discussed below) may be referred to as the inactive area 928. To limit electrical arcing through the air around the device during operation, a skirt or an insulating layer can be added to cover the electrodes 916, 917.

In any case, the combination of each respective pouch 909, liquid dielectric 912, first and second electrodes 916, 917 may be referred to as a unit 904 and the peano-type actuator 900 may have any appropriate number of interconnected units 904 (e.g., such as units 904$_1$, 904$_2$, 904$_3$). When an increasing voltage (V) is applied to the electrodes 916, 917 of the interconnected units 904, electrostatic forces displace the liquid dielectric 912 causing the electrodes 916, 917 to progressively draw together and close; this forces fluid from the active areas 924 into the inactive areas 928 which causes a transition from a flat cross section to a more circular one and leads to a contractile force, F. See FIGS. 21A-21B.

When voltage is applied to the electrodes 916, 917, they attract due to electrostatic forces. This attraction is governed by the Maxwell pressure:

$$\rho = \in \in_0 E^2$$

where E is the electric field between the electrodes, $\in_0$ is the permittivity of free space, and $\in$ is the relative permittivity of the dielectric between the electrodes. As the electrodes attract, they redistribute fluid from the active areas 924 into the inactive areas 928. Because the shell 908 is inextensible (i.e., non-elastic), each inactive area 928 is forced to transition from a flat cross-section to a more circular one as shown. This transition may result in a theoretical linear contraction of up to $1-2/\pi$, or approximately 36%, in the inactive areas 928, as seen through simple geometry changes (e.g., as illustrated in FIG. 21B). When a weight is attached to one end of the actuator 900, the increase in fluid pressure is converted to mechanical work performed on the external load. FIGS. 21A-21B show the conversion to mechanical force, as well as the accompanying deformation of the actuator pouches 909. FIG. 21C illustrates an experimental peano-type actuator 900 (with three units 904) as lifting a 20 g weight on application of 8 kV across the electrodes. This construction may use transparent hydrogels as electrodes and fiberglass-reinforced tape for mounting connections. Certain embodiments of the actuators illustrated in FIGS. 21A-21C may utilize a zipping mechanism as described below in relation to FIGS. 36A-44E.

FIGS. 22B and 22C illustrate peano-type actuators 900 using hydrogel electrodes and aluminum electrodes, respectively while FIG. 22A graphically illustrates actuation strain of a peano-type actuator with different electrode types (hydrogel and aluminum) and supporting different loads. Specifically, a modified square-wave voltage signal with long rise and fall times (~1 s) was used to ensure consistent actuation. The actuators were tested at 6, 8, and 10 kV; this corresponded to maximum electric fields of 140, 190, and 240 V $\mu m^{-1}$, respectively. The measured forcestrain curves are depicted in FIG. 22A and show little to no difference between aluminum- and hydrogel-electrode performance, demonstrating versatility in material selection and design. The highest load applied to the actuators was 10 N (1 kg) which corresponded to the blocking force for actuators activated at 6 kV and was less than the blocking force at 8 and 10 kV. The 1-kg load resulted in a maximum cross-sectional stress of 6 MPa in the actuator. A strain of 10% was achieved at 10 kV with a 0.2N (20 g) load. The shape of the observed forcestrain relation is characteristic of peano-fluidic actuators. Furthermore, the monotonic decrease in force with strain is also observed in skeletal muscle.

For most fluidic actuators, the limiting factor in mechanical response is the time required to pump the working fluid throughout the system. Because peano-type actuators 900 locally pump the fluid in each unit 904 (in each pouch 909 of each unit 904), the distance the fluid must travel is reduced which therefore reduces actuation time. In addition, viscous loss and design complexity are reduced by limiting or avoiding the need for regulators and valves.

Figure 23A:
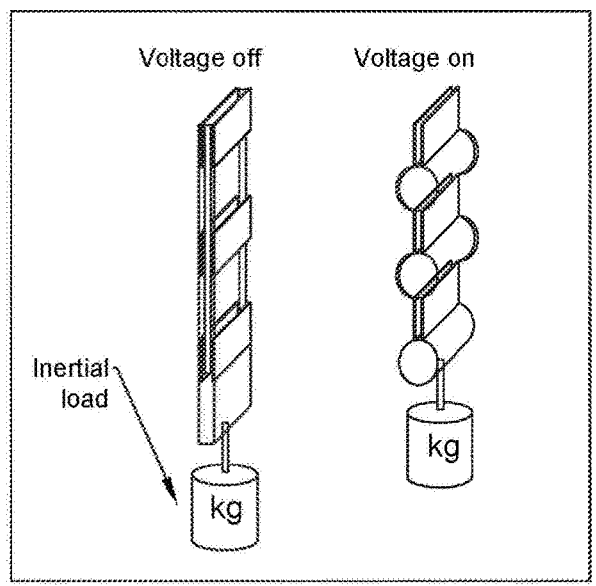
FIG. 23A schematically illustrates a test setup for determining contraction characteristics of a peano-type actuator.
Figure 23B:
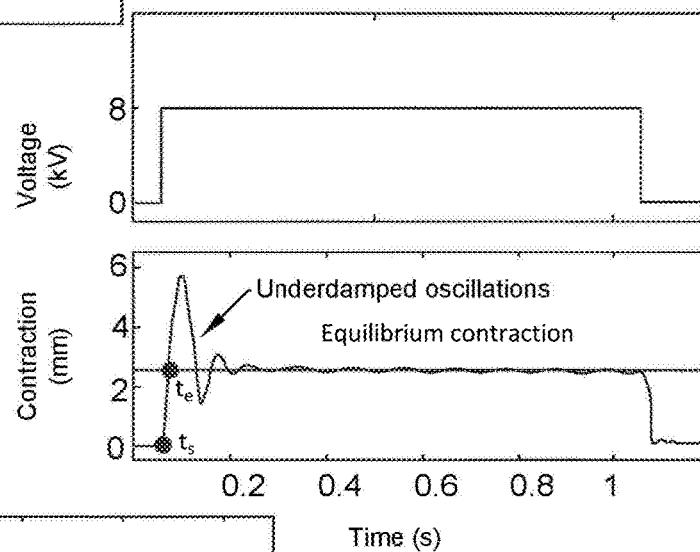
FIGS. 23B-23D graphically illustrate various electrical measurements taken during application of a voltage to the peano-type actuator.
Figure 23C:
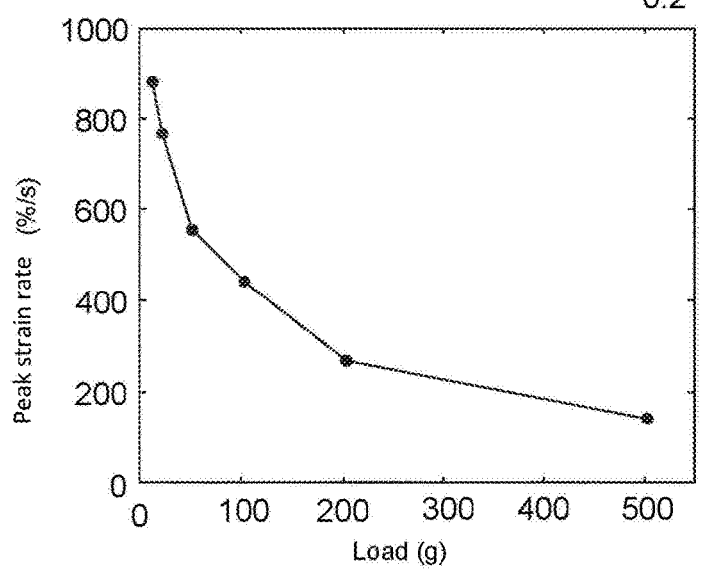
Figure 23D:
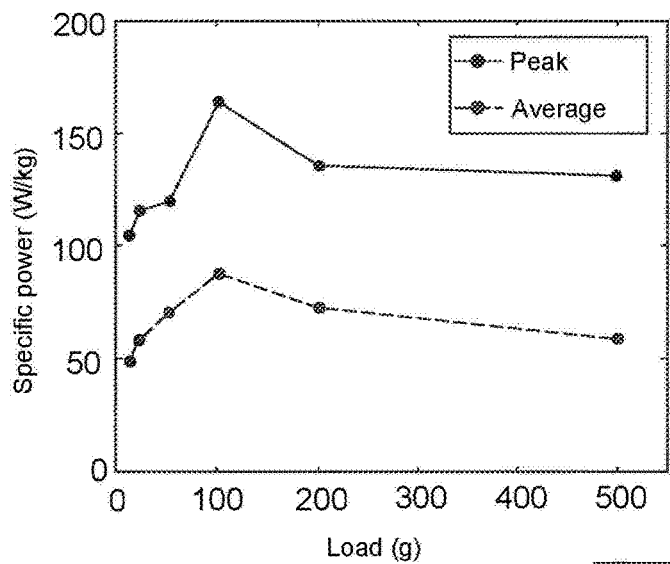
Figure 23F:
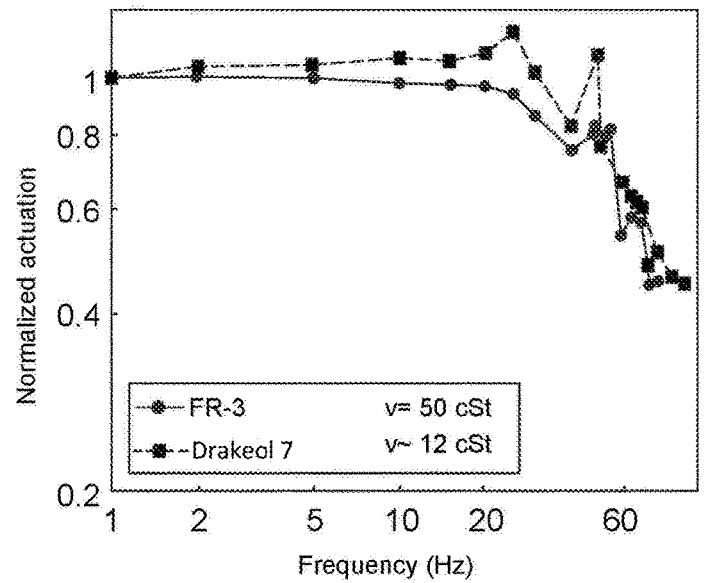
FIG. 23F presents frequency response curves for the peano-type actuator of FIG. 23E filled with liquid dielectrics of different viscosities.
Figure 23E:
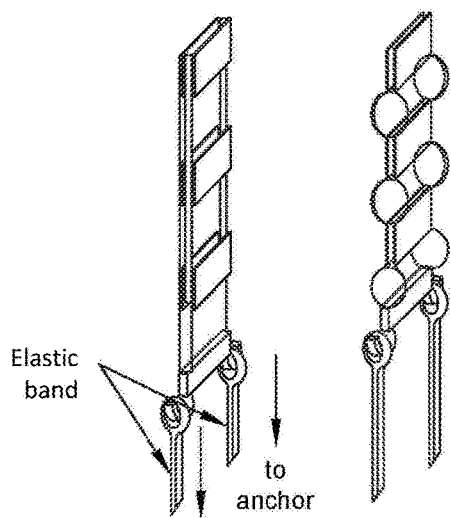
FIG. 23E schematically illustrates a test setup for measuring a frequency response of the peano-type actuator.

FIG. 23A schematically illustrates a test setup for determining contraction characteristics of a peano-type actuator 900. In this setup, the minimum cross section of the actuator used for testing was (40 mm by 0.042 mm) corresponding to a maximum static stress of 2.9 MPa with a 500-g load. FIGS. 23B-23D graphically illustrate various electrical measurements taken during application of a voltage to the peano-type actuator. FIG. 23B shows how an 8-kV square wave was applied to the actuator. The resulting contraction response was measured, where $t_s$ and $t_e$ correspond to the time of initial contraction and equilibrium contraction, respectively. Underdamped oscillations were observed after initial contraction. The small oscillations observed after 0.3 s correspond to out-of-plane swinging of the load and are not part of the characteristic response. In FIG. 23C, peak strain rate during contraction as a function of load is shown. In FIG. 23D, peak and average specific power as a function of load are shown. FIG. 23E schematically illustrates a test setup for measuring a frequency response of the peano-type actuator. As shown, elastic bands were attached to the bottom of the actuator and tensioned to provide a constant 1-N restoring force. FIG. 23F presents frequency response curves for the peano-type actuator of FIG. 23E filled with liquid dielectrics of different viscosities. As shown, the actuator filled with FR3 liquid dielectric showed a nearly flat response up to 20 Hz. The lower viscosity Drakeol 7 allowed maximum actuation at higher frequencies.

Figure 24A:
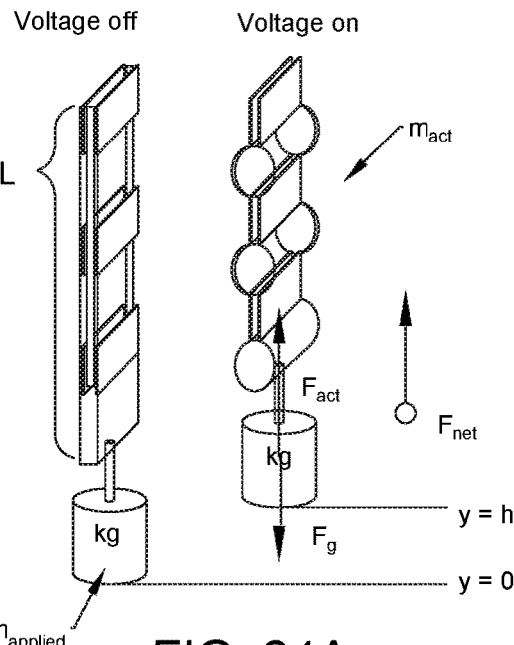
FIG. 24A schematically illustrates a test setup for determining dynamic actuation characteristics of a peano-type actuator.
Figure 24B:
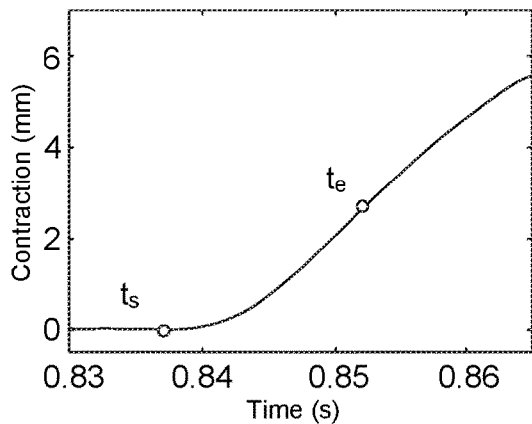
FIGS. 24B-24E graphically illustrate various electrical measurements taken during application of a voltage to the peano-type actuator.
Figure 24C:
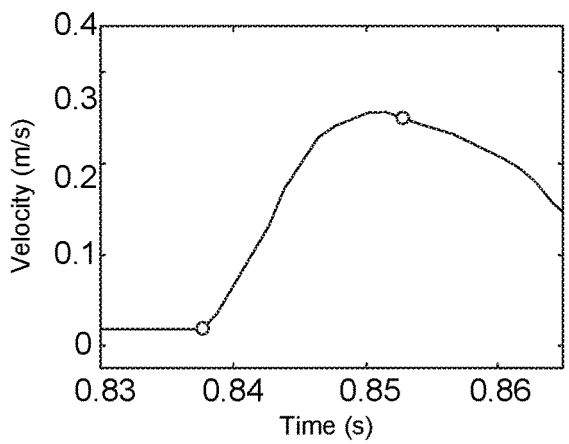
Figure 24D:
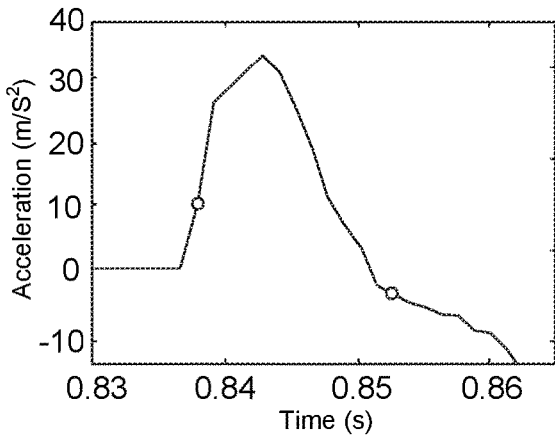
Figure 24E:
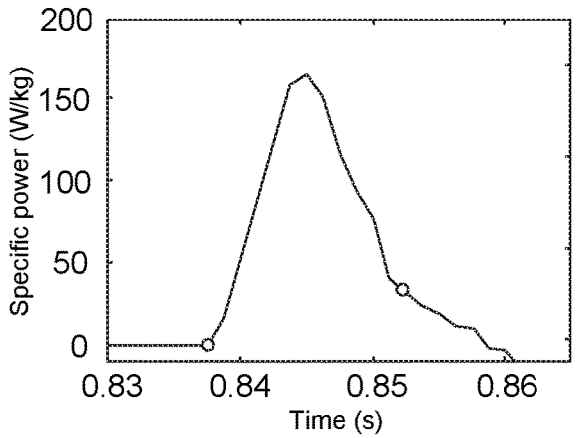

FIG. 24A schematically illustrates a test setup for determining dynamic actuation characteristics of a peano-type actuator while FIGS. 24B-24E graphically illustrate various electrical measurements taken during application of a voltage to the peano-type actuator. Specifically, FIG. 24B is a zoomed view of initial portion of the contraction curve in FIG. 23B, with a 100 g hanging weight. A Savitsky-Golay filter was applied to position (contraction) data to provide smoothing; derivatives of the Savitsky-Golay fits at each point provided velocity (FIG. 24C) and acceleration (FIG. 24D) data. In FIG. 24E, specific power was calculated. Contraction time was treated as the time from the start of contraction $t_s$ to equilibrium contraction $t_e$, ignoring the subsequent overshoot.

Figure 25:
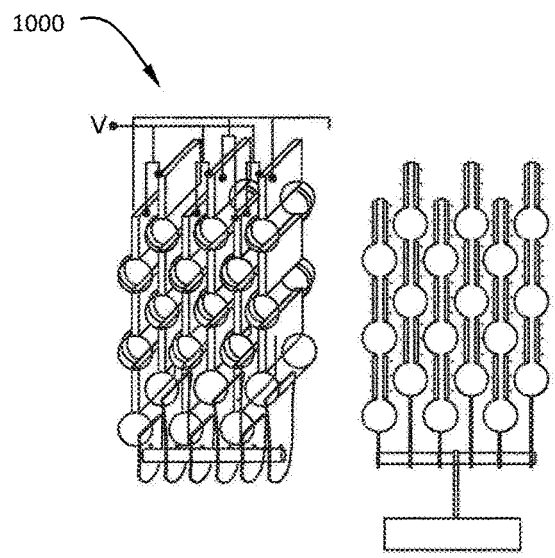
FIG. 25A illustrates a plurality of peano-type actuators arranged in parallel to scale up force generation.
FIG. 25B illustrates a plurality of peano-type actuators arranged in parallel without and with an applied voltage and a load hung therefrom.
FIG. 25C graphically illustrates a comparison of the force-strain characteristic of a single-unit peano-type actuator to a six-unit peano-type actuator.
FIG. 25D illustrates a plurality of peano-type actuators arranged in parallel without and with an applied voltage and a load hung therefrom.
Figure 25:
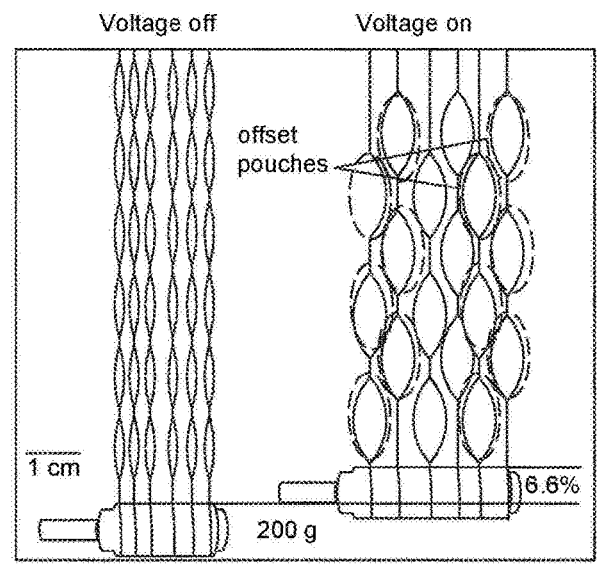
Figure 25:
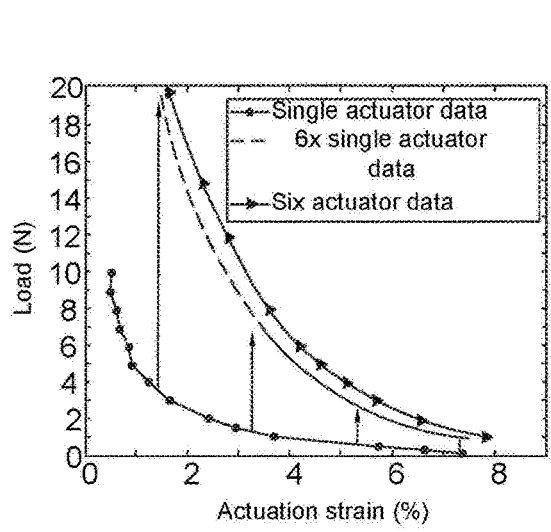
Figure 25:
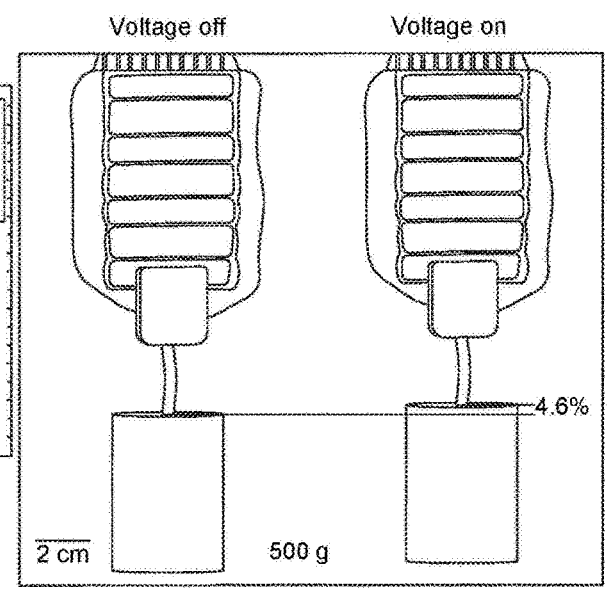

FIG. 25A demonstrates stack 1000 of peano-type actuators 900 in parallel to increase actuation force. Offsetting the units 904 of adjacent actuators 900 (e.g., so that active areas 924 overlap inactive areas 928 on adjacent actuators 900 or in other words by about half of the length of a unit 904) vertically allows the expanding cross section of one actuator 900 to nest within the pulled-in electrode area of adjacent actuators 900. Alternating electrode polarities ensures that adjacent electrodes are at the same potential. FIG. 25B shows a 1.4-cm-thick stack of six actuators in its inactive and active state, respectively, to visualize the offset configuration. As expected, the stack demonstrated an actuation force roughly six times that of an individual peano-type actuator 900, as shown in FIG. 25C. FIG. 25D shows this stack, which weighs 30 g, lifting 500 g over a strain of 4.6%.

Figures 26A, 26B:
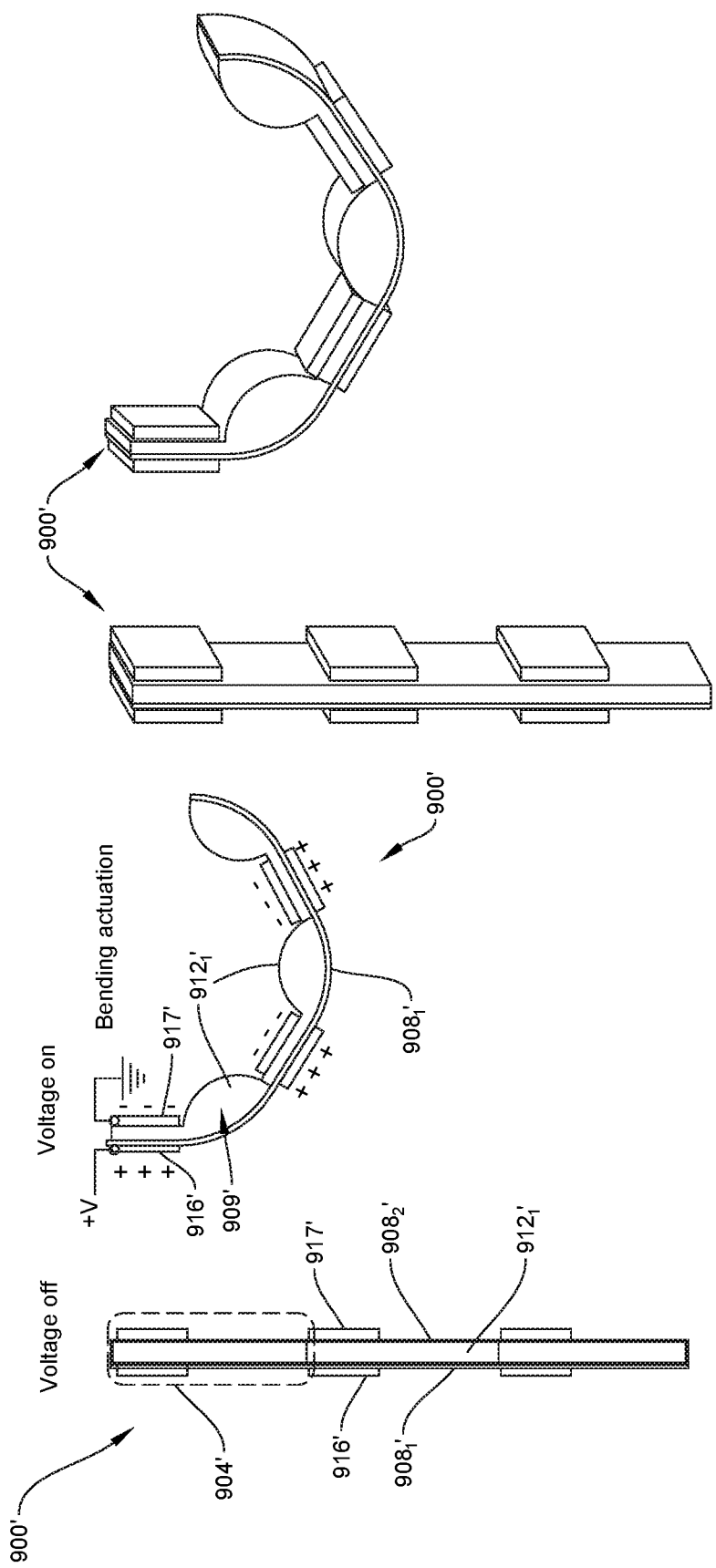
FIG. 26A schematically illustrates a peano-type actuator without and with an applied voltage to generate bending actuation of the actuator.
FIG. 26B illustrates respective perspective views of the views of FIG. 26A.

FIGS. 26A-26B show a particular type of peano-type actuator 900' for novel and useful modes of actuation such as bending and twisting applications. These applications may be useful such as for the construction of soft grippers for handling delicate and irregular objects. These peano-type actuators 900' incorporate regions that have a greater bending stiffness relative to other regions to achieve such modes of actuation. This stiffening can be achieved through higher stiffness materials, semi-rigid or rigid materials coupled with soft joints, and/or in other suitable manners. The stiffened regions can be located along all or portions of the actuator shell to achieve various modes of actuation.

In FIG. 26A, the peano-type actuator 900' achieves bending modes of actuation by configuring a first portion $908_1$' of the shell (e.g., a left or bottom side in FIG. 26A) to have a greater bending stiffness than a second portion $908_2$' of the shell (e.g. a right or upper side in FIG. 26A). Thus, the pouch 909' of each unit 908' 904' is generally surrounded by the first portion $908_1$' of the shell on one side and the second portion $908_2$' of the shell on the other side. When a voltage is applied, inhomogeneous deformation of the pouches 909' leads to preferential contraction on the right, and overall bending. FIG. 26B shows a perspective view, illustrating the deformation during actuation. Many other approaches are possible for varying actuation. For example, some implementations include twisting or torsional actuators, which incorporate strips of stiffened regions on either side to force a twisting motion on application of voltage. Other implementations include bidirectional bending actuators. For example, by placing two bending peano-HASEL actuators back-to-back with the stiffened side in the middle, bending actuation can be achieved in either direction by applying voltage to one actuator or the other. Other implementations can achieve bidirectional bending actuation through a three-layer construction: a central stiff layer with incorporated electrodes, and two flexible outer layers (one on either side) that can be selectively activated by application of voltage.

Figure 27A:
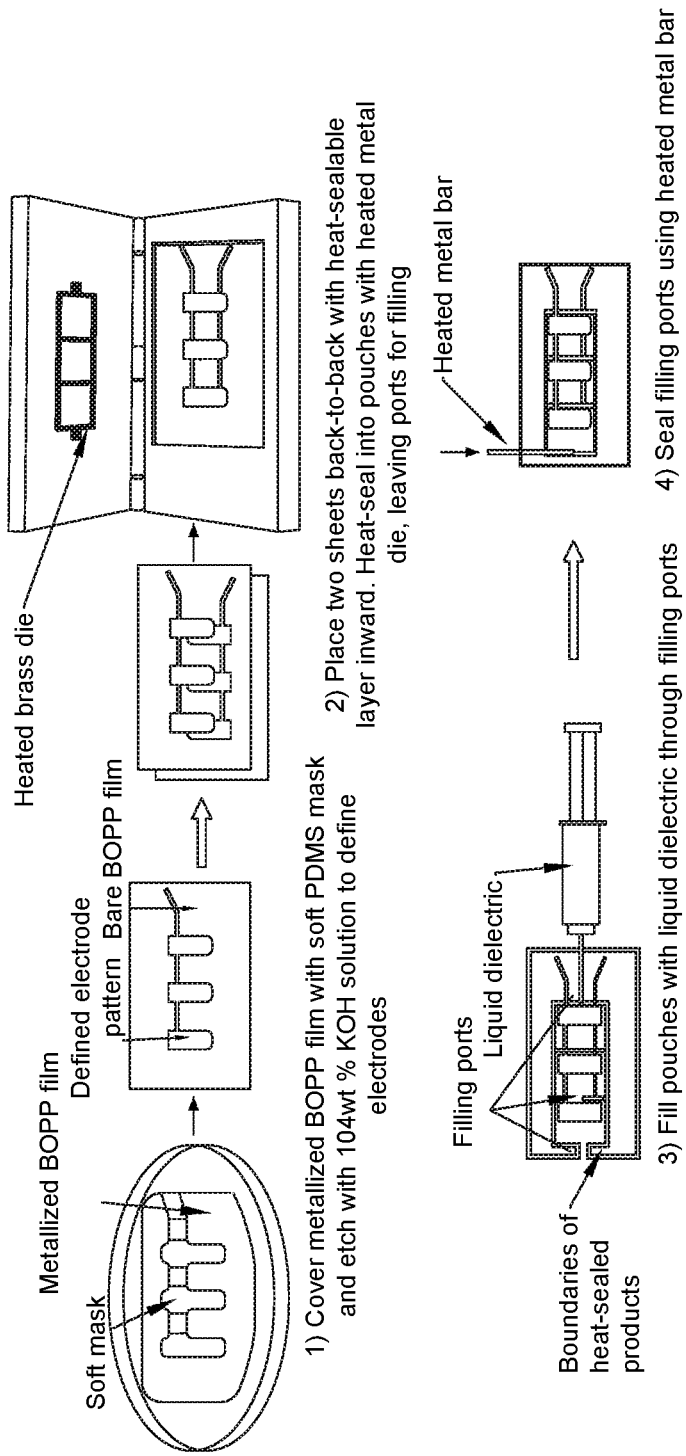
FIG. 27A illustrates a process of fabricating a peano-type actuators, according to one embodiment.

FIG. 27A shows an illustrative process for fabricating peano-type actuators 900. In Step 1, a first plurality of spaced electrodes are created on a first surface of a first film and a second plurality of spaced electrodes are created on a first surface of a second film. For instance, each film may be in the nature of a metallized, heat-sealable biaxially-oriented polypropylene (BOPP) film. For instance, the BOPP films may include a layer of vacuum-deposited aluminum on one side. An electrode pattern can be defined on the film by using a PDMS protective mask and submerging in a potassium hydroxide (KOH) etch. For instance, using a soft mask to preserve the electrode area, the aluminum layer may be etched using a 1 wt % KOH solution until excess metal is removed. In Step 2, the first film may be placed over the second film such that the first plurality of spaced electrodes are aligned over the second plurality of spaced electrodes, and then the first and second films may be sealed together at each of a plurality of spaced sealing locations to create a plurality of pouches. Each such pouch is defined by: a) one of the first plurality of spaced electrodes, b) one of the second plurality of spaced electrodes, a) a portion of the first surface of the first film disposed between the one of the first plurality of spaced electrodes and an adjacent of the first plurality of spaced electrodes, and d) a portion of the first surface of the second film disposed between the one of the second plurality of spaced electrodes and an adjacent of the second plurality of spaced electrodes.

Figure 27B:
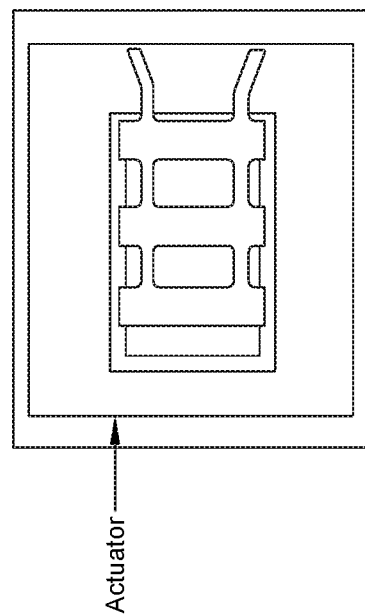
FIG. 27B illustrates a peano-type actuator fabricated using the process of FIG. 27A.

For instance, the two films can be placed back-to-back and sealed together to form the discrete pouches using a heat press with a custom metal die. As shown, the heated brass die may seal the first and second films together at each of the sealing locations. Access ports can be left in each pouch for filling. In Step 3, each pouch can be filled with liquid dielectric (e.g., Envirotemp FR3 transformer oil via syringe or the like) and subsequently sealed (e.g., using a heated metal bar) in Step 4. FIG. 27B shows an illustrative final constructed actuator, which includes a skirt along the outside to prevent electrical arcing through air during operation. The shell materials can include: heat-sealable thermoplastics, reinforced elastomers, cast plastics, etc. A variety of dielectric fluids can also be used. Electrodes can be implemented with compliant materials, such as: carbon-based conductors such as conductive elastomers, fabrics, carbon grease; thin metal layers, such as vacuum-deposited metal layers or conductive tapes; ionic conductors, such as hydrogels and ionic liquids; etc. Other implementations can use rigid conductors for actuation.

Figure 28:
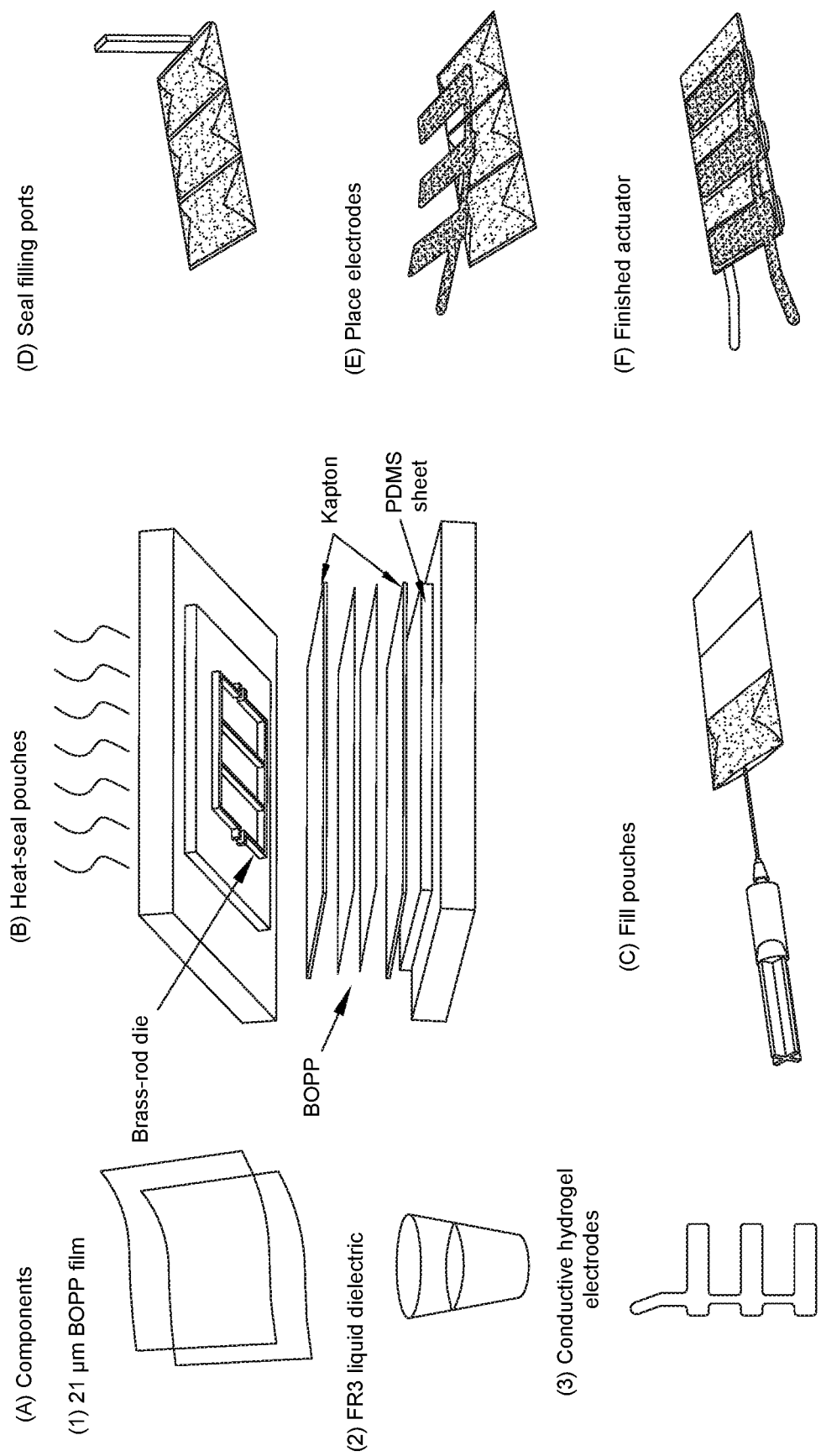
FIG. 28 illustrates a process of fabricating a peano-type actuators, according to another embodiment.

FIG. 28 illustrates a process of fabricating a peano-type actuators, according to another embodiment. Section A illustrates basic components of a peano-type actuator 900 to be fabricated according to the process of FIG. 28. As shown in Section B, two BOPP sheets may be placed between two layers of Kapton film and sealed using a heated brass-rod die. The die may be designed to give pouches (e.g., 2 cm by 4 cm) with access ports (e.g., 2 mm) for filling with a liquid dielectric. A PDMS sheet may be placed below the Kapton as a load-dispersing layer. In Section C, the pouches may be filled with a liquid dielectric (FR3), such as by using a syringe. In Section D, a heated rod may be used to seal the filling ports. In Section E, PDMS-backed hydrogel electrodes may be placed on each side of the pouches. Section F shows a finished actuator.

FIG. 29 illustrates use of a planar-type actuator to power a robotic arm via an applied voltage and simultaneously sense a position of the arm via measuring a capacitance of the actuator. In other words, HASEL actuators can simultaneously serve as strain sensors. For instance, driving and control electronics may make use of circuits that add a low amplitude AC signal to a high-voltage DC driving voltage, thereby enabling obtaining of the impedance of the circuits containing the hyper-elastic capacitors. Relative capacitance can be recorded as a function of time to indicate the position of the arm. As shown, measured capacitance is low when the arm is fully flexed (on the left) and capacitance is high when the arm is extended (on the right). The bottom plot shows details of the applied voltage signal (solid line) and measured relative capacitance (dashed line), $C/C_o$, where C is measured capacitance and $C_o$ is the minimum value for capacitance. Voltage and capacitance are ~90° out of phase, which is typical for a driven damped oscillator. In one arrangement, a first capacitance of one of the first and second electrodes may be measured at a first voltage (or before applying a voltage) and a second capacitance of the one of the first and second electrodes may be measured at a second voltage, and the a difference between the first and second capacitances may be used to determine a strain of the one of the first and second electrodes relative to the other of first and second electrodes during displacement or pressurizing of the liquid dielectric.

Figure 31:
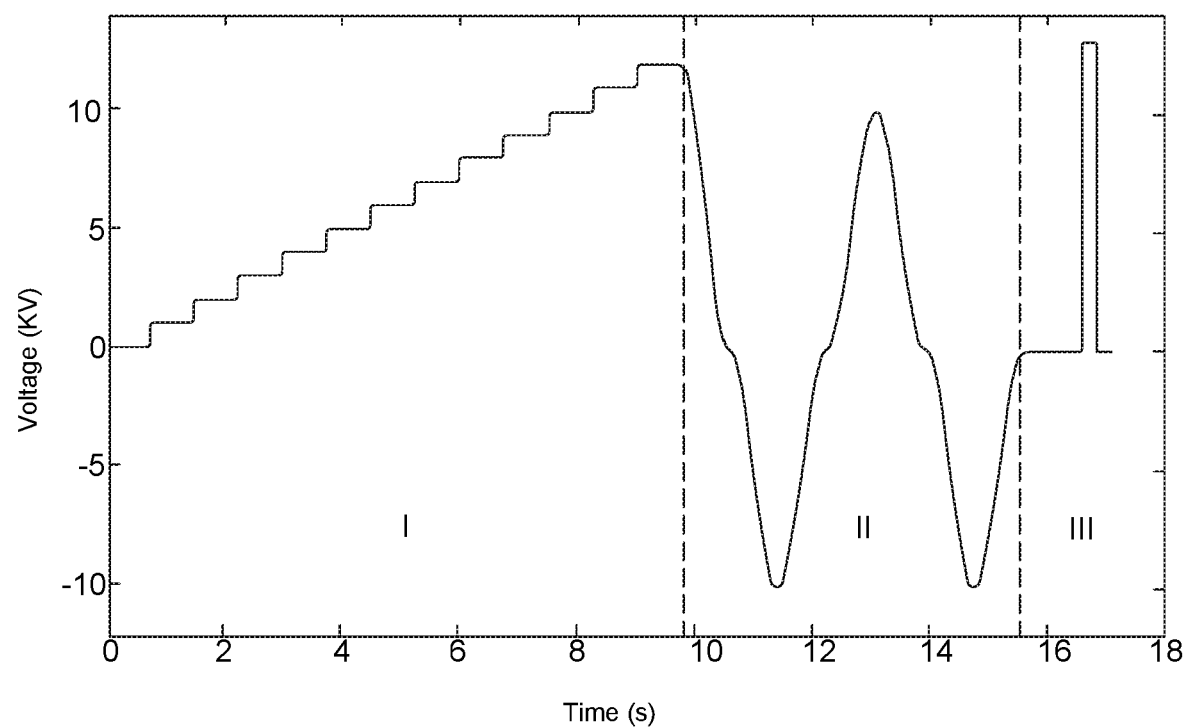
FIG. 31 is a plot of a voltage signal applied to the setup of FIGS. 30A-30C over time.

FIG. 30A illustrates two peano-type actuators 900 in parallel for demonstrating fast and controllable actuation. As shown in FIG. 30B, by applying a 13-kV voltage step, these actuators contracted fast enough to throw a ping-pong ball 24 cm into the air. Labeled times are measured from the start of contraction. FIG. 30C shows how incrementing voltage allows for controllable actuation of the arm, as shown in the progression of images with increasing voltage from left to right. The horizontal lines mark the position of the top of the ball for comparison. The ruler to the left of each picture shows 1-cm increments for scale. Not all details of the actuators 900 are illustrated in FIGS. 30A-30C in the interest of clarity. FIG. 31 illustrates the full signal used in testing the lever arm setup of FIGS. 30A-30B. The three regions are meant to show the versatility of actuation for peano-type actuators 900. Section I demonstrates voltage steps of 1-kV increments from 0 to 12 kV with 0.75 s hold time at each voltage to show the accurate positional control with respect to input voltage. Section II is an offset sine wave constructed by reflecting every other cycle over the x-axis. This waveform is meant to demonstrate smooth and muscle-mimetic actuation. Section III is a 13-kV voltage step to demonstrate the high-speed operation of the actuators.

Figure 32:
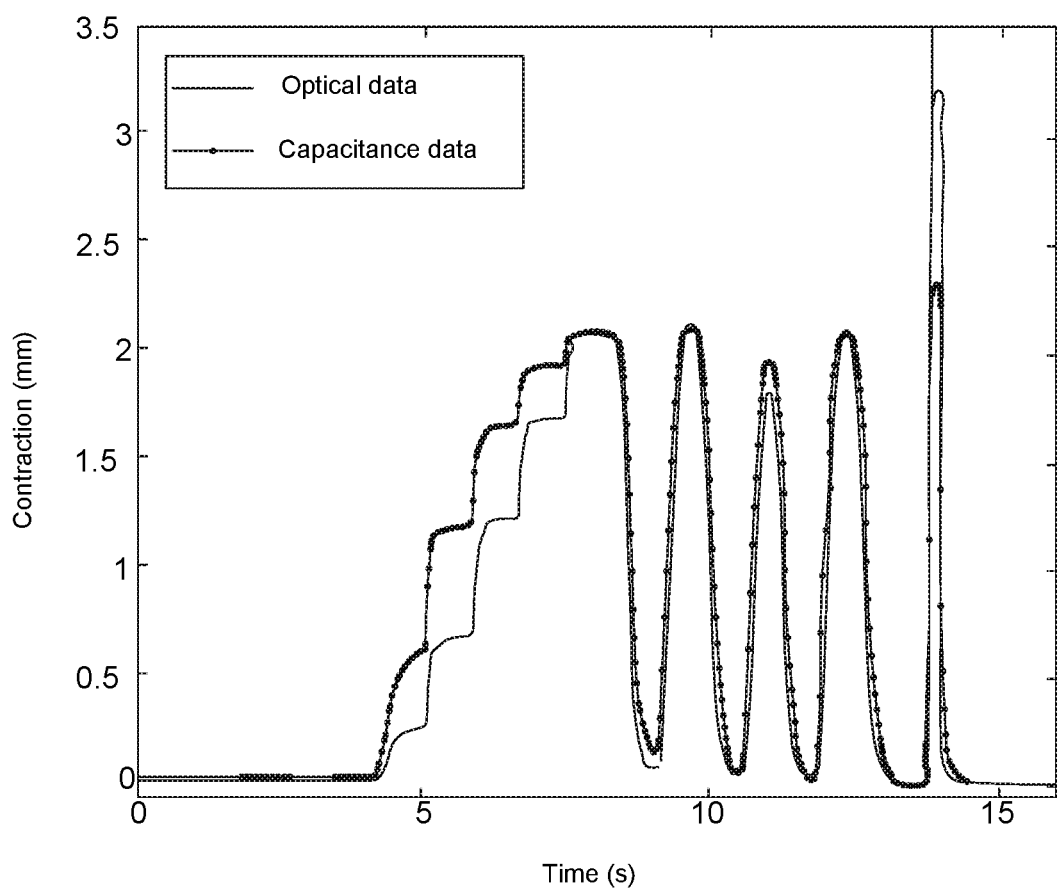
FIG. 32 is a plot of contraction of a peano-type actuator over time based on optical data and capacitance data.

FIG. 32 is a plot of dimensionless capacitance and optically tracked position data for a single actuator under the influence of a varying voltage signal. Capacitance data is multiplied by a constant scale factor to provide agreement with position data.

FIG. 33A is a peano-type actuator 900 suspended in a colorful box. FIG. 33B is similar to FIG. 33A but with the box partially filled with a liquid dielectric. FIG. 33C is similar to FIG. 33B but with the box fully filled with the liquid dielectric and without a voltage being applied. This figure shows how the actuator 900 is nearly or fully invisible. FIG. 33D is similar to FIG. 33C but with the voltage being applied.

Figure 34:
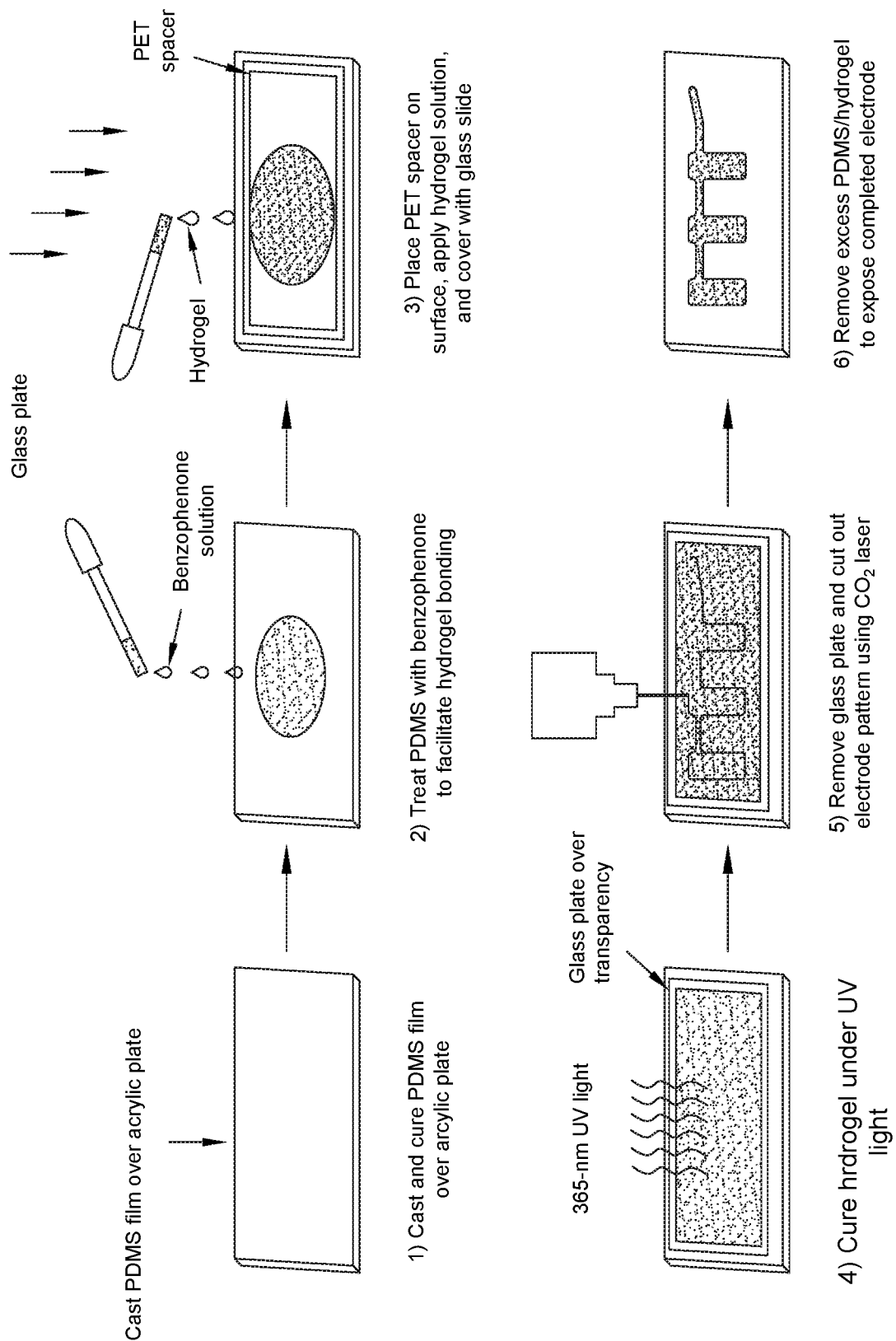
FIG. 34 illustrates a process of fabricating a peano-type actuators, according to another embodiment.

FIG. 34 illustrates a process of fabricating a peano-type actuators 900, according to another embodiment, and using hydrogel electrodes. In Step 1, a PDMS pre-polymer layer may be spin-coated or cast onto a wafer (e.g., acrylic plate) and cured. In Step 2, the PDMS surface may be treated with a solution of benzophenone in ethanol (e.g., 10 wt %). A mask may be used to treat only the area to be patterned with electrodes. In Step 3, a solution may be prepared for PAAm-LiCl hydrogel, and a thin plastic spacer may be used. The spacer may be placed on the PDMS surface, the hydrogel solution may be poured in, and a glass slide may be placed on top of the plastic spacer to squeeze out excess hydrogel solution. In Step 4, curing may be performed (e.g., under 365 nm UV light for one hour). In Step 5, the hydrogel/PDMS structure may be cut out (e.g., with a laser cutter) and set aside until needed. The shell may then be prepared using a heat press with a metal die to define pouch regions. Each pouch may be filled with liquid dielectric through access ports, and each access port may be heat stamped using a heated metal bar. In Step 6, excess PDMS/ hydrogel may be removed to expose completed electrodes. The actuator may then be assembled by laying the hydrogel/ PDMS electrode structure onto the pouch with the hydrogel side down and aligning them. The hydrogel may then be bonded to the surface using a cyanoacrylate glue.

Figure 35:
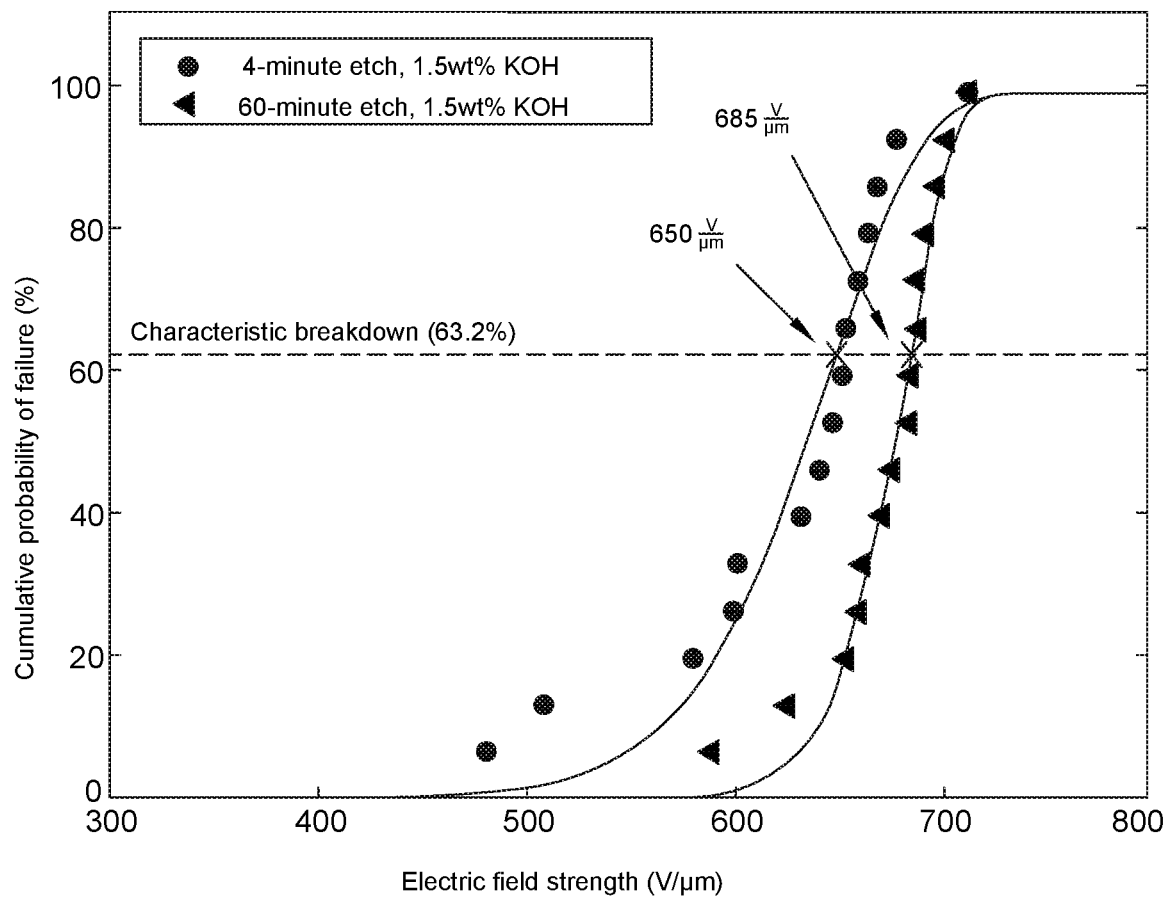
FIG. 35 is a plot of cumulative failure probability versus electric field strength for peano-type actuators etched for different time periods.

FIG. 35 is a plot of cumulative failure probability versus electric field strength for peano-type actuators etched for different time periods. As shown, breakdown voltages of single-layer BOPP film with thin heat-sealing copolymer layer on one side are illustrated. One sample was etched for 4 minutes in 1.5 wt % aqueous KOH solution, while the other was etched for 60 minutes in the same solution. These conditions were meant to verify that the KOH etch did not degrade the breakdown strength of BOPP samples. Electrodes were PAAm hydrogels swollen with an 8 M LiCl solution. A voltage ramp of 500 V/s was applied until breakdown occurred, with 15 tests conducted under each condition. The data was fit to a two-parameter Weibull distribution to determine the characteristic breakdown voltages of 650 V/µm (4 minutes) and 685 V/µm (60 minutes).

Various embodiments can include various types of features and/or can address various design (e.g., operational) considerations. For example, pouches filled with liquid dielectrics can be segmented to control hydraulic pressure in specific regions. Segmented pouches can also mitigate the influence of gravity, preventing the liquid dielectric from flowing to regions of the pouch with lowest gravitational potential. Segmentation can allow actuators to operate in a variety of positions and orientations without loss of functionality. An example of segmentation is shown in FIG. 17E. By using designs that displace the liquid dielectric only over short distances, energy losses caused by fluid drag can be reduced, and maximum frequency of actuation can be increased. Additionally, the response time can be inversely correlated to the size of the actuator, such that scaling down the actuator can increase the maximum frequency of actuation. In some embodiments, electromechanical pull-in or snap-through instabilities (e.g., as described with reference to FIGS. 6A-6B) can give rise to actuators exhibiting actuation responses that are highly nonlinear and discontinuous (e.g., for use as "binary" actuators). In addition to their inherent ability to self-heal from electrical damage, some embodiments of HASEL transducers further include features for self-healing from mechanical damage, such as by incorporating mechanically self-healing ionic conductors and mechanically self-healing elastomers. Such embodiments can effectively be fully self-healing from both mechanical and electrical damage, which can yield highly durable devices with long lifetimes. The embodiments described herein, as well as modifications to those embodiments, can yield wide variety of HASEL actuators that can be fabricated, and/or arranged in arrays or other structures, to scale up force, increase stroke, achieve modes of actuation with higher complexity, etc.

Figure 36A:
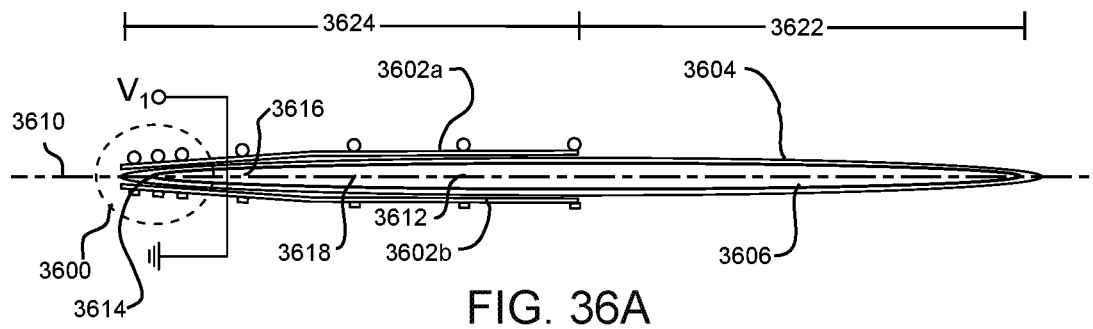
FIGS. 36A-36C illustrate an exemplary structure of a zipper-HASEL actuator.
Figure 36B:
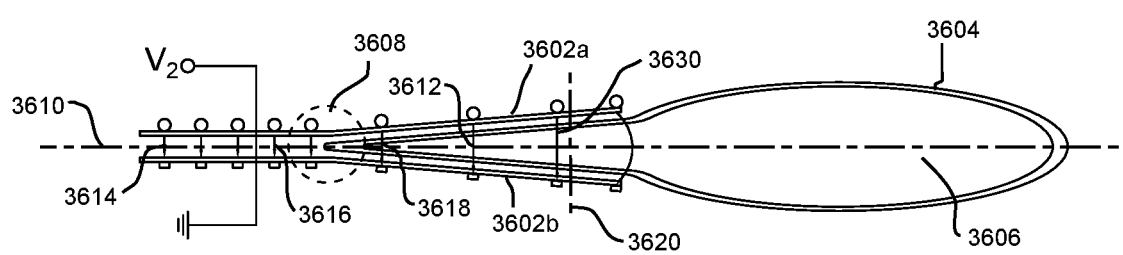
Figure 36C:
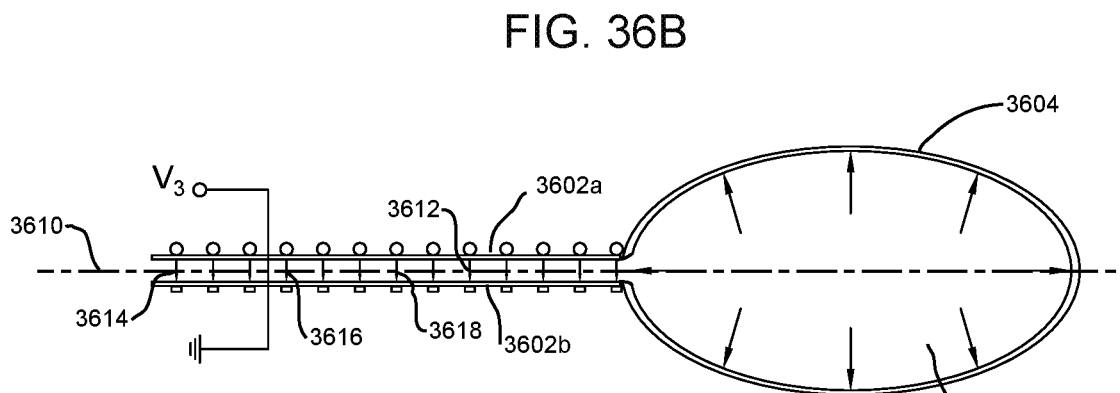

With reference now to FIGS. 36A-36C, an exemplary structure of a zipper-HASEL actuator is shown. "Zipper-HASEL actuator" may refer to any actuator described herein which is outfitted with a zipping or zipper-like mechanism as described below. This type of actuator utilizes an electrostatic zipping mechanism to enable lower voltage operation and mitigate pull-in instabilities.

A flexible shell or pouch 3604 (e.g., inextensible and/or elastically deformable) defines an enclosed internal cavity designed with one or more tapered boundaries and that is filled with a liquid dielectric 3606. A first electrode 3602a is disposed over a first side of the enclosed internal cavity and a second electrode 3602b is disposed over a second side of the enclosed internal cavity opposite the first side. The electrodes 3602a, 3602b are placed on opposing sides of a tapered boundary of the shell 3604, extending to or almost to the end of the tapered boundary.

In some embodiments, an edge of each of the electrodes 3602a, 3602b is flush or nearly flush with an edge of the enclosed internal cavity containing the liquid dielectric 3606. This geometry forms a zipping initiation site 3600 wherein the opposing electrodes 3602a, 3602b are in close proximity to one another, whereas the electrodes 3602a, 3602b are separated by a greater distance toward the opposite end of the electrodes. For example, as shown in FIG. 36A, at first reference point 3612 along reference axis 3610, electrodes 3602a and 3602b are separated by a greater distance than at second reference point 3614 which is disposed nearer a peripheral edge of the shell 3604 than the first reference point. However, in some embodiments, such as those shown in FIGS. 39A-39C, the first reference point (where the distance between electrodes is greater) may be disposed nearer the peripheral edge.

FIG. 36A illustrates the actuator at rest moments before or simultaneous with application of voltage $V_1$. In this state, the electric field generated by the relatively low voltage is concentrated at the edge of the tapered boundary where the electrodes 3602a, 3602b are closest together. This causes the tapered region to experience a high electrostatic stress in comparison to the rest of the shell 3604, and in response, the electrodes 3602a, 3602b move closer together.

As shown in FIG. 36B, as voltage is increased to $V_2$, the electrostatic forces 3630 extend further in a direction parallel to reference axis 3620, causing a larger portion of the electrodes 3602a, 3602b to be drawn together as the voltage overcomes the larger distances between the electrodes through the liquid dielectric 3606. This urges the top and bottom layers of the shell to be urged together in opposing directions parallel to reference axis 3620 by the electrodes and forces the liquid dielectric 3606 into the inactive area 3622 of the shell 3604 from the progressive zipping site 3608 which moves progressively to the right in the figure, through the active area 3624 as the voltage is increased further. It should be appreciated that in the case of a strain limiting layer, or when one side of the shell is otherwise fixed in position to another object (e.g., another actuator or a solid surface), that one side may remain stationary and relative movement between the top and bottom layers of the shell may be only with respect to the side which is not fixed.

Notably, the length of the portion of electrodes 3602a, 3602b which are fully drawn together can be controlled along a continuum from zero to the full length of the electrodes based on how much voltage is supplied. This provides a high degree of control over the extent to which the actuator is actuated as compared to binary or "on/off" actuators.

Upon full actuation caused by voltage $V_3$, shown in FIG. 36C, substantially all of the liquid dielectric 3606 is forced into the inactive region of shell 3604. In this state, electrodes 3602a, 3602b are fully drawn together, pinching the active portion of shell 3604. In this fully actuated state, the distance between the electrodes 3602a, 3602b is constant along reference axis 3610 from first reference point 3612 to second reference point 3614.

In the intermediate state shown in FIG. 36B, voltage $V_2$ is sufficient to draw the electrodes 3602a, 3602b together between second reference point 3614 and third reference point 3616. However, voltage $V_2$ may be insufficient to overcome the increased pressure in shell 3604 (as compared to the resting state shown in FIG. 36A) and close the gap between third reference point 3616 and fourth reference point 3618. However, increasing the voltage to $V_3$ may overcome the increased pressure and draw the entirety of electrodes 3602a, 3602b together as shown in FIG. 36C. It should be noted that embodiments using an inextensible shell 3604 would experience a contraction in a direction along reference axis 3610 in response to the vertical flexing of the shell 3604 caused by the increased pressure. In the embodiment illustrated in FIGS. 36A-36C, the shell 3604 is elastically deformable.

Figure 37A:
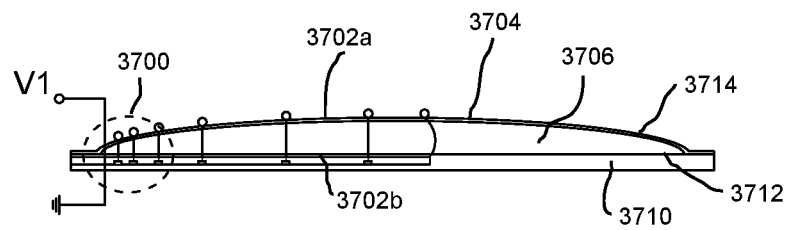
FIGS. 37A-37B illustrate a zipper-HASEL actuator with a stiffening layer.
Figure 37B:
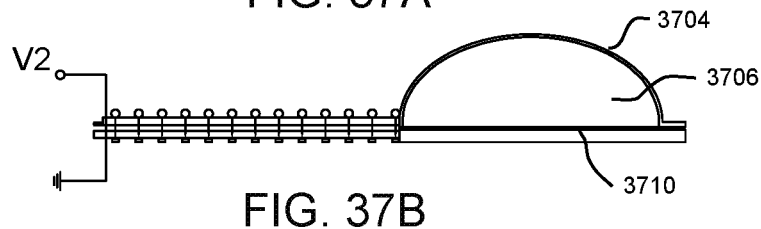

FIGS. 37A and 37B illustrate a zipper-HASEL actuator similar to the one shown in FIG. 36A, but with a bottom layer of the shell having a stiffness greater than a top layer of the shell. For example, a strain limiting layer 3710 (that inhibits flexing of the one side of the shell) may be disposed along one side (in this instance the bottom side) of the shell of the actuator. Moreover, the shell 3704 of this embodiment may be made from a composite structure, for example, a layer of thin elastomer 3714 bonded to a thin-film polymer layer 3712. The top electrode 3702a may be placed inside of the pocket in the shell 3704 and bonded to the inner surface of the thin elastomer 3714. The bottom electrode 3702b may be placed under the thin-film polymer layer 3712. In this regard, the applied electric field may act across only one layer of the shell material (e.g., the thin-film polymer 3712) and the liquid dielectric 3706. The thin-film polymer layer 3712 can be made from a material with high dielectric strength which enables the application of high electric fields while maintaining a stretchable outer structure. Moreover, because the electric field may be shielded from the outside environment due the above-described composite structure, these actuators may lend themselves to improved interaction with humans.

Regardless of the materials or thicknesses used to stiffen one side of the shell, the strain limiting layer 3710 controls the direction in which the shell 3704 bulges as liquid dielectric 3706 is squeezed in response to electrodes 3702a, 3702b being activated, beginning from zipping initiation site 3700.

Although the described embodiments utilize an inextensible shell, which aids in increasing the pressure within the liquid dielectric, it is contemplated that an elastic (or stretchable) shell may be used. In such an embodiment, elastic electrodes may be utilized to expand and contract with the shell wall.

Figure 37C:
FIGS. 37C-37D illustrate an active surface comprising zipper-HASEL actuators.
Figure 37D:
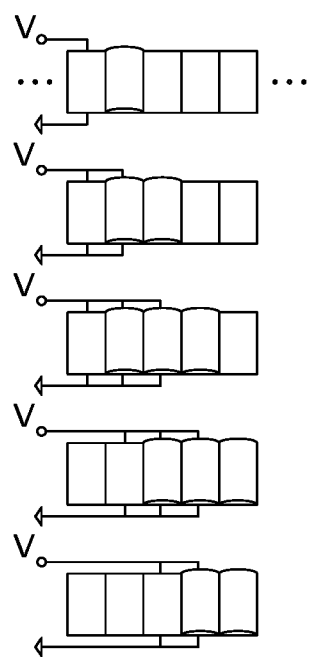

Due to the advantageous ability to progressively activate the actuator and push the liquid dielectric 3706 to the side, it is contemplated that an active surface may be formed from one or more zipper-HASEL actuators as shown in FIGS. 37C (side view) and 37D (top views). Such an active surface may have independently controlled segments capable of producing peristaltic motion to manipulate objects disposed on the active surface. In this regard, for each adjacent pair of actuators, an active area of one actuator may be disposed vertically within an inactive area of the other actuator, or vice versa. As can be appreciated from FIG. 37D, the segments can be activated in series by supplying increasing voltage to adjacent segments, moving an object from left to right in the illustration as adjacent segments are progressively activated. Notably, a further contemplated use an active surface using zipper-HASEL actuators is for an active braille display.

Figure 38A:
FIGS. 38A-38C illustrate a crawling feature of zipper-HASEL actuators.
Figure 38B:
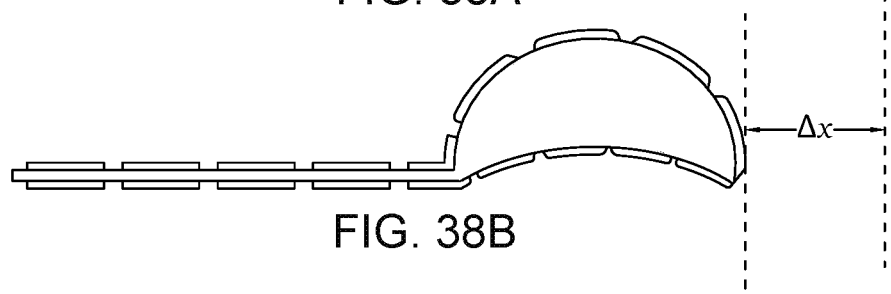
Figure 38C:
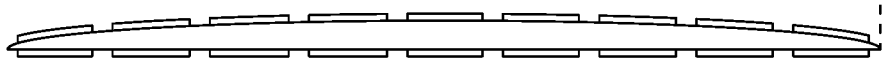

FIGS. 38A-38C illustrates a zipper-HASEL actuator having a crawling feature. Discrete electrode pairs 3802a-3802n are placed at regular intervals across the surface of a flexible shell which is filled with a liquid dielectric. A strain limiting layer (for clarity the location is generally labelled as 3810 but not separately illustrated from the pouch) is placed on the bottom side of the actuator. The discrete electrode pairs 3802a-3802n can be activated sequentially (in the illustrated case, starting from the zipping initiation site 3800a on the left with electrode pair 3802a and moving to the right), utilizing a zipping mechanism to force the liquid dielectric into the unactivated region (e.g., an inactive area between electrode pairs) or an active area that has not yet been supplied sufficient voltage to draw the respective electrode pair together) of the shell. Thus, the flexible material forming the top side 3812 of the unactivated region is forced to bulge, while the strain limiting layer 3810 prevents the other side from stretching. The net effect is contraction in the amount of $\Delta x$ as shown in FIG. 38B. When voltage is then turned off, the liquid dielectric redistributes throughout the cavity and the actuator returns to its original length as shown in FIG. 38C. One or more anchoring mechanisms can be utilized on the bottom surface of the shell near the zipping initiation sites 3800a, 3800b to control the direction in which the actuator moves upon contraction or relaxation. This controlled anchoring enables inchworm-like motion. Additionally, the electrode pairs can be activated in reverse order (starting from the zipping initiation site 3800b on the right and moving to the left), allowing the actuator to move in the opposite direction. Contemplated anchoring mechanisms include, but are not limited to, passive anchoring such as anisotropic friction using directional fibers and active anchoring such as electroadhesion.

FIGS. 39A-39C illustrate toroidal or donut-shaped HASEL actuators as described above in relation to FIGS. 2A-2E, for example, but with specific attention to a zipping feature. FIG. 39A demonstrates the progressive zipping phenomenon. As a low voltage $V_1$ is first applied, the electrodes are drawn together at zipping initiation site 3900, which is in the center of the active area (i.e., the region sandwiched between the electrodes) of the actuator. As the voltage is increased to $V_2$, and then further to $V_3$, the progressive zipping locations 3902 move outward in a ring-shape, forcing substantially all of the liquid dielectric into the inactive area (i.e., the region outside the electrodes). FIGS. 39B and 39C show two design variations of toroidal zipper-HASEL actuators. In FIG. 39B, the zipping actuation begins from a central point 3903 of active area 3904 where the top layer and bottom layer of the shell material is bonded together and actuation moves outward forcing the liquid dielectric into inactive area 3905 which surrounds active area 3904. Electrostatic forces between the electrodes (covering active area 3904 from top and bottom sides) upon application of voltage draws the electrodes toward each other, displacing liquid dielectric from the active area 3904 into the inactive area 3905. Because the top and bottom layers of the shell are bonded at this central point 3903, that is where the layers are closest together and less electrostatic force is needed to draw the electrodes together. Hence, this is the location at which the zipping initiates. The drawing together of the electrodes forces the liquid dielectric outward in all radial directions.

In the embodiment of FIG. 39C, the zipping initiates along lines where the shell is bonded. FIG. 39D shows a representative data set of actuation strain as a function of voltage under various loads for an actuator similar to the embodiment depicted in FIG. 39C. Notably, the actuator is capable of operating at 3 kV while limiting signs of pull-in instabilities. The progressive zipping of the electrodes inhibits a discontinuous jump in actuation strain, enabling precise control of the deformation state of the actuator with the input voltage.

It should also be appreciated that, although not illustrated, actuators similar to those shown and described in relation to FIGS. 39A-39C may be constructed with the inactive are in the center, the inactive area being surrounded by an active area. For example, the first and second electrodes may be annular.

FIGS. 40A-40F illustrate peano-HASEL actuators having zipping mechanisms that achieve bending actuation with a strain limiting layer. Turning first to FIG. 40A, an inextensible but flexible shell 4008 filled with liquid dielectric 4010 is disposed on a stiffening layer 4006 and spans across a flexible hinge or joint 4004. A pair of electrodes 4002 are disposed with one on either side of the flexible shell 4008. The voltage $V_1$ is effectively zero such that the actuator is at rest. As the voltage is increased to $V_2$, the zipping mechanism causes the dielectric fluid 4010 to be squeezed into a smaller region of shell 4008, causing the shell to bulge (see FIG. 40B). The stiffening layer 4006 causes the shell 4008 to bend in a desired direction, bending the substrate on which the shell 4008 is disposed at the flexible hinge area 4004, resulting in the configuration shown in FIG. 40B having deflection $\theta_2$. As the voltage is further increased to $V_3$, the zipping actuation bends the actuator even further to $\theta_3$ as shown in FIG. 40C.

FIG. 40D illustrates a bidirectional peano-HASEL actuator having two pairs of electrodes 4002a, 4002b and two distinct shells filled with dielectric fluid, one on either side of the flexible substrate. By activating electrode pair 4002a, the actuator can be bent toward the left. By activating electrode pair 4002b, the actuator can be bent toward the right.

FIG. 40E illustrates a peano-HASEL actuator having two flexible joints 4004, each with a pair of electrodes 4002, both joints 4004 configured to bend in the same direction. FIG. 40F illustrates a similar arrangement, but with the joints 4004 configured to flex in opposing directions. Notably, the stiffening layer 4006 of FIGS. 40A-40F which restricts bulging of the flexible shells 4008 in the direction of the stiffening layer may have a uniform stiffness along its length or may have varying stiffnesses. For example, the flexible joints 4004 may be locations in the stiffening layer 4006 having a reduced thickness or may be constructed from a different material than adjacent regions of the stiffening layer 4006. In some instances, a flexible joint 4004 may be formed by the absence of a stiffening layer in that region.

Figure 41A:
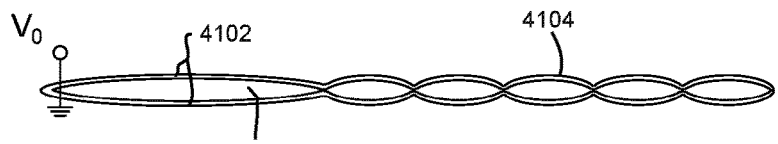
FIGS. 41A-41F illustrate various zipper-HASEL actuators having a corrugated pathway.
Figure 41B:
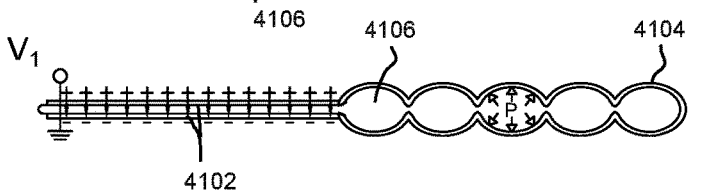

FIGS. 41A-41B illustrate a zipper-HASEL actuator having a corrugated pathway (e.g., series of fluidly interconnected pockets). In FIG. 41A, no voltage is applied through the electrodes 4102 and the shell 4104 forming the corrugated pathway is at rest. When the voltage is increased to $V_1$, the liquid dielectric 4106 is forced into the corrugated pathway, increasing the pressure and causing each segment to bulge. As seen by the difference in length between FIG. 41A and FIG. 41B, the activation of the electrodes 4102 causes the actuator to contract longitudinally. Although not illustrated, it should be appreciated that the electrodes 4102 may be partially activated through zipping to contract the actuator to any desired intermediate length.

Figure 41C:
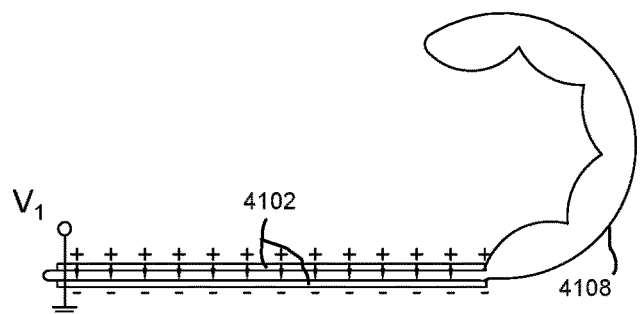

FIG. 41C illustrates a zipper-HASEL actuator in an actuated stated, similar to FIG. 41B but with the addition of a strain limiting layer 4108 on the bottom side. This strain limiting layer 4108 may be any suitable material which has a greater stiffness than the top side of the corrugated pathway, but which is flexible. Such a strain limiting layer 4108 causes preferential deformation toward the top layer of the corrugated pathway, resulting in a curling movement. The inventors contemplate that a plurality of actuators such as this may be arranged in a radial fashion with the electrodes near the center and the corrugated pathways extending outward therefrom. Simultaneous actuation of the electrodes may then result in the finger-like extensions (i.e., corrugated pathways) curling together like a claw to grip an object.

Figure 41D:
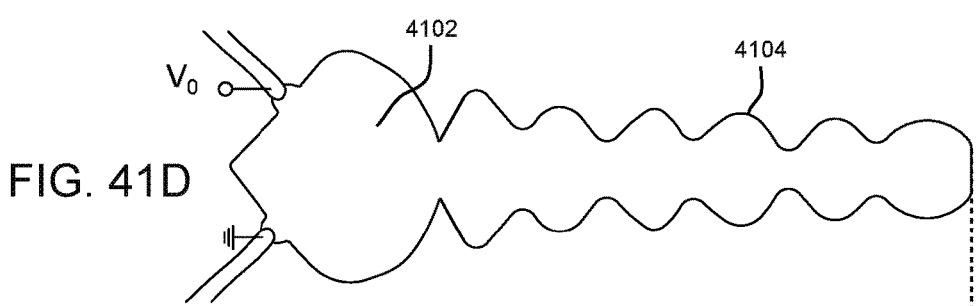
Figure 41E:
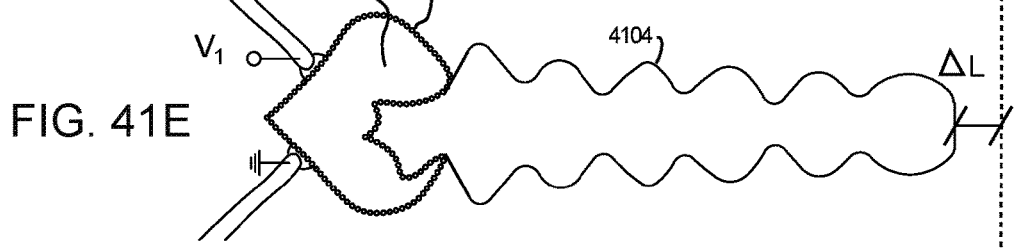
Figure 41F:
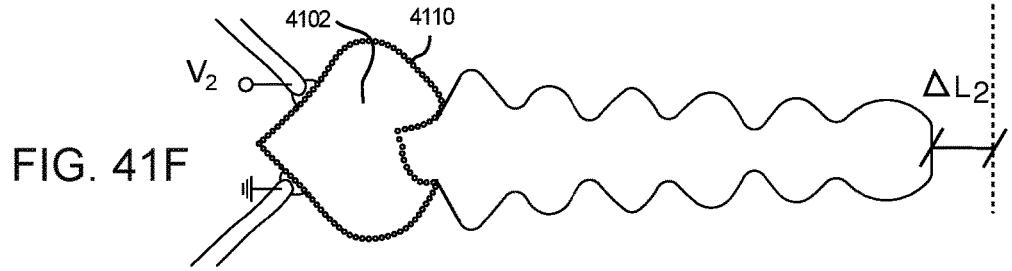

FIGS. 41D-41F show a top view of a zipper-HASEL actuator similar to that of FIG. 41C at increasing stages of actuation as the voltage is increased from $V_0$ to $V_1$ and to $V_2$. In this arrangement, the corrugated pathway contracts longitudinally and also bends upward. In FIG. 41D, the electrodes are not activated. In FIGS. 41E and 41F, the activated region 4110 of the electrodes is shown. The electrodes may be constructed from, for example, a carbon paint layered onto a portion of the shell 4104.

Figure 42A:
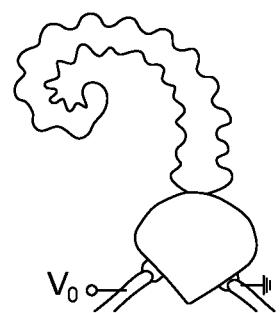
FIGS. 42A-42F illustrate movement of a spiral zipper-HASEL actuator.
Figure 42D:
Figure 42B:
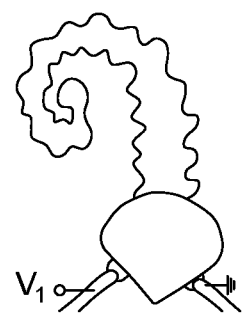
Figure 42E:
Figure 42C:
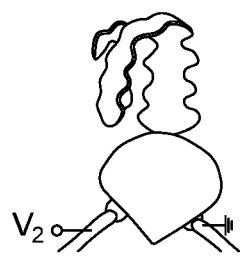
Figure 42F:
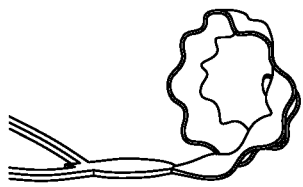

FIGS. 42A-42F illustrate a spiral zipper-HASEL actuator in various stages of zipping actuation. FIGS. 42A-42C are top views of the actuator and FIGS. 42D-42F are corresponding side views. In the illustrated example, the corrugated pathway of the actuator has a shape which generally resembles a Fibonacci spiral. In FIGS. 42A and 42D, no voltage is applied and the shell rests flat on a surface. In FIGS. 42B and 42E, $V_1$ is applied which causes the corrugated pathway to begin to expand laterally and contract longitudinally in response to a portion of the liquid dielectric being squeezed from between the electrodes. Due to a strain limiting layer, the corrugated pathway responds to the fluid flow by deflecting upwards and also by twisting laterally. As voltage is increased to $V_2$ as shown in FIGS. 42C and 42F, the corrugated pathway extends further upward continues to twist. Notably, by utilizing a stiffening layer having varying degrees of stiffness or flexibility, the relative curvature of distinct regions of the corrugated pathway may be controlled. For example, by continuously reducing the stiffness of the stiffening layer moving from the electrode end to the opposing tip of the corrugated pathway (or vice versa), the radius of curvature may continuously increase or decrease along the length of the corrugated pathway. This effect is not limited to the embodiment of FIGS. 42A-42F but may applied to any HASEL actuator.

FIGS. 43A-43C illustrate various geometric considerations of a zipper-HASEL actuator. FIG. 43A specifically illustrates a side view of a peano-HASEL actuator shell in three phases: prior to actuation, during actuation, and fully actuated. The shape of the shell is assumed to be two intersecting circle segments beginning with radius $r_0$ and transitioning through various smaller radii as the zipping progresses. FIG. 43B models the total energy of the system as the sum of electrical and mechanical components. FIG. 43C provides equations of state for the system for Force (F) and strain ($\varepsilon$), parameterized by the angle, $\alpha$, in the shell.

Figure 44A:
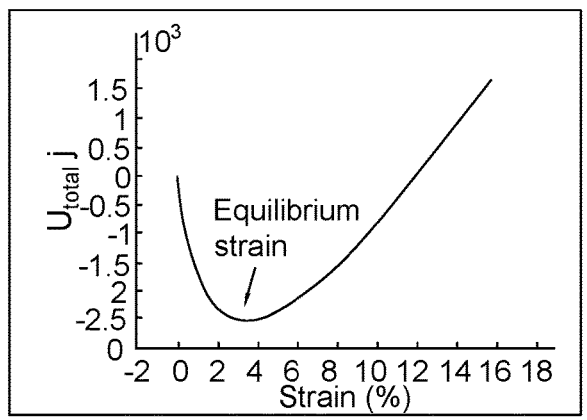
FIGS. 44A-44E illustrate predicted parameter models and comparisons to experimental data.
Figure 44B:
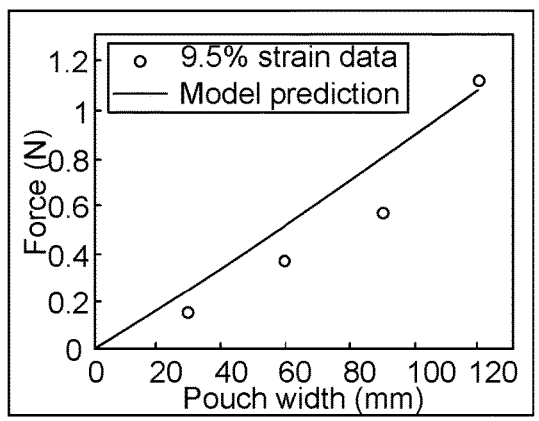
Figure 44C:
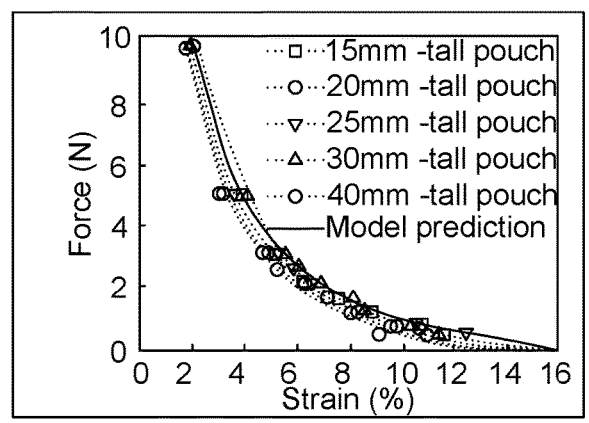
Figure 44D:
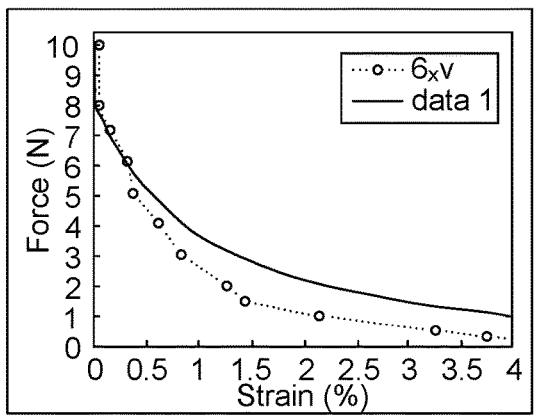
Figure 44E:
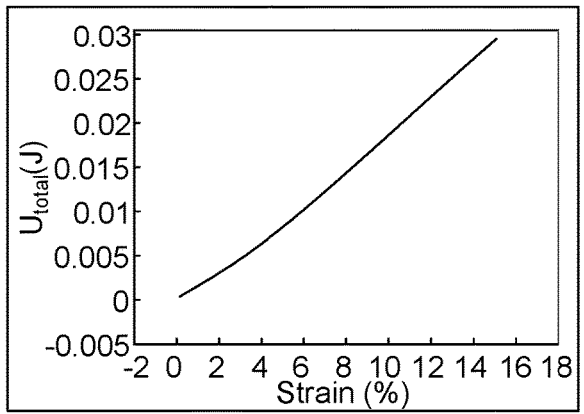

FIGS. 44A-44E show various graphical representations of an exemplary zipper-HASEL actuator. FIG. 44A is an exemplary plot of the total energy of the actuator system, showing the minimum energy state which predicts the equilibrium strain of the actuator. FIG. 44B models predicted values and provides a comparison to experiment data for actuator force output at 9.5% strain as a function of shell width. FIG. 44C models predicted values and provides a comparison to experiment data for actuator force output versus strain for several actuator shell heights having the same shell width at 8 kV. Notably, the change in force output for different shell heights is negligible. FIG. 44D models predicted values and provides a comparison to experiment data for the blocking force of zipper-HASEL actuators. FIG. 44E models the total energy of the system against strain.

HASEL actuators which harness a zipping mechanism are advantageous for several reasons. For example, activation of the actuator begins at much lower voltages than previously reported, since the electric field is initially concentrated in a particular region of the shell. Further, the progressive zipping actuation prevents instabilities within the soft structure, allowing for precise control of the deformation state via input voltage. Further still, zipping mechanisms are easily incorporated into previous designs of HASEL, but enable a multitude of new actuator designs facilitating various advantageous functions and motions.

The various techniques can be implemented with any suitable hardware and/or software component(s) and/or module(s), including, but not limited to circuits, application specific integrated circuits (ASICs), general purpose processors, digital signal processors (DSPs), field programmable gate arrays (FPGAs), programmable logic devices (PLD), discrete gates, transistor logic devices, discrete hardware components, or combinations thereof. For example, steps of methods or algorithms, or other functionality described in connection with embodiments, can be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims. The various operations of methods and functions of certain system components described above can be performed by any suitable means capable of performing the corresponding functions.

Other examples and implementations are within the scope and spirit of the disclosure and appended claims. For example, features implementing functions can also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

It will be readily appreciated that many deviations may be made from the specific embodiments disclosed in the specification without departing from the spirit and scope of the invention. For instance, some arrangements envision that different data item types may require different amounts of processing time by the processors and this may be taken account in the above discussion in any appropriate manner.

As mentioned, embodiments disclosed herein can be implemented as one or more computer program products, i.e., one or more modules of computer program instructions encoded on a computer-readable medium for execution by, or to control the operation of, data processing apparatus (processors, cores, etc.). The computer-readable medium can be a machine-readable storage device, a machine-readable storage substrate, a memory device, a composition of matter affecting a machine-readable propagated signal, or a combination of one or more of them. In addition to hardware, code that creates an execution environment for the computer program in question may be provided, e.g., code that constitutes processor firmware, a protocol stack, a database management system, an operating system, or a combination of one or more of them.

Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

We claim:
1. An electro-hydraulic actuator, comprising:
 a deformable shell that defines an enclosed internal cavity;
 a liquid dielectric contained within the enclosed internal cavity;

a first electrode disposed over a first side of the enclosed internal cavity; and a second electrode disposed over a second side of the enclosed internal cavity, wherein a distance between the first and second electrodes decreases from a first reference point on an axis through the enclosed internal cavity to a second reference point on the axis in the absence of a voltage being applied to the first and second electrodes, and wherein the distance between the first and second electrodes remains constant between the first and second reference points along the axis through the enclosed internal cavity in the presence of a voltage being applied to the first and second electrodes.

2. The actuator of claim 1, wherein a surface area of the deformable shell over which the first and second electrodes are disposed comprises an active area of the deformable shell, wherein a surface area of the deformable shell over which the first and second electrodes are not disposed comprises an inactive area of the deformable shell, and wherein electrostatic forces between the first and second electrodes upon application of the voltage to the first and second electrodes draws the first and second electrodes towards each other to displace the liquid dielectric within the enclosed internal cavity from the active area of the shell to the inactive area of the shell.

3. The actuator of claim 2, wherein the active area is surrounded by the inactive area.

4. The actuator of claim 3, and wherein electrostatic forces between the first and second electrodes upon application of the voltage to the first and second electrodes draws the first and second electrodes towards each other to displace the liquid dielectric within the enclosed internal cavity from the active area of the shell to the inactive area of the shell in first and second opposite directions.

5. The actuator of claim 2, wherein the inactive area is surrounded by the active area.

6. A system, comprising:
a plurality of the actuators of claim 2 electrically interconnected to each other, wherein for each adjacent pair of actuators of the plurality of actuators, the active area of a first actuator in the adjacent pair is disposed over the inactive area of a second actuator in the adjacent pair.

7. The actuator of claim 2, wherein the first and second electrodes comprise a first pair of electrodes, wherein the actuator comprises one or more additional pairs of electrodes that are each disposed over an active area of the flexible shell, and wherein each adjacent pair of the active areas is spaced by an inactive area.

8. The actuator of claim 1, wherein the second portion of the deformable shell is inextensible.

9. The actuator of claim 1, wherein the electrodes are elastic.

10. The actuator of claim 1, wherein the electrodes are inextensible.

11. The actuator of claim 1, wherein the first reference point is disposed adjacent a peripheral edge of the shell, and wherein the second reference point is spaced from the peripheral edge of the shell.

12. The actuator of claim 11, wherein the second reference point is positioned adjacent a center of the shell.

13. The actuator of claim 1, wherein the first reference point is disposed adjacent a center of the shell, and wherein the second reference point is spaced from the center of the shell.

14. A method of using an electro-hydraulic actuator, comprising:
providing an electro-hydraulic actuator, comprising:
a deformable shell that defines an enclosed internal cavity;
a liquid dielectric contained within the enclosed internal cavity;
a first electrode disposed over a first side of the enclosed internal cavity; and
a second electrode disposed over a second side of the enclosed internal cavity, wherein a distance between the first and second electrodes decreases from a first reference point on an axis through the enclosed internal cavity to a second reference point on the axis in the absence of a voltage being applied to the first and second electrodes;
applying a first voltage to the first and second electrodes to generate electrostatic forces between the first and second electrodes;
drawing the first and second electrodes towards each other using the electrostatic forces generated during the applying the first voltage;
displacing, during the drawing, a liquid dielectric contained within a flexible shell and disposed between the first and second electrodes; and
flexing a portion of the flexible shell with the displaced liquid dielectric, wherein a first portion of the deformable shell on the first side of the internal cavity comprises a first stiffness, wherein a second portion of the deformable shell on the first side of the internal cavity comprises a second stiffness, and wherein the first stiffness is greater than the second stiffness.

15. The method of claim 14, wherein the drawing includes drawing the first and second electrodes towards each other from the second reference point to a third reference point on the axis, wherein the third reference point is between the first and second reference points, and wherein the method further comprises:
applying a second voltage to the first and second electrodes to generate electrostatic forces between the first and second electrodes, wherein the second voltage is greater than the first voltage;
drawing the first and second electrodes towards each other using the electrostatic forces generated during the applying the second voltage, wherein the drawing includes drawing the first and second electrodes towards each other from the third reference point on the axis to a fourth reference point on the axis, wherein the fourth reference point is between the first and third reference points.

16. A method of using an electro-hydraulic actuator, comprising:
providing an electro-hydraulic actuator, comprising:
a deformable shell that defines an enclosed internal cavity;
a liquid dielectric contained within the enclosed internal cavity;
a first electrode disposed over a first side of the enclosed internal cavity; and
a second electrode disposed over a second side of the enclosed internal cavity, wherein a distance between the first and second electrodes decreases from a first reference point on a first reference axis through the enclosed internal cavity to a second reference point on the first reference axis in the absence of a voltage being applied to the first and second electrodes;

applying an increasing voltage to the first and second electrodes to generate electrostatic forces between the first and second electrodes;

progressively drawing the first and second electrodes towards each other using the electrostatic forces generated during the applying the first voltage from the second reference point towards the first reference point;

displacing, during the progressively drawing, a liquid dielectric contained within a flexible shell and disposed between the first and second electrodes; and flexing a portion of the flexible shell with the displaced liquid dielectric, wherein a first portion of the deformable shell on the first side of the internal cavity comprises a first stiffness, wherein a second portion of the deformable shell on the first side of the internal cavity comprises a second stiffness, and wherein the first stiffness is greater than the second stiffness.

17. The method of claim 16, further including:
applying a constant voltage to the first and second electrodes, wherein the distance between the first and second electrodes remains constant between the first and second reference points along the first reference axis through the enclosed internal cavity in the presence of the constant voltage being applied to the first and second electrodes.

18. The method of claim 16, wherein the electrostatic forces extend along a second reference axis that is perpendicular to the first reference axis.

19. The method of claim 16, wherein the flexing includes:
urging the portion of the flexible shell in a direction that is parallel to the second reference axis.

20. The method of claim 19, wherein the urging includes urging the portion of the flexible shell in first and second opposite directions that are parallel to the second reference axis.

21. The method of claim 20, wherein the urging includes urging the portion of the flexible shell in a first direction that is parallel to the second reference axis, and wherein the method further includes:
inhibiting flexure of the flexible shell in a second direction along the second reference axis, wherein the first direction along the second reference axis is opposite to the second direction along the second reference axis.

* * * * *